(12) United States Patent
Tsubata et al.

(10) Patent No.: US 8,450,738 B2
(45) Date of Patent: May 28, 2013

(54) ACTIVE MATRIX SUBSTRATE, PRODUCTION METHOD OF THE SAME, LIQUID CRYSTAL PANEL, LIQUID CRYSTAL DISPLAY DEVICE, LIQUID CRYSTAL DISPLAY UNIT, AND TELEVISION RECEIVER

(75) Inventors: Toshihide Tsubata, Osaka (JP); Toshinori Sugihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 366 days.

(21) Appl. No.: 12/808,758

(22) PCT Filed: Aug. 27, 2008

(86) PCT No.: PCT/JP2008/065334
§ 371 (c)(1),
(2), (4) Date: Jun. 17, 2010

(87) PCT Pub. No.: WO2009/078200
PCT Pub. Date: Jun. 25, 2009

(65) Prior Publication Data
US 2011/0227097 A1    Sep. 22, 2011

(30) Foreign Application Priority Data
Dec. 19, 2007  (JP) .................... 2007-327939

(51) Int. Cl.
*H01L 29/18*     (2006.01)
*H01L 33/00*     (2010.01)
*H01L 29/20*     (2006.01)
*G02F 1/1362*    (2006.01)

(52) U.S. Cl.
CPC ................. *G02F 1/136286* (2013.01)
USPC .......... 257/59; 257/71; 257/72; 257/204; 257/208; 257/296; 257/303; 257/350; 257/411; 438/155; 438/239; 438/287; 438/591

(58) Field of Classification Search
USPC ........ 438/38, 39, 40, 42; 257/79, 88, E33.05, 257/E33.006, E27.111, E27.131, E27.132, 257/E27.152, E33.062; 349/56, 73, 74, 77, 349/82, 139, FOR. 105, FOR. 106, FOR. 113
See application file for complete search history.

(56) References Cited

U.S. PATENT DOCUMENTS

| 4,786,780 A | 11/1988 | Oakabe et al. |
| 5,523,866 A | 6/1996 | Morimoto et al. |

(Continued)

FOREIGN PATENT DOCUMENTS

| JP | 62-280890 A | 12/1987 |
| JP | 63-262621 A | 10/1988 |

(Continued)

*Primary Examiner* — Olik Chaudhuri
*Assistant Examiner* — Quovaunda V Jefferson
(74) *Attorney, Agent, or Firm* — Birch, Stewart, Kolasch & Birch, LLP

(57) ABSTRACT

An active matrix substrate includes: pixel regions (5L, 5R, and 5M) provided in line and column direction; scan signal lines (16α and 16β); data signal lines (Sp, Sq, sp, and sq) crossing the scan signal lines at right angles; a gate insulating film covering the scan signal lines; and an interlayer insulating film covering the data signal lines, two of the data signal lines (Sq and sp) being provided (i) so as to overlap a gap between two of the pixel regions (5L and 5R) which are adjacent to each other in the line direction or (ii) so as to overlap a region which extends along the gap, the interlayer insulating film having a hollow part K so that the hollow part K and a gap between the two of the data signal lines (Sq and sp) overlap each other, and part of the hollow part K and the scan signal lines (16α and 16β) overlap each other via the gate insulating film. The configuration allows an active matrix substrate including two data signal lines provided in a gap between two adjacent pixel regions to fix short circuit without exposing data signal lines or scan signal lines even when two data signal lines short-circuit on scan signal lines due to a residue.

6 Claims, 32 Drawing Sheets

U.S. PATENT DOCUMENTS

| | | | |
|---|---|---|---|
| 5,616,524 A * | 4/1997 | Wei et al. | 438/4 |
| 5,668,649 A * | 9/1997 | Suzuki et al. | 349/42 |
| 5,949,391 A | 9/1999 | Saishu et al. | |
| 6,031,589 A * | 2/2000 | Kim | 349/39 |
| 6,798,442 B1 | 9/2004 | Kim et al. | |
| 6,900,854 B1 | 5/2005 | Kim et al. | |
| 2005/0007533 A1 * | 1/2005 | Tanaka et al. | 349/139 |
| 2005/0205866 A1 | 9/2005 | Kim et al. | |
| 2006/0240606 A1 | 10/2006 | Motoshima et al. | |
| 2008/0061296 A1 | 3/2008 | Kim et al. | |
| 2011/0032445 A1 | 2/2011 | Kim et al. | |
| 2011/0248274 A1 | 10/2011 | Kim et al. | |

FOREIGN PATENT DOCUMENTS

| | | |
|---|---|---|
| JP | 6-18934 A | 1/1994 |
| JP | 6-51349 A | 2/1994 |
| JP | 7-234416 A | 9/1995 |
| JP | 10-62811 A | 3/1998 |
| JP | 2000-162647 A | 6/2000 |
| JP | 2003-107502 A | 4/2003 |
| JP | 2005-38895 A | 2/2005 |
| JP | 2006-308686 A | 11/2006 |

* cited by examiner

F I G. 9
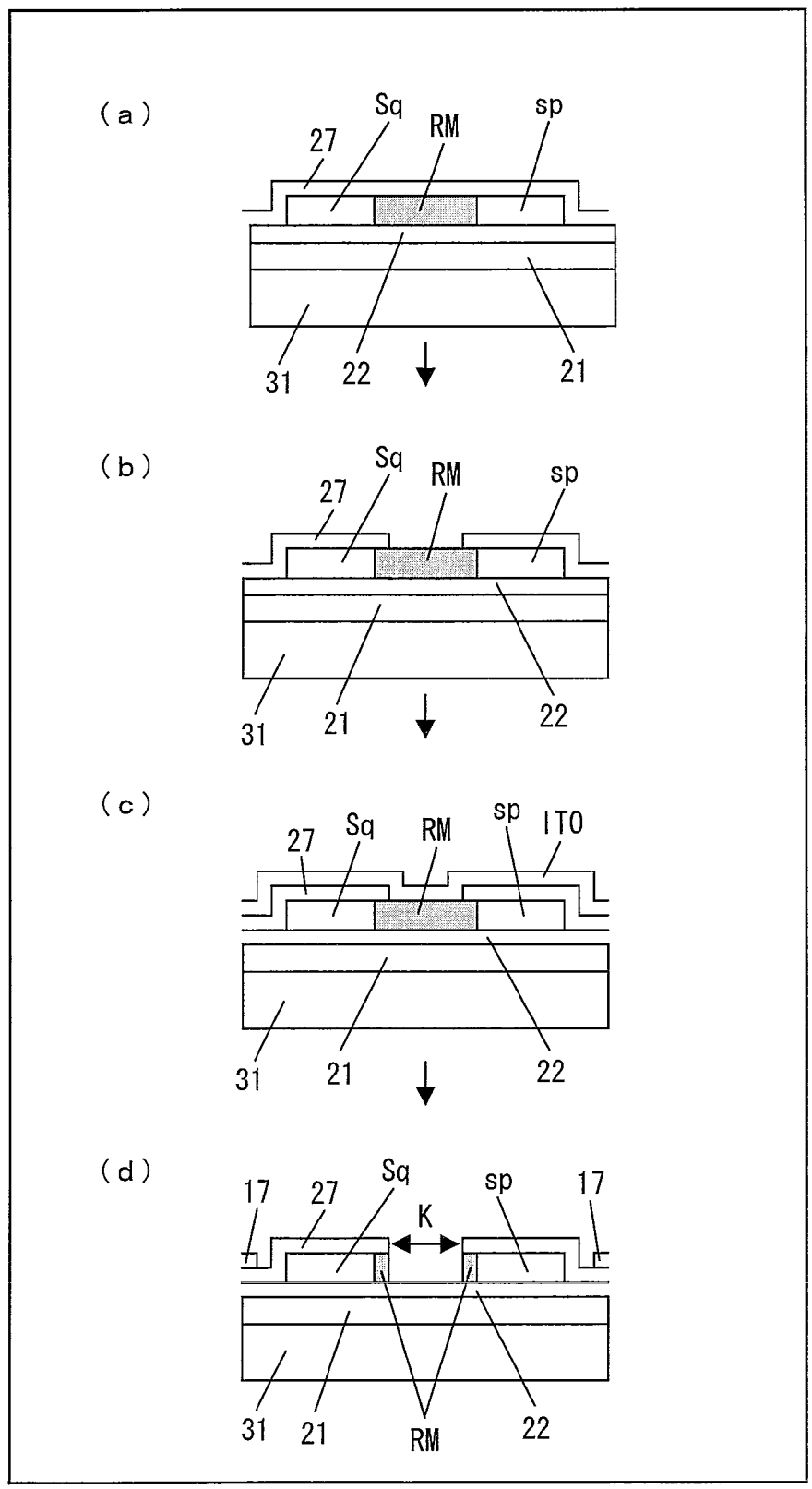

F I G. 1 4
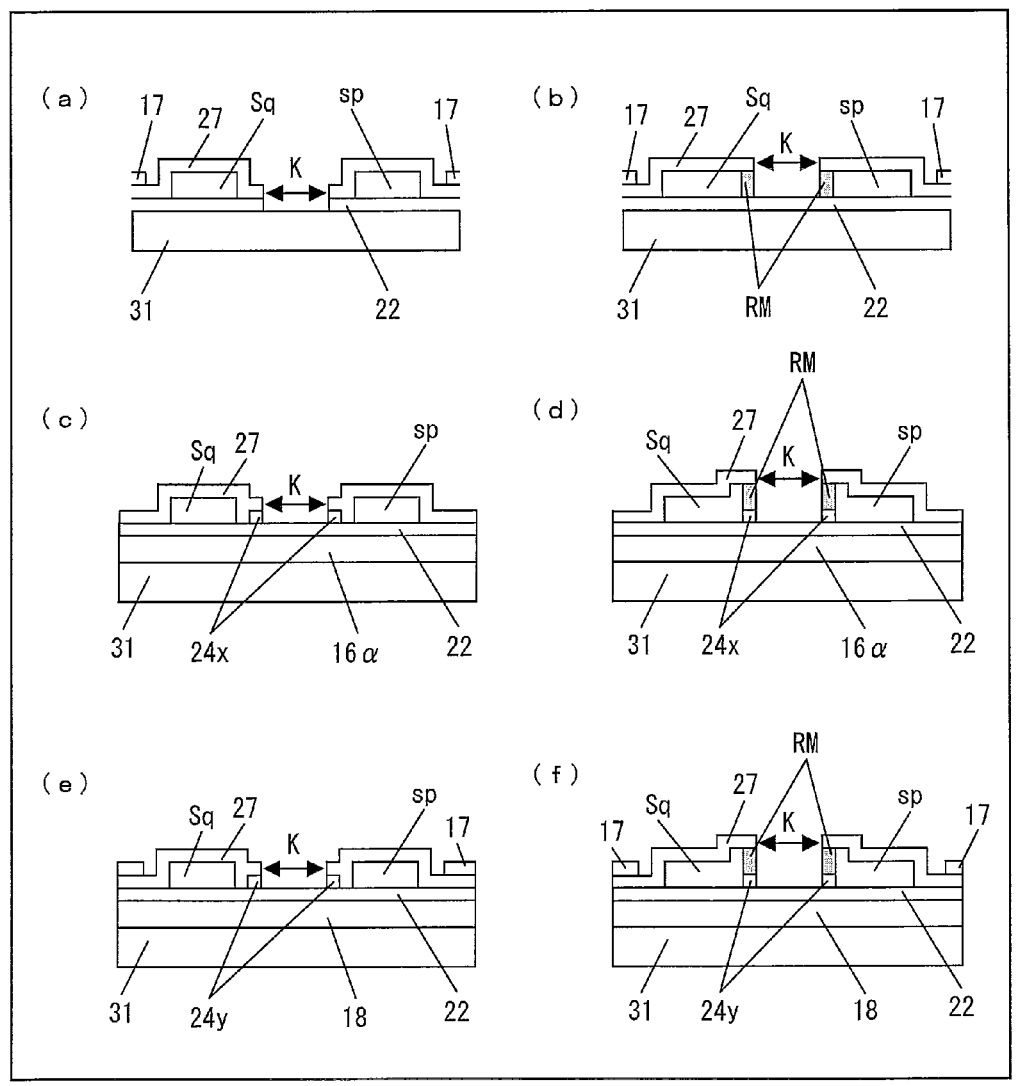

F I G. 2 6
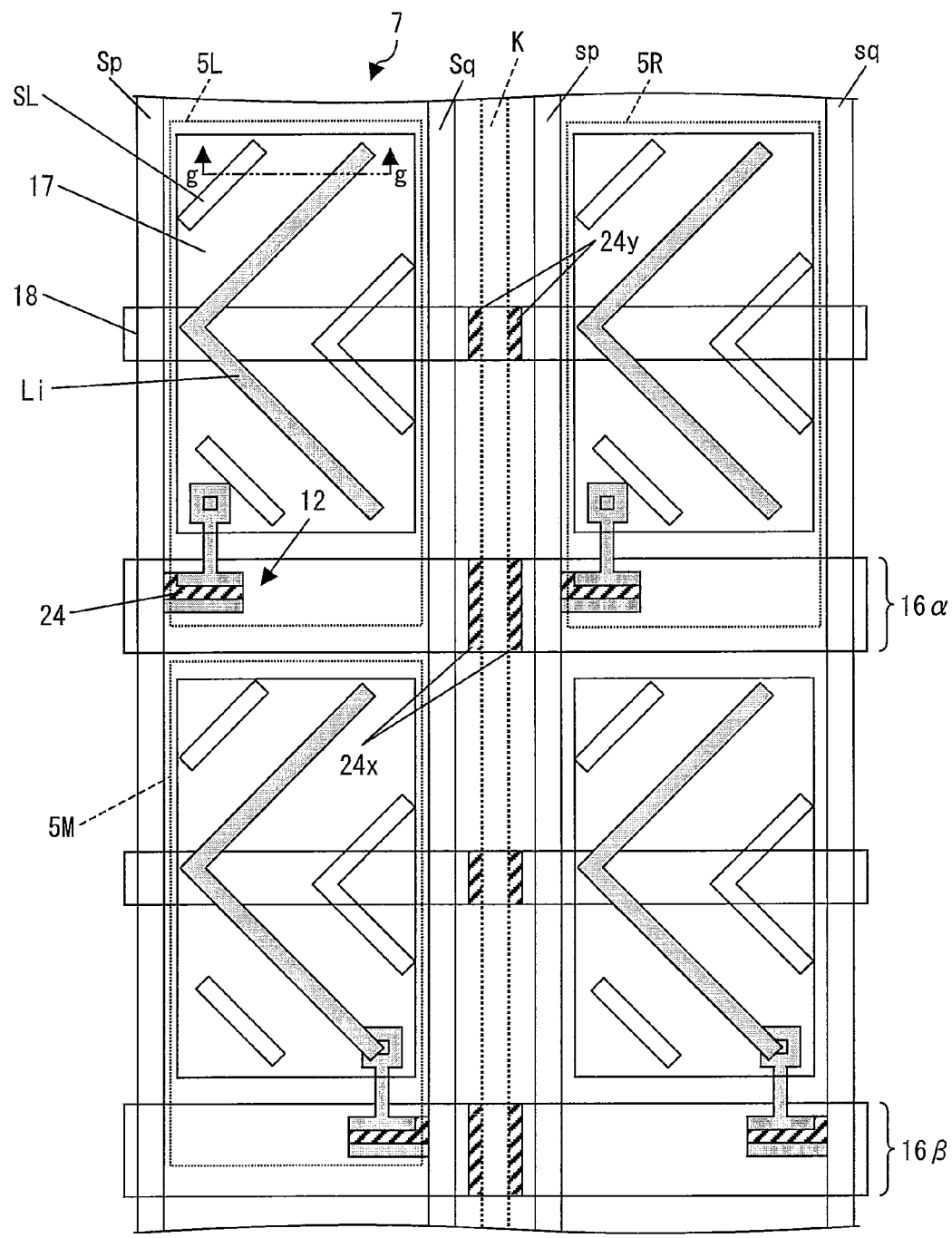

F I G. 2 7
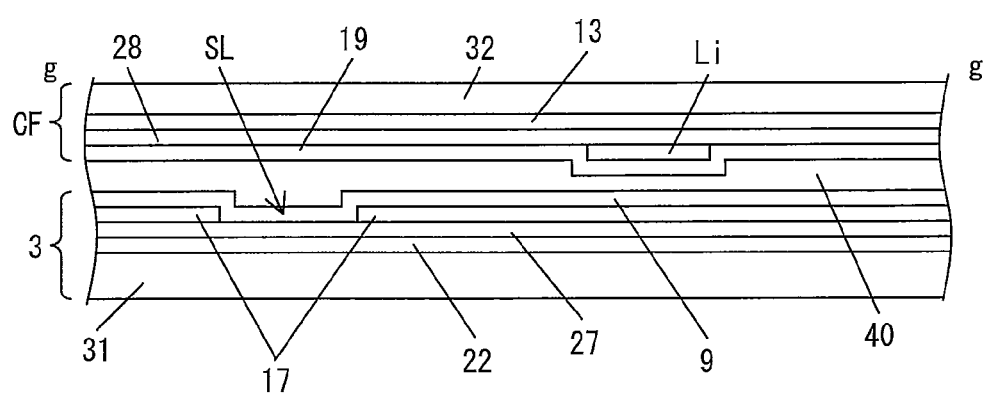

F I G. 2 9
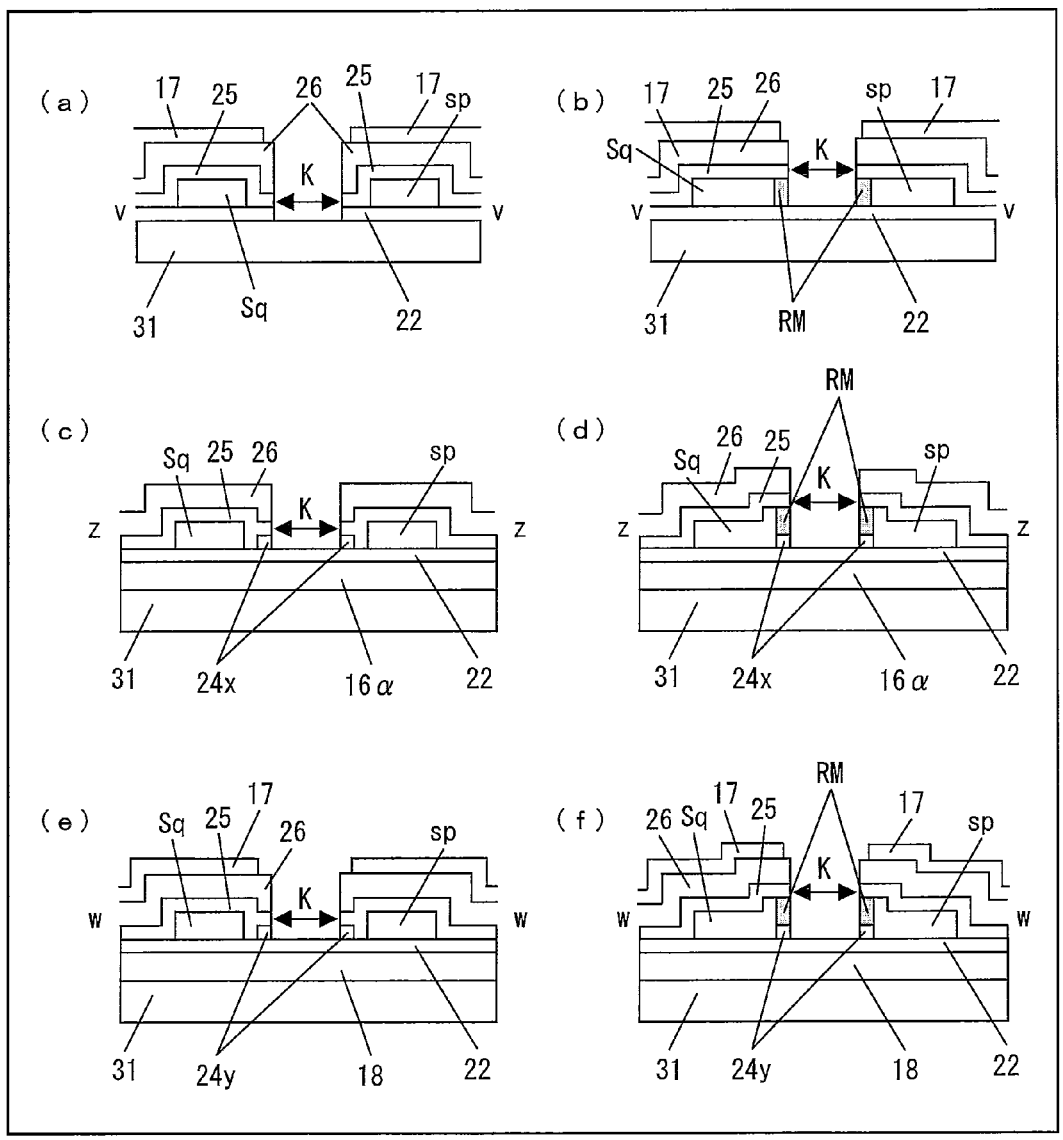

ACTIVE MATRIX SUBSTRATE, PRODUCTION METHOD OF THE SAME, LIQUID CRYSTAL PANEL, LIQUID CRYSTAL DISPLAY DEVICE, LIQUID CRYSTAL DISPLAY UNIT, AND TELEVISION RECEIVER

TECHNICAL FIELD

The present invention relates to an active matrix substrate in which two data signal lines are provided so that (i) the two data signal lines overlap a gap between respective two pixel regions which are adjacent to each other or (ii) the two of the data signal lines overlap a region which extends along the gap. Further, the present invention relates to a liquid crystal panel, etc. which includes the active matrix substrate.

BACKGROUND ART

Patent Literature 1 discloses a liquid crystal display device in which two signal lines (one of which is a redundant signal line) which are provided on respective sides of a pixel, and a pixel electrode included in the pixel is connected to the two signal lines via a corresponding TFT (thin film transistor). According to the liquid crystal display device, the two signal lines are closely arranged in a gap between respective two adjacent pixels. This leads to a problem that the closely arranged two signal lines (which (i) are adjacent to each other so that no pixel is provided therebetween and (ii) correspond to respective different pixels) tend to easily short-circuit during manufacturing. In view of the problem, Patent Literature 1 discloses a step of, in forming pixel electrodes by patterning, cutting off a short-circuited section (i.e., the short-circuited section between the closely arranged two signal lines) by a groove which has been provided preliminarily, in a protection film covering the TFT, between the closely arranged two signal lines.

Patent Literature 1

Japanese Patent Application Publication, Tokukai, No. 2003-107502 A (Publication Date: Apr. 9, 2003)

SUMMARY OF INVENTION

However, according to the liquid crystal display device disclosed in Patent Literature 1, the groove is not provided above scanning lines or storage capacitor electrode lines so that the lines will not be exposed or cut (see FIG. 4 of Patent Literature 1). That is, in a case where the closely arranged two signal lines short-circuit above the lines (the scanning lines or the storage capacitor electrode lines), the short-circuit cannot be repaired.

The present invention provides an active matrix substrate in which two of data signal lines are provided so that (i) the two of the data signal lines overlap a gap between respective two of pixel regions which are adjacent to each other or (ii) the two of the data signal lines overlap a region which extends along the gap, wherein a short circuit, caused due to a residue, between the two data signal lines located above a scan signal line (corresponding to the "scanning line") or a storage capacitor line (corresponding to the "storage capacitor electrode line") can be fixed while the lines will not be exposed.

An active matrix substrate according to the present invention includes: pixel regions which are provided in a line direction in which scan signal lines extend and a column direction; data signal lines which extend in the column direction; a gate insulating film which covers the scan signal lines; and an interlayer insulating film which covers the data signal lines, two of the data signal lines being provided so that (i) the two of the data signal lines and a gap between respective two of the pixel regions which are adjacent to each other in the line direction overlap each other or (ii) the two of the data signal lines and a region which extends along the gap overlap each other, the interlayer insulating film having a hollow part so that the hollow part and a gap between the two of the data signal lines overlap each other, and part of the hollow part and the scan signal lines overlap each other via the gate insulating film. Note that, in each of the scan signal lines, a region corresponding to a region under the hollow part is referred to as a first region, and regions adjacent to the first regions in the line direction are referred to as first adjacent regions.

According to the configuration, for example, when a semiconductor layer is provided on the gate insulting film so that the semiconductor layer overlaps the first region and then the hollow part is formed in the interlayer insulating film, a residue which causes two of the data signal lines to short-circuit can be exposed without exposing the scan signal lines. Accordingly, thus exposed residue can be cut off or separated, for example, in forming pixel electrodes by patterning. That is, even when the two of the data signal lines short-circuit on the scan signal line due to a residue (residual metal, residual semiconductor layer, or a stacked substance of these), the short circuit can be fixed by cutting off or removing the residue without exposing the scan signal line (i.e., while leaving the gate insulating film on the scan signal line) in subsequent production processes.

An active matrix substrate according to the present invention includes: pixel regions which are provided in a line direction in which scan signal lines extend and in a column direction; data signal lines which extend in the column direction; storage capacitor lines which extend in the line direction; a gate insulating film which covers the storage capacitor lines and the scan signal lines; and an interlayer insulating film which covers the data signal lines, two of the data signal lines being provided so that (i) the two of the data signal lines and a gap between respective two of the pixel regions which are adjacent to each other in the line direction overlap each other or (ii) the two of the data signal lines and a region which extends along the gap overlap each other, the interlayer insulating film having a hollow part so that the hollow part and a gap between the two of the data signal lines overlap each other, and part of the hollow part and the storage capacitor lines overlap each other via the gate insulating film. Note that, in each of the storage capacitor lines, a region corresponding to a region under the hollow part is referred to as a second region, and regions adjacent to the second regions in the line direction are referred to as second adjacent regions.

According to the configuration, for example, when a semiconductor layer is provided on the gate insulting film so that the semiconductor layer overlaps the second region and then the hollow part is formed in the interlayer insulating film, a residue which causes two of the data signal lines to short-circuit can be exposed without exposing the storage capacitor lines. Accordingly, thus exposed residue can be cut off, for example, in forming pixel electrodes by patterning. That is, even when the two of the data signal lines short-circuit on the storage capacitor line due to a residue (residual metal, residual semiconductor layer, or a stacked substance of these), the short circuit can be fixed by cutting off or removing the residue without exposing the storage capacitor line (i.e., while leaving the gate insulating film on the storage capacitor line) in subsequent production processes.

According to the active matrix substrate of the present invention, the hollow part can be shaped so as to extend along the two of the data signal lines.

According to the active matrix substrate of the present invention, a semiconductor layer can be provided so that the semiconductor layer and the first adjacent regions overlap each other. Moreover, a semiconductor layer can be provided so that the semiconductor layer and the second adjacent regions overlap each other.

According to the active matrix substrate of the present invention, the gate insulating film can have a thickness which is thinner in a region above the first region than in the region above first adjacent regions. In this case, the gate insulating film in the region above the first adjacent regions can be made up of a plurality of insulating films. Moreover, the gate insulating film in the region above the first adjacent regions can be made up of an inorganic insulating film and an organic insulating film, and the gate insulating film in the region above the first region can be made up of (i) only an organic insulating film or (ii) an inorganic insulating film and an organic insulating film. Moreover, the gate insulating film can have a thickness which is thinner in a region above an active element forming region than in the region above the first adjacent regions.

According to the active matrix substrate of the present invention, the gate insulating film can have a thickness which is thinner in a region above the second region than in a region above the second adjacent regions. In this case, the gate insulating film in the region above the second adjacent regions can be made up of a plurality of insulating films. Moreover, the gate insulating film in the region above the second adjacent regions can be made up of an inorganic insulating film and an organic insulating film; and the gate insulating film in the region above the second region can be made up of (i) only an organic insulating film or (ii) an inorganic insulating film and an organic insulating film. Moreover, the gate insulating film can have a thickness which is thinner in a region above an active element forming region than in the region above the second adjacent regions.

According to the active matrix substrate of the present invention, the gate insulating film in the region above the first adjacent regions can include an insulating film which can be formed by application. Moreover, the gate insulating film in the region above the second adjacent regions can include an insulating film which can be formed by application. Note that the insulating film which can be formed by application can be made of a SOG (spin-on glass) material.

According to the active matrix substrate of the present invention, the interlayer insulating film can be made up of a plurality of insulating films. In this case, the interlayer insulating film can include an inorganic insulating film and an organic insulating film.

According to the active matrix substrate of the present invention, the organic insulating film can contain at least one of an acrylic resin, an epoxy resin, a polyimide resin, a polyurethane resin, a novolac resin, and a siloxane resin.

According to the active matrix substrate of the present invention, it is possible that a pixel electrode is provided in each of the pixel regions, and the two of the data signal lines are connected to an identical pixel electrode via a corresponding transistor.

According to the active matrix substrate of the present invention, it is possible that a pixel electrode is provided in each of the pixel regions, and the two of the data signal lines are connected to respective pixel electrodes of different pixel regions via a corresponding transistor.

According to the active matrix substrate of the present invention, it is possible that a plurality of pixel electrodes are provided in each of the pixel regions, and the plurality of pixel electrodes are connected to an identical data signal line via a corresponding transistor.

According to the active matrix substrate of the present invention, the semiconductor layer overlapping the first adjacent regions can be provided so as to bridge over a corresponding one of the scan signal lines. Moreover, the semiconductor layer overlapping the second adjacent regions can be provided so as to bridge over a corresponding one of the storage capacitor lines.

A production method of an active matrix substrate of the present invention, in which pixel regions are provided in a line direction in which scan signal lines extend and in a column direction, includes the steps of: (a) providing (i) the scan signal lines, (ii) a gate insulating film which covers the scan signal lines, (iii) a channel of a transistor on the gate insulating film, and (iv) two of data signal lines so that the two of the data signal lines and a gap between respective two of the pixel regions which are adjacent to each other in the line direction overlap each other or so that the two of the data signal lines and a region which extends along the gap overlap each other; (b) providing an interlayer insulating film which covers the data signal lines, and causing the interlayer insulating film to have a hollow part so that the hollow part and a gap between the two of the data signal lines overlap each other and so that the hollow part and the scan signal lines overlap each other; and (c) providing a transparent conductive film on the interlayer insulating film and inside the hollow part, and then forming pixel electrodes by patterning the transparent conductive film, in the step (a), a semiconductor layer being provided, before the data signal lines are provided, in each of the scan signal lines so that the semiconductor layer and a first region overlap each other, the first region corresponding to a region under the hollow part.

A production method of an active matrix substrate of the present invention, in which pixel regions provided in a line direction in which scan signal lines extend and in a column direction, includes the steps of: (a) providing (i) the scan signal lines, (ii) storage capacitor lines, (iii) a gate insulating film which covers the scan signal lines and the storage capacitor lines, (iv) a channel of a transistor on the gate insulating film, and (v) two of data signal lines so that the two of the data signal lines and a gap between respective two of the pixel regions which are adjacent to each other in the line direction overlap each other or so that the two of the data signal lines and a region which extends along the gap overlap each other; (b) providing an interlayer insulating film which covers the data signal lines and causing the interlayer insulating film to have a hollow part so that the hollow part and a gap between the two of the data signal lines overlap each other and so that the hollow part and the storage capacitor lines overlap each other; and (c) providing a transparent conductive film on the interlayer insulating film and inside the hollow part, and then forming pixel electrodes by patterning the transparent conductive film, in the step (a), a semiconductor layer being provided, before the data signal lines are provided, in each of the storage capacitor lines so that the semiconductor layer and a second region overlap each other, the second region corresponding to a region under the hollow part.

According to the production method of the active matrix substrate of the present invention, in the step (c), a conductive residue, exposed in the gap between the two of the data signal lines, can be etched at the same time that the transparent conductive film is patterned. In this case, the production method can further include the step of (d) etching, after the step (c), the semiconductor layer exposed in the gap between the two of the data signal lines. Moreover, in the step (a), one part of the semiconductor layer can unintentionally remain under the conductive residue and the other of the semiconductor layer can be intentionally formed. Moreover, the semiconductor layer which unintentionally remains, in the step (a), under the gap between the two data signal lines can be etched during forming the hollow part in the step (b).

A production method of an active matrix substrate of the present invention, in which pixel regions are provided in a line direction in which scan signal lines extend and in a column direction, includes the steps of: (a) providing (i) the scan signal lines, (ii) a gate insulating film which covers the scan signal lines, (iii) a channel of a transistor on the gate insulating film, and (iv) two of data signal lines so that the two of the data signal lines and a gap between respective two of the pixel regions which are adjacent to each other in the line direction overlap each other or so that the two of the data signal lines and a region which extends along the gap overlap each other; (b) providing an interlayer insulating film which covers the data signal lines, and causing the interlayer insulating film to have a hollow part so that the hollow part and a gap between the two of the data signal lines overlap each other and so that the hollow part and the scan signal lines overlap each other; and (c) providing a transparent conductive film on the interlayer insulating film and inside the hollow part, and then forming pixel electrodes by patterning the transparent conductive film, in the step (a), the gate insulating film being provided in each of the scan signal lines so as to have a thicker part and a thinner part and so that the thicker part being located above a first region which corresponds to a region under the hollow part.

A production method of an active matrix substrate of the present invention, in which pixel regions provided in a line direction in which scan signal lines extend and in a column direction, includes the steps of: (a) providing (i) the scan signal lines, (ii) storage capacitor lines, (iii) a gate insulating film which covers the scan signal lines and the storage capacitor lines, (iv) a channel of a transistor on the gate insulating film, and (v) two of data signal lines so that the two of the data signal lines and a gap between respective two of the pixel regions which are adjacent to each other in the line direction overlap each other or so that the two of the data signal lines and a region which extends along the gap overlap each other; (b) providing an interlayer insulating film which covers the data signal lines and causing the interlayer insulating film to have a hollow part so that the hollow part and a gap between the two of the data signal lines overlap each other and so that the hollow part and the storage capacitor lines overlap each other; and (c) providing a transparent conductive film on the interlayer insulating film and inside the hollow part, and then forming pixel electrodes by patterning the transparent conductive film, in the step (a), the gate insulating film being provided in each of the storage capacitor lines so as to have a thicker part and a thinner part, and so that the thicker part being located above a second region which corresponds to a region under the hollow part.

According to the production method of the active matrix substrate of the present invention, in the step (c), a conductive residue, exposed in the gap between the two data signal lines, can be etched at the same time that the transparent conductive film is patterned. In this case, the semiconductor layer which unintentionally remains, in the step (a), under the gap between the two data signal lines can be etched during forming the hollow part in the step (b). Moreover, the conductive residue can be etched, in the step (c), out of a stacked residue including the conductive residue and the semiconductor layer which unintentionally remains, in the step (a), under the gap between the two data signal lines. Moreover, the production method can further include the step of (d) etching the semiconductor layer out of the stacked residue. Moreover, in the step (a), the thinner part can be located under the channel of the transistor.

A liquid crystal panel of the present invention includes the active matrix substrate and a substrate including a common electrode. A liquid crystal display unit of the present invention includes the liquid crystal panel and a driver. A liquid crystal display device of the present invention includes the liquid crystal display unit and a light source device. A television receiver of the present invention includes the liquid crystal display device and a tuner section which receives television broadcasting.

According to the active matrix substrate of the present invention in which two of data signal lines are provided so that (i) the two of the data signal lines and a gap between respective two of pixel regions which are adjacent to each other overlap each other or (ii) the two of the data signal lines and a region which extends along the gap overlap each other, even when the two of the close data signal lines short-circuit on the scan signal line or the storage capacitor line due to a residue (residual metal, residual semiconductor layer, or a stacked substance of these), the short circuit can be fixed by cutting off or removing the residue without exposing the scan signal line or the storage capacitor line (i.e., while leaving the gate insulating film on the scan signal line) in subsequent production processes.

BRIEF DESCRIPTION OF DRAWINGS

FIG. 9 is a process drawing illustrating part of the production method of the active matrix substrate according to the second embodiment.

FIG. 14 is a cross-sectional view of the active matrix substrate according to the first embodiment: (a) and (b) are cross-sectional views taken along the line a-a in FIG. 1; (c) and (d) are cross-sectional views taken along the line b-b in FIG. 1, and (e) and (f) are cross-sectional views taken along the line c-c in FIG. 1.

FIG. 26 is a plan view illustrating a configuration of a liquid crystal panel of the present invention.

FIG. 27 is a cross-sectional view illustrating a partial configuration in a pixel region of the liquid crystal panel of the present invention.

FIG. 29 is a cross-sectional view of the active matrix substrate shown in FIG. 28: (a) and (b) are cross-sectional views taken along the line v-v in FIG. 28; (c) and (d) are cross-sectional views taken along the line z-z in FIG. 28, and (e) and (f) are cross-sectional views taken along the line w-w in FIG. 28.

Figure 1:
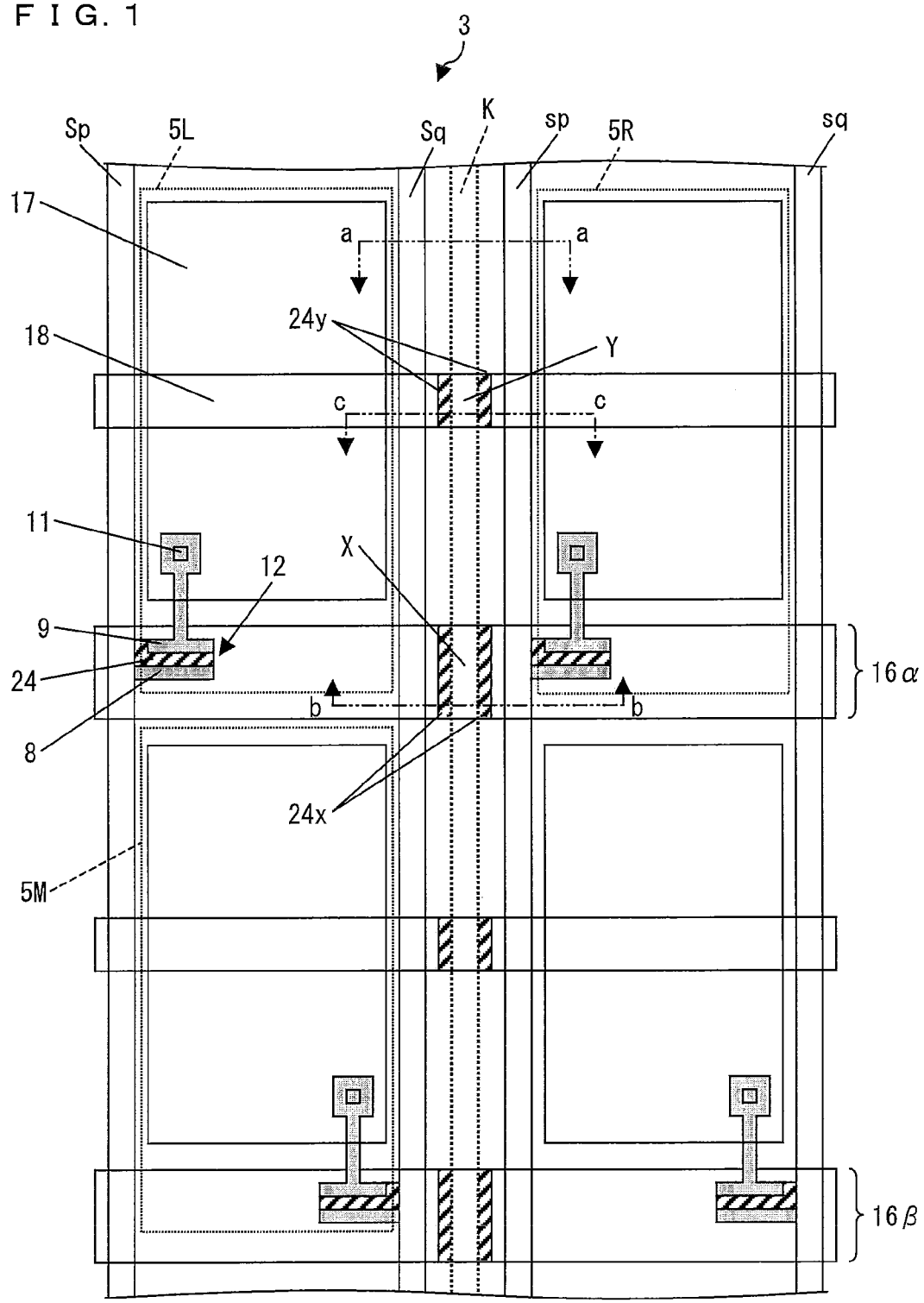
FIG. 1 is a plan view illustrating a configuration of an active matrix substrate according to a first embodiment.

REFERENCE SIGNS LIST 3 and 103: Active matrix substrate
5L, 5R, and 5M: Pixel region
12: Transistor
16α and 16β: Scan signal line
17: Pixel electrode
18: Storage capacitor line
21: Organic gate insulating film
22: Inorganic gate insulating film
24, 24x, and 24y: Semiconductor layer
25: Inorganic interlayer insulating film
26: Organic interlayer insulating film
27: Interlayer insulating film
84: Liquid crystal display unit
601: Television receiver
800: Liquid crystal display device
Sp, Sq, sp, and sq: First and second data signal lines
K: Hollow part
RM: Residual metal
RS: Residual semiconductor layer
X: First region
Y: Second region

DESCRIPTION OF EMBODIMENTS

The following describes an embodiment of the present invention with reference to FIGS. 1 through 31. Note, for convenience, that a line direction indicates a direction in which a scan signal line extends in the following description. Note also that the scan signal line can extend in a lateral or longitudinal direction in accordance with a manner of utilizing (or viewing) a liquid crystal display device (or an active matrix substrate for use in the liquid crystal display device) of the present embodiment.

First Embodiment

FIG. 1 is a plan view illustrating a configuration example of an active matrix substrate in accordance with the present embodiment. As shown in FIG. 1, according to an active matrix substrate 3 of the present embodiment, first and second data signal lines are provided on both sides of each of pixel region columns. That is, two of the data signal lines are provided so that (i) the two of the data signal lines and (ii) a gap between respective two of pixel regions which are adjacent to each other in the line direction (i.e., a gap between two adjacent pixel region columns) overlap each other. Further, the two of the data signal lines are adjacent to each other so that no pixel region is provided therebetween. A pixel electrode included in a corresponding one of the pixel regions in each of the pixel region columns is connected, via a transistor, to (i) a scan signal line and (ii) the first or second data signal line. Specifically, in pixel regions on second and subsequent lines of each of the pixel region columns, pixel electrodes of respective adjacent pixel regions are connected to respective different data signal lines (first or second data signal line).

For example, a first data signal line Sp is provided on one side of a pixel region 5L, and a second data signal lines Sq is provided on the other side of the pixel region 5L. A first data signal line sp is provided on one side of a pixel region 5R which is adjacent to the pixel region 5L in the line direction, and a second data signal line sq is provided on the other side of the pixel region 5R. That is, the data signal lines Sq and sp are provided so that (i) the data signal lines Sq and sp and (ii) a gap between the pixel regions 5L and 5R overlap each other, and the data signal lines Sq and sp are adjacently provided so that no pixel region is provided therebetween. The pixel regions 5R and 5L have an identical configuration. For example, in the pixel region 5L, a source electrode 8 and a drain electrode 9 of a transistor 12 are provided on a scan signal line 16α via a semiconductor layer 24. This allows the scan signal line 16α to serve as a gate electrode of the transistor 12. Note that the source electrode 8 is connected to the first data signal line Sp and the drain electrode 9 is connected to a pixel electrode 17 via a contact hole 11.

Further, each storage capacitor line which extends in the line direction is provided on the active matrix substrate 3 so as to pass across a corresponding one of the pixel regions. For example, a storage capacitor line 18 and each of the pixel regions 5R and 5L define a storage capacitor. Note that the first and second data signal lines Sp and Sq are provided so as to extend on both sides of a pixel region 5M which is adjacent to the pixel region 5L in the column direction. A pixel electrode provided in the pixel region 5M is connected to a scan signal line 16β and the data signal line Sq, via a transistor.

According to a liquid crystal display device including the active matrix substrate 3, two scan signal lines are selected simultaneously so that writing operations are simultaneously carried out with respect to respective two pixels provided in an identical pixel column. For example, the scan signal lines 16α and 16β are selected simultaneously, and then (i) a writing operation from the data signal line Sp into the pixel electrode 17 in the pixel region 5L and (ii) a writing operation from the data signal line Sq into the pixel electrode of the pixel region 5M are simultaneously carried out. According to the configuration, it is possible to scan twice the number of scan signal lines during one horizontal scan period, in a case of the same configuration as a case where one (1) scan signal line is selected during one (1) horizontal scan period. It follows that one horizontal scan period can be increased twice in a case where the number of the scan signal lines is identical in the above case. Accordingly, the liquid crystal display device is suitable for double speed driving in which the number of displays (e.g., the numbers of frames, sub-frames, or fields) per unit time can be doubled (e.g., 120 frames per second). Moreover, the liquid crystal display device is suitable for use in a digital-cinema standard display device having 2160 scan signal lines or a Super Hi-Vision (extremely high-definition) display device having 4320 scan signal lines.

According to the active matrix substrate 3, an interlayer insulating film covering the transistor has a groove-like hollow part which is provided so that (i) the hollow part and (ii) a gap, between two adjacent data signal lines between which no pixel region is provided (hereinafter, referred to as two close data signal lines), overlap each other. The hollow part and each of scan signal lines intersect (overlap) each other. (i) The hollow part and (ii) a first region, which corresponds to a region where each of the scan signal lines intersects the hollow part, overlap each other via a gate insulating film. A semiconductor layer is provided in the each of the scan signal lines so that (i) the semiconductor layer and (ii) first adjacent regions which are adjacent, in the line direction, to the first region overlap each other. Moreover, the hollow part and each of storage capacitor lines intersect (overlap) each other. (i) The hollow part and (ii) a second region, which corresponds to a region where each of the storage capacitor lines intersects the hollow part, overlap each other via a corresponding gate insulating film. A semiconductor layer is provided in the each of the storage capacitor lines so that (i) the semiconductor layer and (ii) second adjacent regions which are adjacent, in the line direction, to the second region overlap each other.

For example, the interlayer insulating film has a groove-like hollow part K so that the hollow part K and a gap between the two close data signal lines Sq and sp overlap each other. The hollow part K and a scan signal line 16α intersect each other. (i) The hollow part K and (ii) a first region X, which corresponds to a region where the scan signal line 16α intersects the hollow part K, overlap each other via a gate insulating film. A semiconductor layer 24x is provided in the scan signal line 16α so that (i) the semiconductor layer 24x and (ii) first adjacent regions which are adjacent, in the line direction, to the first region X overlap each other. Moreover, the hollow part K and a storage capacitor line 18 intersect each other. (i) The hollow part K and (ii) a second region Y, which corresponds to a region where the storage capacitor line 18 intersects the hollow part K, overlap each other via a gate insulating film. A semiconductor layer 24y is provided in the storage capacitor line 18 so that (i) the semiconductor layer 24y and (ii) second adjacent regions which are adjacent, in the line direction, to the second region Y overlap each other.

(a) and (b) of FIG. 14 illustrate examples of respective cross-sectional views taken along the line a-a in FIG. 1. Note that (a) of FIG. 14 is a cross-sectional view of a region where no residual film exists (no residual metal exists) between data signal lines Sq and sp during production processes, and (b) of FIG. 14 is a cross-sectional view of a region where a residual film exists (a residual metal exists) between the data signal lines Sq and sp during production processes. According to the cross-sections of the active matrix substrate 3 shown in (a) and (b) of FIG. 14, an inorganic gate insulating film 22 is provided in a substrate (transparent insulating substrate) 31 and the two close data signal lines Sq and sp are provided on the inorganic gate insulating film 22. An interlayer insulating film 27 is provided so as to cover the data signal lines Sq and sp, and the interlayer insulating film 27 has a groove-like hollow part K so that the hollow part K and a gap between the data signal lines Sq and sp overlap each other. In (a) of FIG. 14, no inorganic gate insulating film exists under the hollow part K. In (b) of FIG. 14, the inorganic gate insulating film 22 is provided under the hollow part K and a residual metal RM is cut off by the hollow part K. Note that pixel electrodes 17 are provided on the interlayer insulating film 27.

(c) and (d) of FIG. 14 illustrate examples of respective cross-sectional views taken along the line b-b in FIG. 1. Note that (c) of FIG. 14 is a cross-sectional view of a region where no residual film exists (no residual metal exists) between the data signal lines Sq and sp during production processes, and (d) of FIG. 14 is a cross-sectional view of a region where a residual film exists (a residual metal exists) between the data signal lines Sq and sp during production processes. According to the cross-sections of the active matrix substrate 3 shown in (c) and (d) of FIG. 14, an inorganic gate insulating film 22 is provided so as to cover a scan signal line 16α provided in a substrate 31, and the two close data signal lines Sq and sp are provided on the inorganic gate insulating film 22. An interlayer insulating film 27 is provided so as to cover the data signal lines Sq and sp, and the interlayer insulating film 27 has a groove-like hollow part K so that the hollow part K and a gap between the data signal lines Sq and sp overlap each other. In (c) of FIG. 14, the inorganic gate insulating film 22 is provided under the hollow part K (i.e., in a first region), and the inorganic gate insulating film 22 and semiconductor layers 24x are provided on both sides of the first region (i.e., in first adjacent regions). In (d) of FIG. 14, the inorganic gate insulating film 22 is provided under the hollow part K (i.e., in a first region), the inorganic gate insulating film 22 and the semiconductor layer 24x are provided on both sides of the first region (i.e., in first adjacent regions), and a residual metal RM is cut off by the hollow part K.

(e) and (f) of FIG. 14 illustrate examples of respective cross-sectional views taken along the line c-c in FIG. 1. Note that (e) of FIG. 14 is a cross-sectional view of a region where no residual film exists (no residual metal exists) between the data signal lines Sq and sp during production processes, and (f) of FIG. 14 is a cross-sectional view of a region where a residual film exists (a residual metal exists) between the data signal lines Sq and sp during production processes. According to the cross-sections of the active matrix substrate 3 shown in (e) and (f) of FIG. 14, an inorganic gate insulating film 22 is provided so as to cover a storage capacitor line 18 provided in a substrate 31, and the two close data signal lines Sq and sp are provided on the inorganic gate insulating film 22. An interlayer insulating film 27 is provided so as to cover the data signal lines Sq and sp, and the interlayer insulating film 27 has a groove-like hollow part K so that the hollow part K and a gap between the data signal lines Sq and sp overlap each other. In (e) of FIG. 14, the inorganic gate insulating film 22 is provided under the hollow part K (i.e., in a second region), and the inorganic gate insulating film 22 and semiconductor layers 24y are provided on both sides of the second region (i.e., in second adjacent regions). In (f) of FIG. 14, the inorganic gate insulating film 22 is provided under the hollow part K (i.e., in a second region), the inorganic gate insulating film 22 and the semiconductor layer 24y are provided on both sides of the second region (i.e., in second adjacent regions), and a residual metal RM is cut off by the hollow part K. Note that pixel electrodes 17 are provided on the interlayer insulating film 27.

Figure 2:
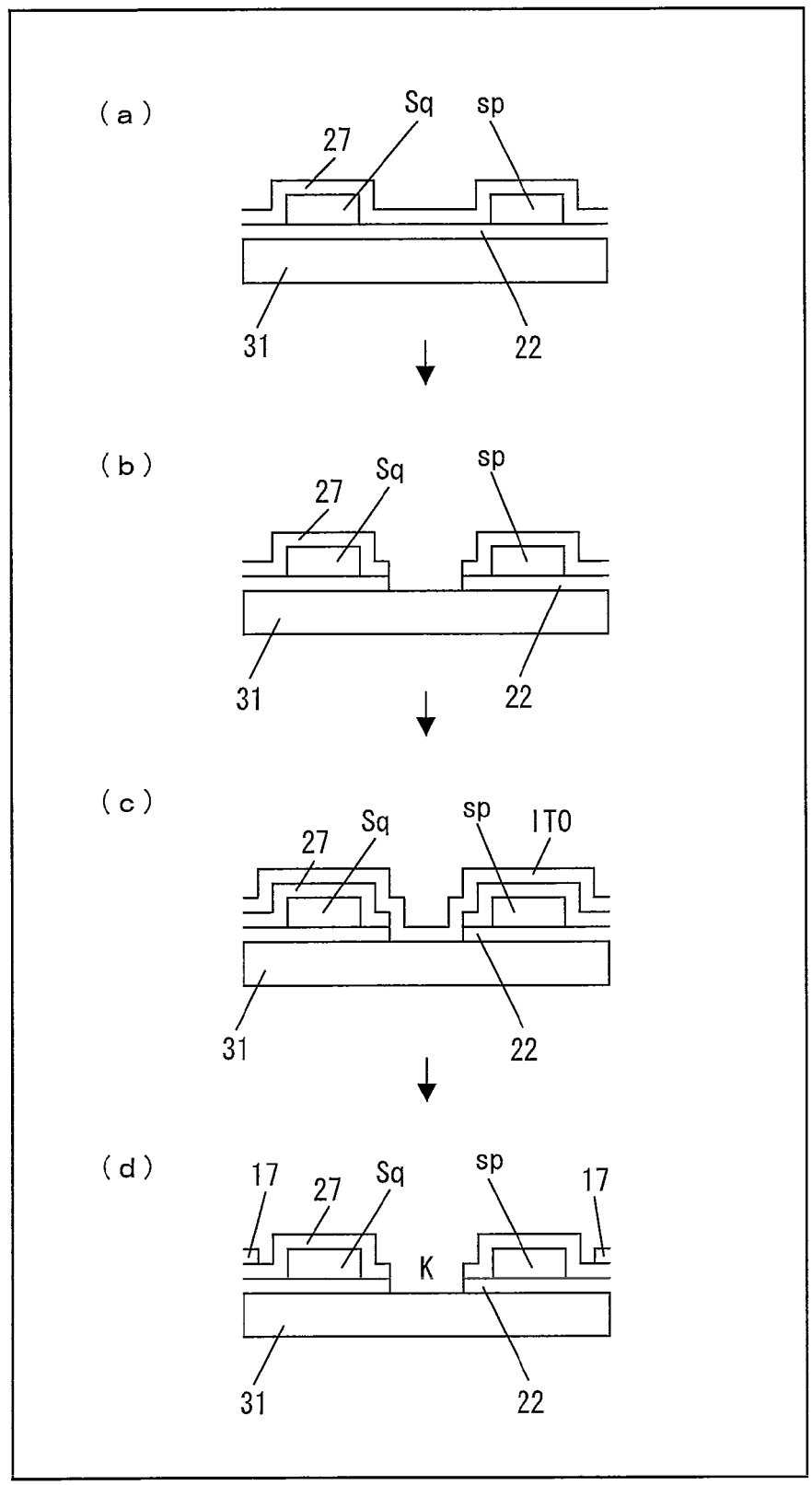
FIG. 2 is a process drawing illustrating part of a production method of the active matrix substrate according to the first embodiment.
Figure 3:
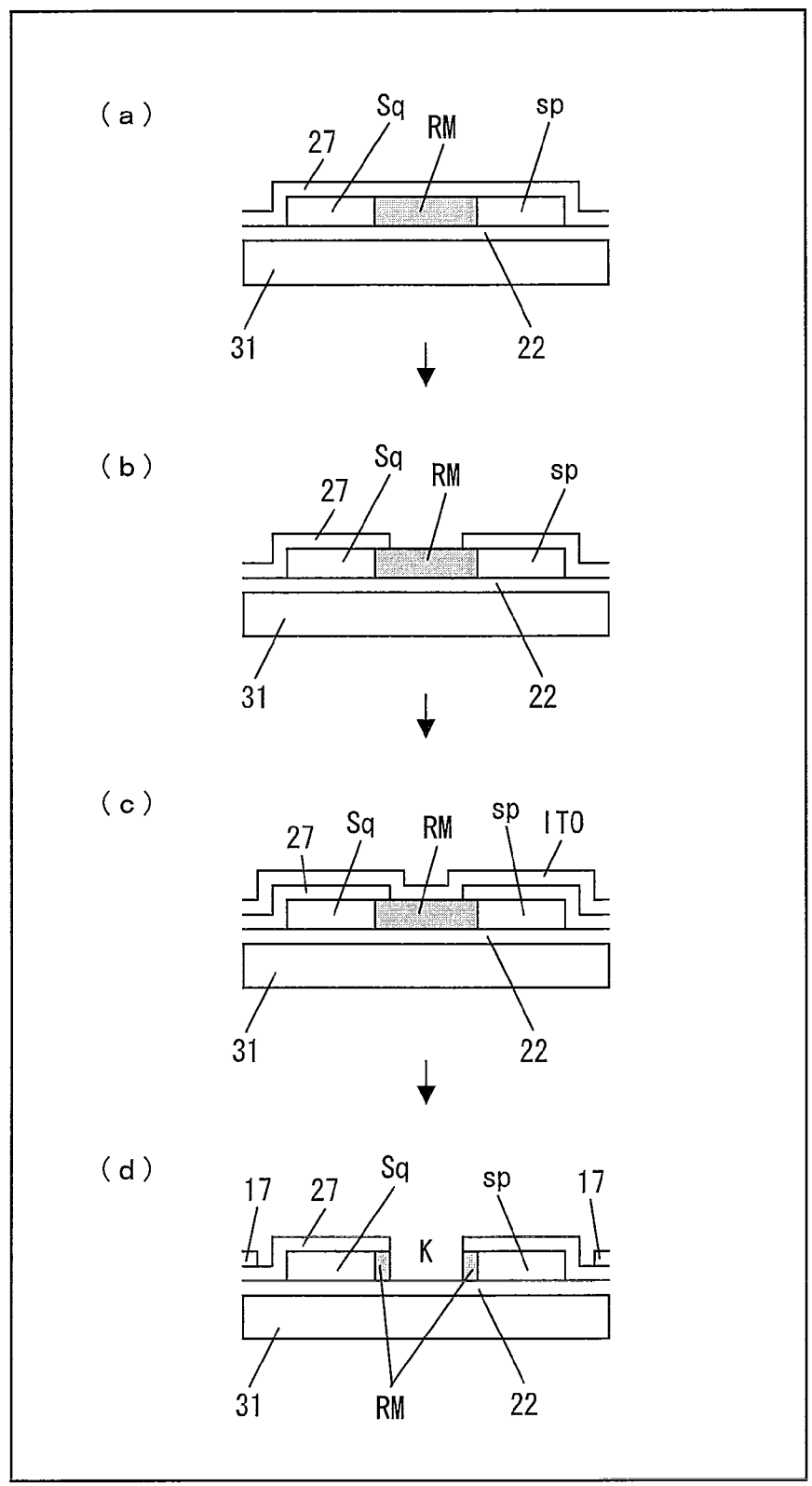
FIG. 3 is a process drawing illustrating part of the production method of the active matrix substrate according to the first embodiment.
Figure 4:
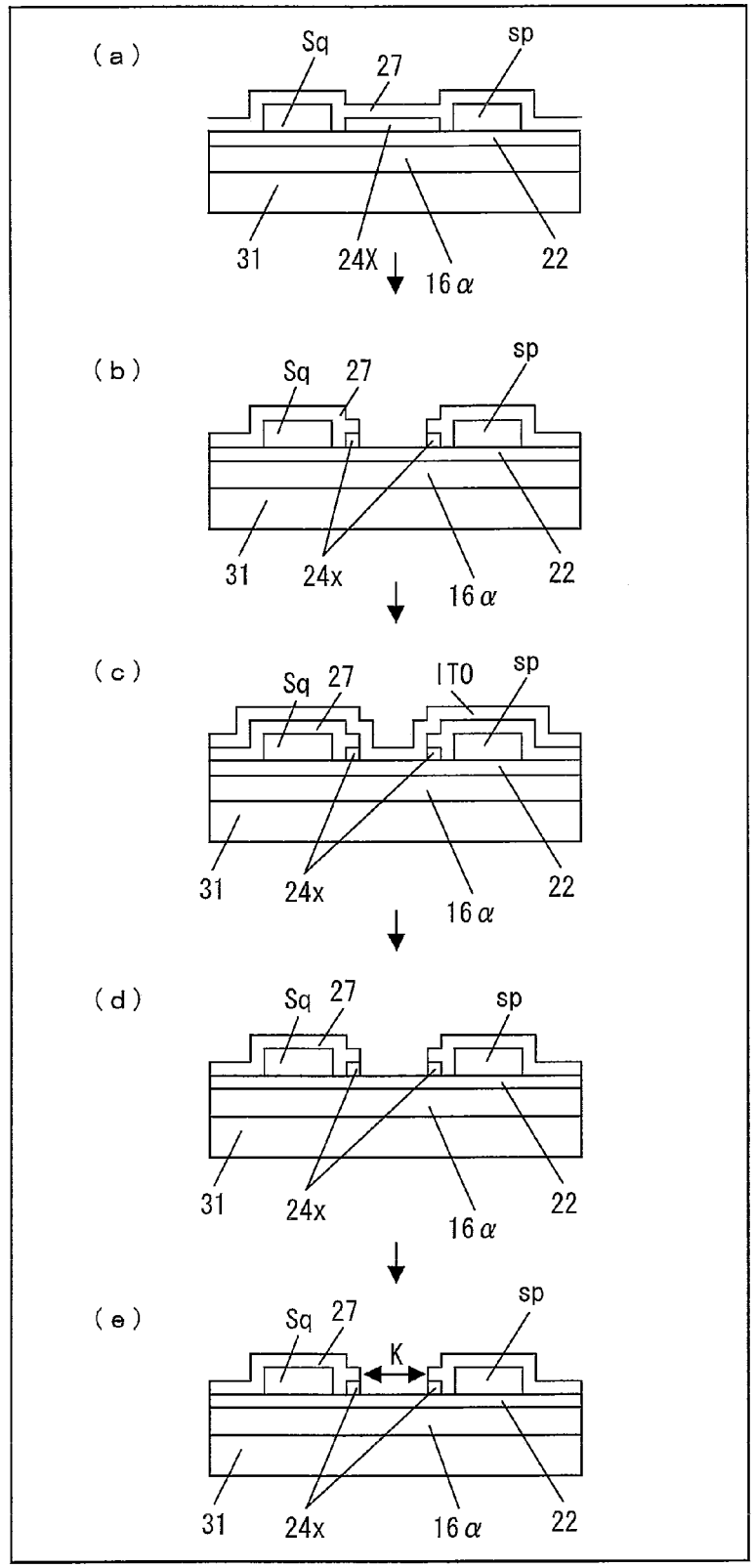
FIG. 4 is a process drawing illustrating part of the production method of the active matrix substrate according to the first embodiment.
Figure 5:
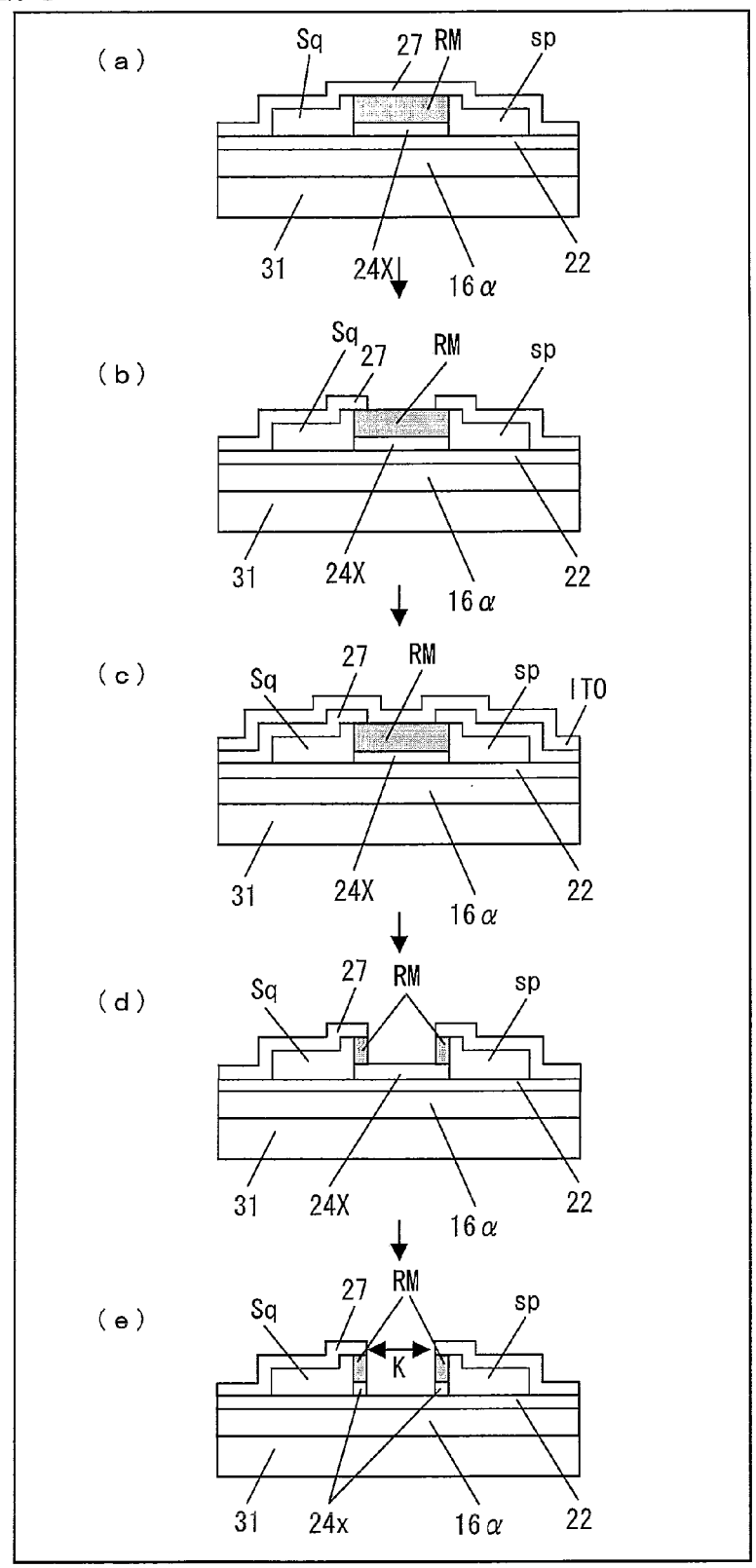
FIG. 5 is a process drawing illustrating part of the production method of the active matrix substrate according to the first embodiment.
Figure 6:
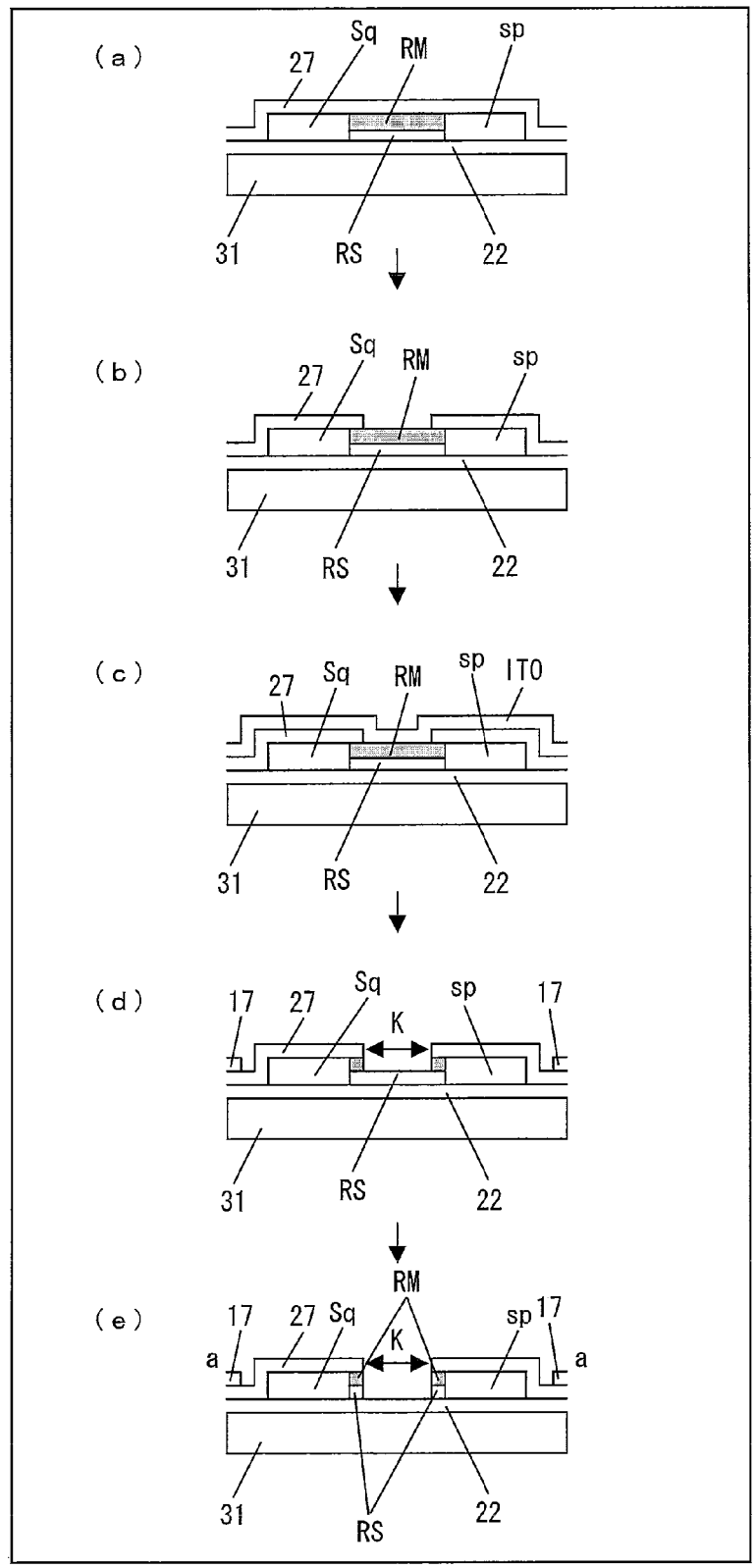
FIG. 6 is a process drawing illustrating part of the production method of the active matrix substrate according to the first embodiment.
Figure 7:
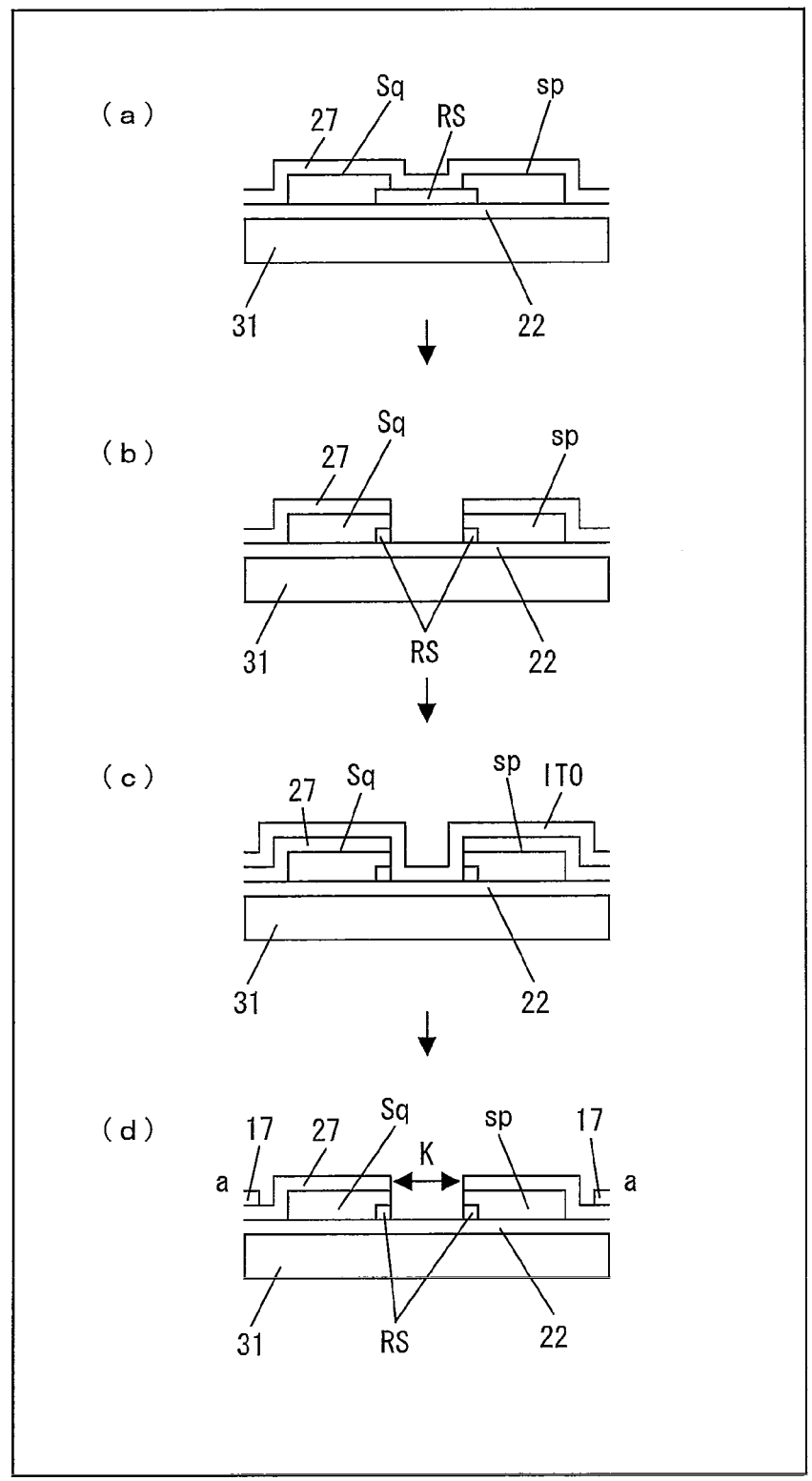
FIG. 7 is a process drawing illustrating part of the production method of the active matrix substrate according to the first embodiment.

The following describes a production method of the active matrix substrate 3 with reference to FIGS. 1 through 5. (a) through (d) of FIG. 2 illustrate a process of manufacture in a region (a region where no residual metal RM exists between the data signal lines Sq and sp) taken along the line a-a in FIG. 1. (a) through (d) of FIG. 3 illustrate a process of manufacture in a region (a region where a residual metal RM exists between the data signal lines Sq and sp) taken along the line a-a in FIG. 1. (a) through (e) of FIG. 4 illustrate a process of manufacture in a region (a region where no residual metal RM exists between the data signal lines Sq and sp) taken along the line b-b in FIG. 1. (a) through (e) of FIG. 5 illustrate a process of manufacture in a region (a region where a residual metal RM exists between the data signal lines Sq and sp) taken along the line b-b in FIG. 1.

In producing the active matrix substrate 3, first, a laminated film of Ti/Al/Ti is deposited on a transparent insulating substrate 31 such as a glass by spattering. Then, the laminated film is subjected to photolithography, dry etching, and resist removing in this order. This allows a scan signal line 16α, etc. and a storage capacitor line 18 to be formed simultaneously.

Then, an inorganic gate insulating film 22, an active semiconductor layer, and a low-resistance n-type semiconductor layer are deposited, in this order, by CVD so as to cover the scan signal line 16α, etc. and the storage capacitor line 18. The inorganic gate insulating film 22 is made up of an SiNx (silicon nitride) film which (i) is deposited by use of mixed gas containing $SiH_4$ gas, $NH_3$ gas, and $N_2$ gas and (ii) has a thickness of approximately 4000 Å. The active semiconductor layer is made of an amorphous silicon which (i) is deposited by use of mixed gas containing $SiH_4$ gas and $H_2$ gas and (ii) has a thickness of approximately 1500 Å. The low-resistance n-type semiconductor layer (i) is deposited by use of mixed gas containing $SiH_4$ gas, $PH_3$ gas, and $H_2$ gas, (ii) is doped with phosphorus, and (iii) has a thickness of 500 Å.

Then, the semiconductor layers (the active semiconductor layer and the low-resistance n-type semiconductor layer) are subjected to photolithography, dry etching, and resist removing, in this order, so as to prepare an island shaped semiconductor layer. The island shaped semiconductor layer includes a semiconductor layer 24 (see FIG. 1) which is located in a channel part of a transistor (thin film transistor TFT), a semiconductor layer 24X located in a region where a scan signal line and a data signal line (see FIGS. 4 and 5) overlap (intersect) each other, and a semiconductor layer 24Y located in a region where a storage capacitor line and a data signal line overlap (intersect) each other.

Then, a laminated film of Mo/Al/Mo is deposited by spattering. Further, the laminated film is subjected to photolithography and wet etching so that data signal lines Sq and sp, and a source electrode 8 and a drain electrode 9 (including their extraction electrodes) are formed simultaneously. Note that a mixed solution, containing phosphoric acid, nitric acid, and acetic acid, is used as an etchant for the wet etching, for example. Subsequently, the low-resistance n-type semiconductor layer is subjected to etching (source-drain separation etching) so as to remove resist. This allows a TFT to be produced.

Then, an interlayer insulating film 27 is deposited by CVD so as to cover the whole surface of the substrate. A passivation film (inorganic interlayer insulating film) made of SiNx with a thickness of approximately 3000 Å is employed as the interlayer insulating film 27. The passivation film is deposited by use of mixed gas containing $SiH_4$ gas, $NH_3$ gas, and $N_2$ gas. This provides the states shown in each (a) of FIGS. 2 through 5. Note that the residual metal RM shown in each (a) of FIG. 3 and FIG. 5 is, for example, a residual film caused by a defect in patterning during forming of the data signal lines Sq and sp.

Then, the interlayer insulating film 27 and the inorganic gate insulating film 22 are successively subjected to photolithography and dry etching with the use of mixed gas containing $CF_4$ gas and $O_2$ gas. This causes the interlayer insulating film 27 to have: a groove-like hollow part K, the hollow part K and a gap between the two close data signal lines Sq and sp overlapping each other; a contact pattern via which a pixel electrode is electrically connected with a drain electrode; a contact pattern via which a scan signal line is electrically connected with an external extraction terminal; and a contact pattern via which a data signal line is electrically connected with an external extraction terminal (see each (b) of FIGS. 2 through 5).

This makes it possible for the residual metal RM to be exposed between the data signal lines Sq and sp (see (b) of FIG. 3 and (b) of FIG. 5). During the formation of the hollow part K, a semiconductor layer 24X (a semiconductor layer which is located in a region where the scan signal line 16α and the data signal lines Sq and sp overlap each other) on which no residual metal RM exists (see (a) of FIG. 4) is removed by etching. In that case, such a semiconductor layer 24X functions as an etching stopper, and so at least part of the inorganic gate insulating film 22 located under the semiconductor layer 24X remains without being etched (see (b) of FIG. 4). That is, the scan signal line 16α is not exposed. A semiconductor layer in a region where the storage capacitor line and the data signal lines overlap (intersect) each other has a similar function. This causes the storage capacitor line not to be exposed. In contrast, in a region where no semiconductor layer is provided (i.e., a region under which neither data signal lines Sq and sp nor storage capacitor line is provided), both the interlayer insulating film 27 and the gate insulating film 22 are removed during forming of the hollow part K (see (b) of FIG. 2). Note that a semiconductor layer 24X (a semiconductor layer which is located in a region where the scan signal line 16α and the data signal lines Sq and sp overlap each other) on which a residual metal RM exists (see (a) of FIG. 5) remains without being etched (see (b) of FIG. 5).

Then, a transparent conductive film (e.g., an amorphous ITO) is deposited by spattering so that the transparent conductive film covers the whole surface of the substrate including the hollow part K and the various contact patterns (see each (c) of FIGS. 2 through 5). Then, the transparent conductive film is subjected to photolithography and wet etching so as to form a pixel electrode 17. A mixed solution containing phosphoric acid, nitric acid, and acetic acid is used as an etchant for the wet etching, for example. This makes it possible to etch the residual metal RM between the data signal lines Sq and sp at the same time as patterning the transparent conductive film (e.g., an amorphous ITO), and therefore the residual metal RM can be cut off or removed under the hollow part K (see (d) of FIG. 3 and (d) of FIG. 5).

In a case where a residual metal RM occurs in a region where (i) a scan signal line or a storage capacitor line and (ii) a data signal line overlap (intersect) each other, it is highly possible for the semiconductor layer 24S to remain under such a region even though the residual metal RM is removed by etching (see (d) of FIG. 5). In view of the circumstances, the semiconductor layer 24S is subjected to rework etching for removing the semiconductor layer 24X. Specifically, the semiconductor layer 24X is subjected to dry etching with use of mixed gas containing $SF_6$ and HCl. Since the use of the mixed gas makes it possible to secure a selection ratio of the inorganic gate insulating film 22 (SiNx) and the semiconductor layer 24X, the semiconductor layer 24X, exposed in the hollow part K, is etched while the inorganic gate insulating film 22 (see each (d) of FIGS. 2 through 4) exposed in the hollow part K is hardly etched. As such, it is possible to cut off or remove the semiconductor layer 24X under the hollow part K (see (e) of FIG. 5). In view of an etching selection ratio, it is preferable that mixed gas containing $SF_6$ and HCl is used in the rework etching (dry etching). Note, however in the present embodiment, that an inorganic gate insulating film 22 which can keep some thickness is sufficient (a thickness causing the scan signal line or the storage capacitor line not to be exposed is sufficient) even if the semiconductor layer 24X is etched. As such, for example, mixed gas containing $CF_6$ and $O_2$ can be used instead of the mixed gas containing $SF_6$ and HCl.

Note that (a) through (d) of FIG. 3 illustrate cases where only a residual metal RM occurs in a cross-section (where the hollow part K and the scan signal line or the storage capacitor line do not overlap each other) taken along the line a-a in FIG. 1. However, a residual semiconductor layer RS can occur together with a residual metal RM. Even in that case, the residual semiconductor layer RS and the residual metal RM can be cut off or removed under the hollow part K as shown in (a) through (e) of FIG. 6.

That is, the residual metal RM is cut off or removed during patterning of the pixel electrodes, and the residual semiconductor layer RS is cut off or removed during the rework etching (dry etching) which is carried out after the patterning of the pixel electrodes.

In another case, only a residual semiconductor layer RS may occur in a region where (i) the hollow part K and (ii) the scan signal line or the storage capacitor line do not overlap each other. Even in such a case, the processes described above allow the residual semiconductor layer RS to be cut off or removed under the hollow part K (see (a) through (d) of FIG. 7). That is, the residual semiconductor layer RS is cut off or removed during forming of the hollow part K.

As described above, even in a case where two close data signal lines (e.g., Sq and sp) short-circuit on a scan signal line (16α or 16β) or on a storage capacitor line 18 due to a residue (such as a residual metal, a residual semiconductor layer, or their stacked substance), the active matrix substrate 3 makes it possible to prevent the short circuit by cutting off or removing the residue, during the subsequent production processes, without causing the scan signal line (16α or 16β) or the storage capacitor line 18 to be exposed (i.e., while allowing a gate insulating film to be left on the scan signal line or the storage capacitor line).

Note that the semiconductor layer 24X shown in (b) of FIG. 5 is formed so as to be wider than the hollow part K (therefore, the semiconductor layer 24X remains in the first adjacent regions shown in FIG. 1). This intends to prevent the scan signal line 16α from being exposed even when the patterning is displaced (e.g., displaced from an intended position by approximately 0.5 μm to 1.5 μm) during forming of the hollow part K. Similarly, since the semiconductor layer 24y shown in FIG. 1 is intentionally remained in the second adjacent regions, it is possible to prevent the storage capacitor line 18a from being exposed even when the patterning is displaced during forming of the hollow part K. Having said that, in a case where, for example, such displacement does not need to be considered, it is possible to modify the configuration in FIG. 1 so that the semiconductor layer 24x is not remained in the first adjacent regions or so that the semiconductor layer 24y in FIG. 1 is not remained in the second adjacent regions.

Moreover, it is possible to modify the configuration in FIG. 1 so that the semiconductor layers 24x and 24y further extend, from above the first and second adjacent regions, in the column direction. Specifically, the semiconductor layer 24x can be provided so as to bridge over a corresponding one of the scan signal lines 16 and/or the semiconductor layer 24y can be provided so as to bridge over a corresponding one of the storage capacitor lines 18 (see FIG. 30). This makes it possible to prevent the scan signal lines 16 and/or the storage capacitor lines 18 from being exposed even when the scan signal lines 16 and/or the storage capacitor lines 18 have variations in their widths.

Figure 16:
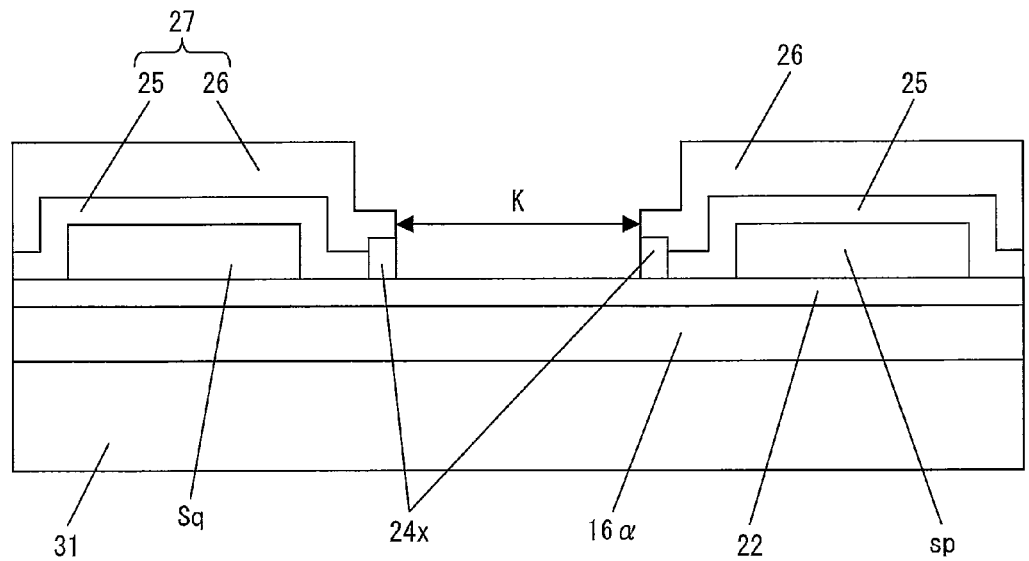
FIG. 16 is a cross-sectional view taken along the line b-b of the active matrix substrate according to the first embodiment.
Figure 18:
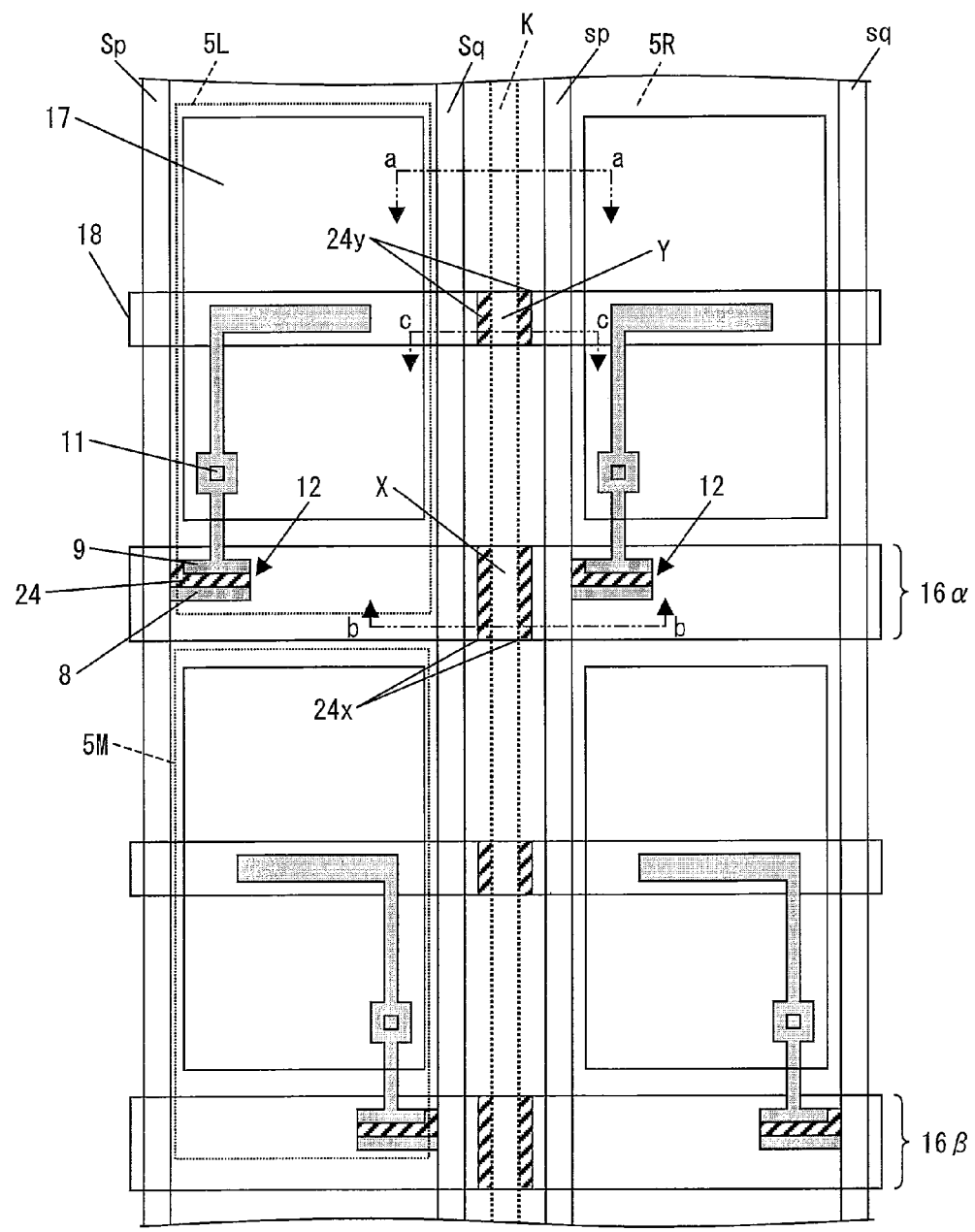
FIG. 18 is a plan view illustrating another configuration of the active matrix substrate according to the first embodiment.

According to the active matrix substrate 3 shown in FIG. 1, the passivation film (inorganic interlayer insulating film) is employed as the interlayer insulating film 27 (see FIG. 4). However, the present embodiment is not limited to this. For example, the interlayer insulating film 27 can be provided so as to include an inorganic interlayer insulating film 25 and an organic interlayer film 26 (see FIG. 16). This allows the interlayer insulating film 27 located above a transistor to be thick. It is therefore possible to prevent a problem that an off-characteristic of the transistor is degraded. Such a problem will occur because the transistor is exposed by removing the interlayer insulating film 27 located above the transistor while the semiconductor layer 24x shown in (d) of FIG. 5 is being subjected to dry etching. Further, the thick interlayer insulating film 27 can provide an additional effect of reducing (i) a parasitic capacity between a pixel electrode (or a drain electrode) and a scan signal line and (ii) a parasitic capacity between the pixel electrode and a data signal line (or a source electrode). Note that, in the case where the interlayer insulating film 27 is provided so as to include the inorganic interlayer insulating film 25 and the organic interlayer insulating film 26 as shown in FIG. 16, the active matrix substrate 3 can be configured as shown in FIG. 18. As shown in FIG. 18, a drain electrode 9 of a transistor 12 is drawn out up to the storage capacitor line 18, and therefore a capacitance (storage capacitance) between the pixel electrode 17 and the storage capacitor line 18 can be secured sufficiently.

Figure 28:
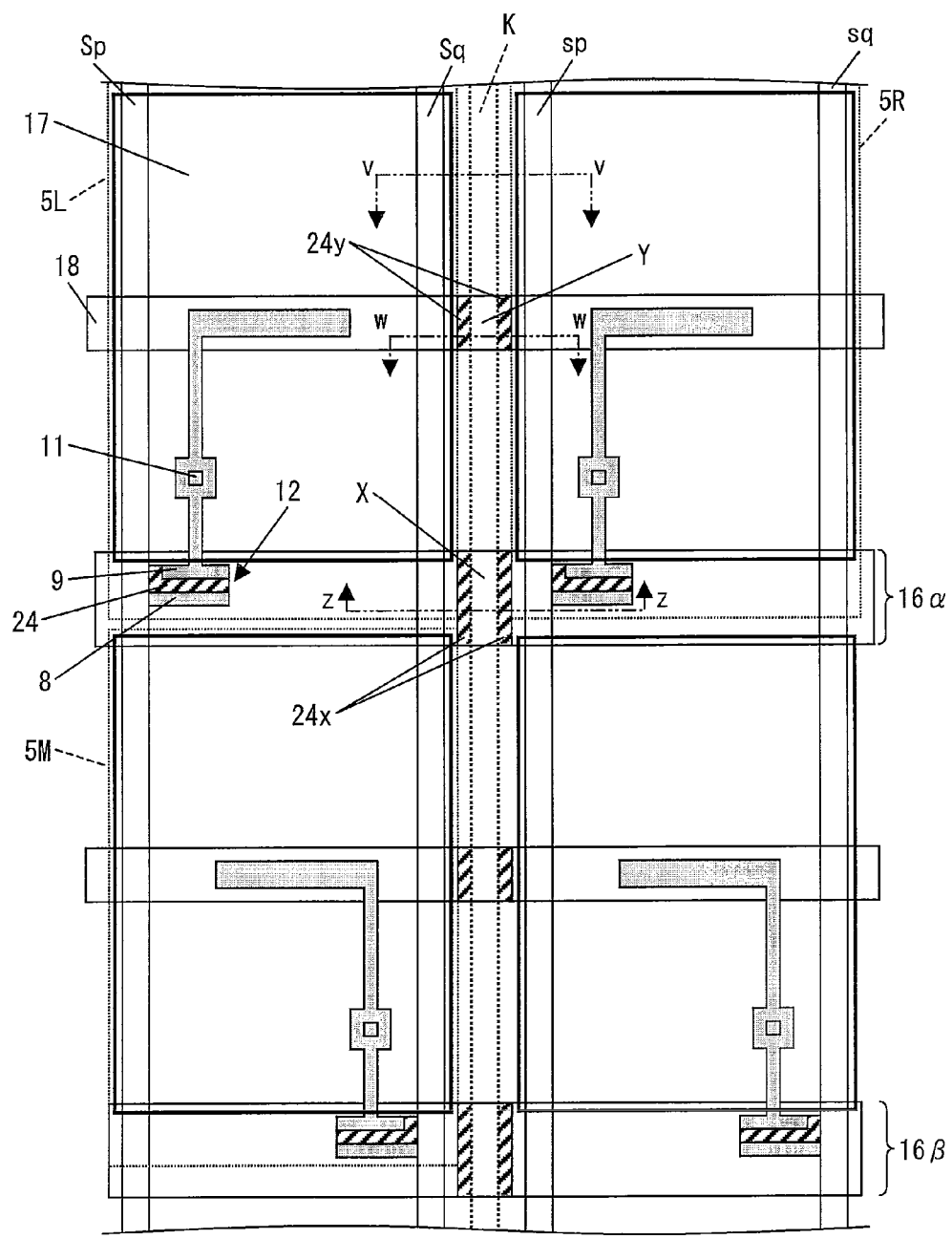
FIG. 28 is a plan view illustrating another configuration of the active matrix substrate according to the second embodiment.
Figure 30:
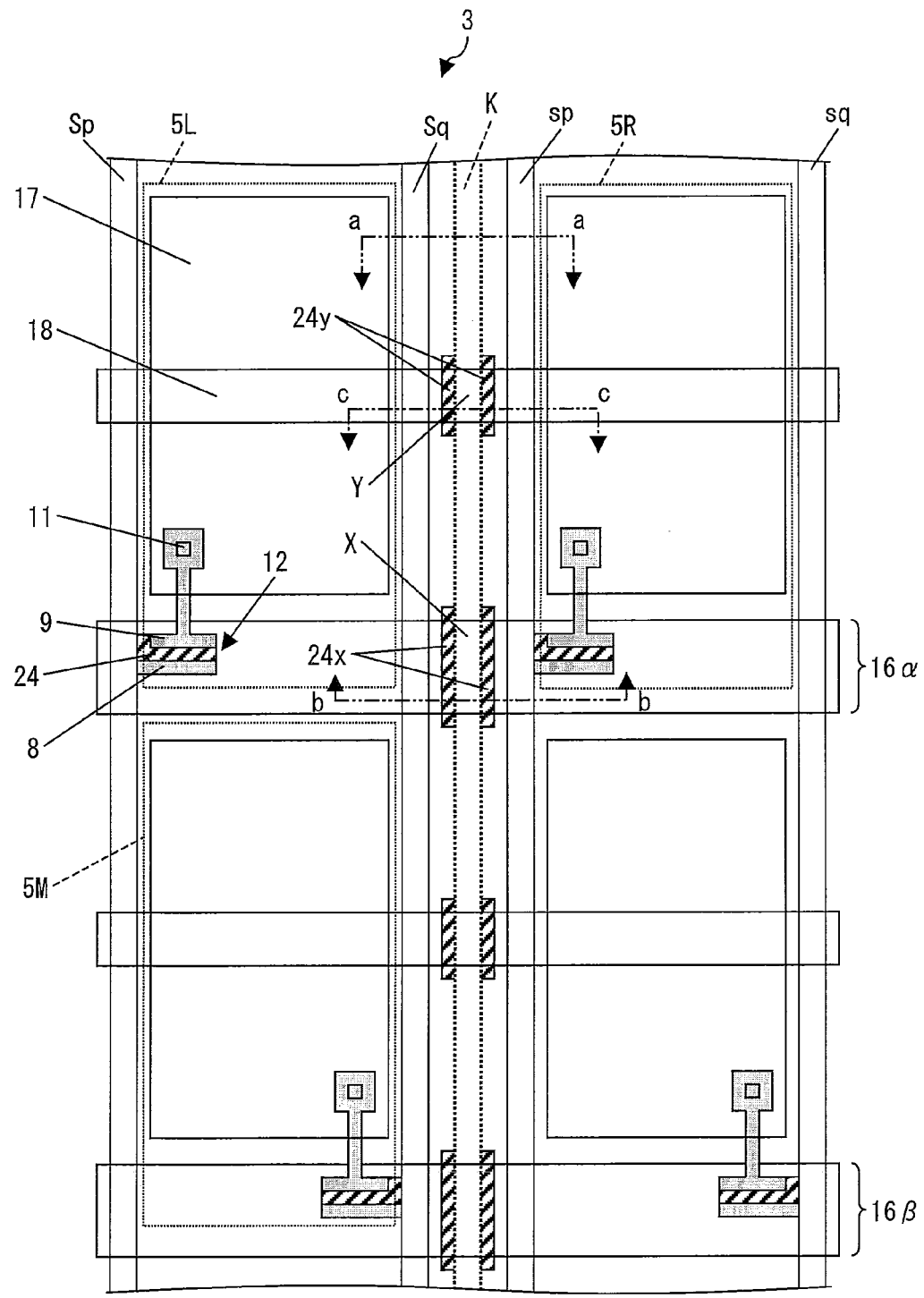
FIG. 30 is a plan view illustrating another configuration of the active matrix substrate according to the first embodiment.
Figure 31:
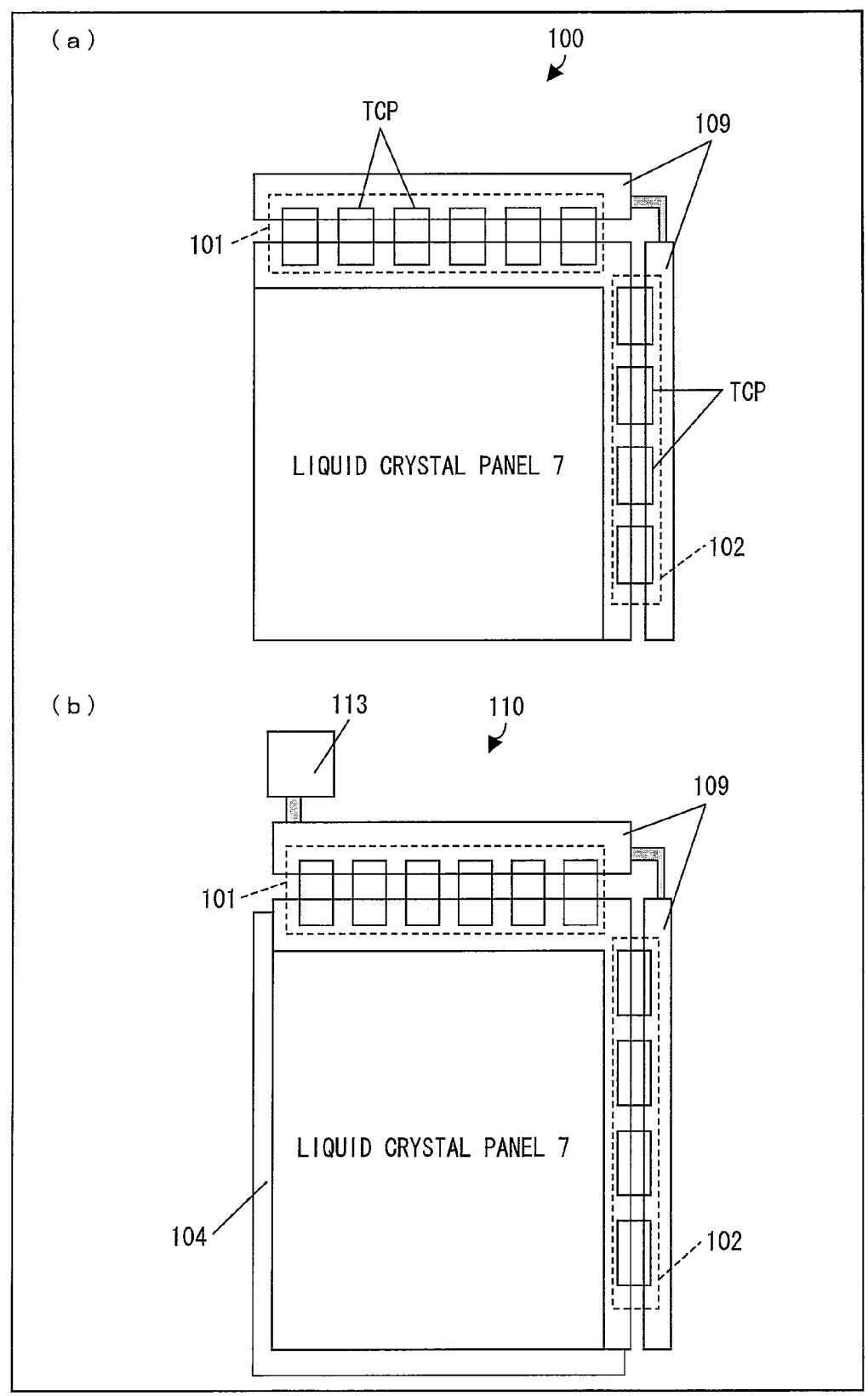
FIG. 31 is a schematic view illustrating a configuration of a liquid crystal display unit and a liquid crystal display device of the present invention: (a) is a schematic view illustrating the liquid crystal display unit and (b) is a schematic view illustrating the liquid crystal display device.

Moreover, in this case, two data signal lines (e.g., Sq and sp) can be provided so that (i) the two data signal lines and (ii) parts of respective two pixel regions (e.g., 5L and 5R) adjacent to each other in the line direction which parts extend along a gap between the two pixel regions overlap each other (see FIG. 28). That is, in each of the pixel regions, a pixel electrode can be extended so that (i) its part (edge part) and (ii) each of a data signal line and a scan signal line (e.g., 16α and 16β) overlap each other.

(a) and (b) of FIG. 29 illustrate respective cross-sectional views taken along the line v-v in FIG. 28. Note that (a) of FIG. 29 is a cross-sectional view of a region where no residual film exists (no residual metal exists) between the data signal lines Sq and sp during production processes, and (b) of FIG. 29 is a cross-sectional view of a region where a residual film exists (a residual metal exists) between the data signal lines Sq and sp during production processes. (e) and (f) of FIG. 29 illustrate cross-sectional views taken along the line w-w in FIG. 28. Note that (e) of FIG. 29 is a cross-sectional view of a region where no residual film exists (no residual metal exists) between the data signal lines Sq and sp during production processes, and (f) of FIG. 29 is a cross-sectional view of a region where a residual film exists (a residual metal exists) between the data signal lines Sq and sp during production processes. (c) and (d) of FIG. 29 illustrate cross-sectional views taken along the line z-z in FIG. 28. Note that (c) of FIG. 29 is a cross-sectional view of a region where no residual film exists (no residual metal exists) between the data signal lines Sq and sp during production processes, and (d) of FIG. 29 is a cross-sectional view of a region where a residual film exists (a residual metal exists) between the data signal lines Sq and sp during production processes.

As shown in FIGS. 28 and 29, in a case where the interlayer insulating film 27 is provided so as to include an inorganic interlayer insulating film 25 and an organic interlayer insulating film 26, (i) a parasitic capacity between a pixel electrode and a scan signal line and (ii) a parasitic capacity between a pixel electrode and a data signal line can be reduced. This allows the pixel electrodes to be extended so that (i) each of the pixel electrodes and (ii) each of the data signal line and the scan signal line overlap each other. This makes it possible to provide the active matrix substrate having an ultrahigh aperture ratio.

The inorganic interlayer insulating film 25 and the organic interlayer insulating film 26 shown in FIG. 16 can be formed, for example, as follows. After forming a transistor (TFT), an inorganic interlayer insulating film (passivation film), made of SiNx, which has a thickness of approximately 3000 Å is formed by CVD, with the use of mixed gas containing $SiH_4$ gas, $NH_3$ gas, and $N_2$ gas, so as to cover the whole surface of the substrate. Then, an organic interlayer insulating film 26, which is made of a positive photosensitive acrylic resin having a thickness of approximately 3 μm, is formed by spin coating or dye coating. The organic interlayer insulating film 26 is subsequently subjected to photolithography so as to form a hollow part K and various contact patterns. Then, dry-etching is consecutively carried out with respect to the inorganic interlayer insulating film 25 and the inorganic gate insulating film 22 with the use of mixed gas containing $CF_4$ gas and $O_2$ gas while the organic interlayer insulating film 26 thus patterned is being used as a mask.

Note that, according to the active matrix substrate of the present embodiment, the organic interlayer insulating film 26 has a thickness of approximately 1.5 μm to 3.0 μm. The organic interlayer insulating film 26 can be made of a material such as a SOG (spin-on glass) material, an epoxy resin, a polyimide resin, a polyurethane resin, or a polysiloxane resin, other than the acrylic resin material. Note that an inorganic insulating film can be used instead of the organic interlayer insulating film 26, provided that such an inorganic insulating film satisfies conditions such as forming conditions and dielectric constant condition.

Figure 20:
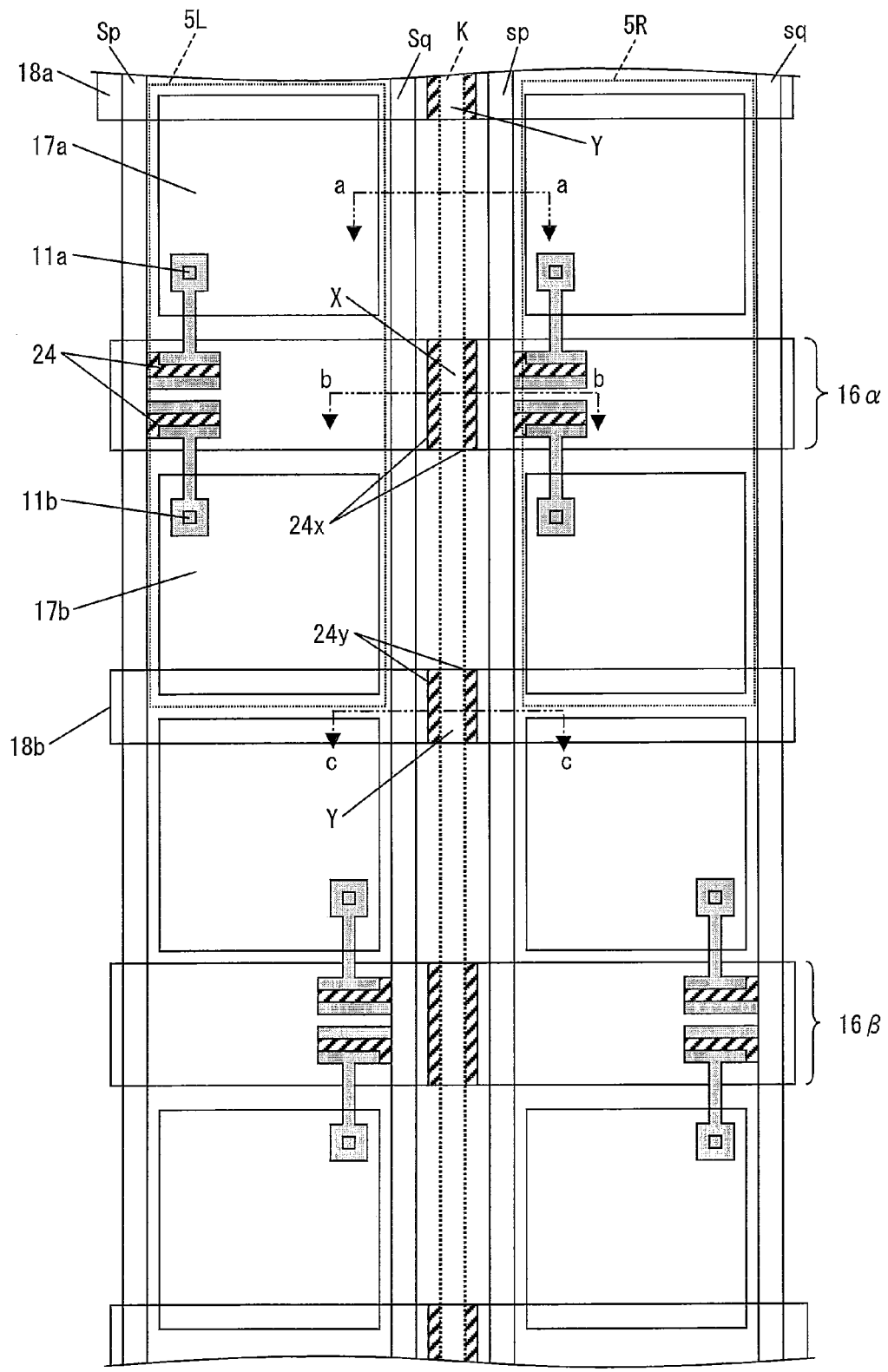
FIG. 20 is a plan view illustrating another configuration of the active matrix substrate according to the first embodiment.

The active matrix substrate 3 shown in FIG. 1 can be modified as shown in FIG. 20. Specifically, two transistors and two pixel electrodes are provided in each pixel region, and the two pixel electrodes are connected to an identical data signal line and an identical scan signal line via the respective two transistors (pixel division method). More specifically, a first data signal line and a second data signal line are provided on both sides of each pixel region column. In any two adjacent pixel regions in an identical pixel region column, one of the any two adjacent pixel regions includes two pixel electrodes which are connected to the first data signal line via a corresponding transistor. The other of the any two adjacent pixel regions includes two pixel electrodes which are connected to the second data signal line via a corresponding transistor. Moreover, two pixel electrodes provided in each pixel region define respective different capacitors (storage capacitors) with respective storage capacitor lines.

For example, a first data signal line Sp is provided on one side of a pixel region 5L, and a second data signal line Sq is provided on the other side of the pixel region 5L, and a first data signal line sp is provided on one side of a pixel region 5R which is adjacent to the pixel region 5L in the line direction and a second data signal line sq is provided on the other side of the pixel region 5R. Further, an interlayer insulating film which covers transistors is has a hollow part K so that the hollow part K and a gap between two close data signal lines Sq and sp overlap each other. Note that arrangements in regions (cross-sections taken by the lines a-a, b-b, and c-c) where the hollow part K and the gap between the two close data signal lines overlap each other and production processes for obtaining the arrangements are the same as those shown in FIG. 1.

According to a liquid crystal display device including the active matrix substrate shown in FIG. 20, the two pixel electrodes provided in each pixel region receive an identical signal potential (electric potential corresponding to a data signal) supplied from an identical data signal line. The two pixel electrodes can have respective different root-mean-square electric potentials when electric potentials of respective two storage capacitor lines are independently controlled while each of the transistor is turning off and after the transistor is turned off, the two storage capacitor lines and the respective two pixel electrodes defining respective capacitors. Specifically, for example, when one of the two storage capacitor lines is controlled so that its potential level positively shifts whereas the other of the two storage capacitor lines is controlled so that its potential level negatively shifts. This allows the liquid crystal display device to express a halftone by causing one pixel to have a high luminance subpixel (bright subpixel) and a low luminance subpixel (dark subpixel). Accordingly, dependence of gamma characteristic with respect to viewing angle (e.g., excess brightness on a screen, etc.) can be improved.

According to a non-pixel dividing active matrix substrate as shown in FIG. 1, it is general that an electric potential of a storage capacitor line is substantially identical to an electric potential (Vcom) of a common electrode provided on a common substrate side. On the other hand, according to a pixel dividing active matrix substrate, an electric potential of each storage capacitor line is presupposed to be controlled. Accordingly, it is necessary to prevent a short circuit from occurring between the storage capacitor line and the common electrode provided on the common substrate side. According to the configuration of the present invention, a storage capacitor is not exposed, and therefore a short circuit is unlike to occur between the storage capacitor line and the common electrode. As such, the configuration of the present embodiment is suitable for use in a pixel dividing active matrix substrate as described above.

Figure 21:
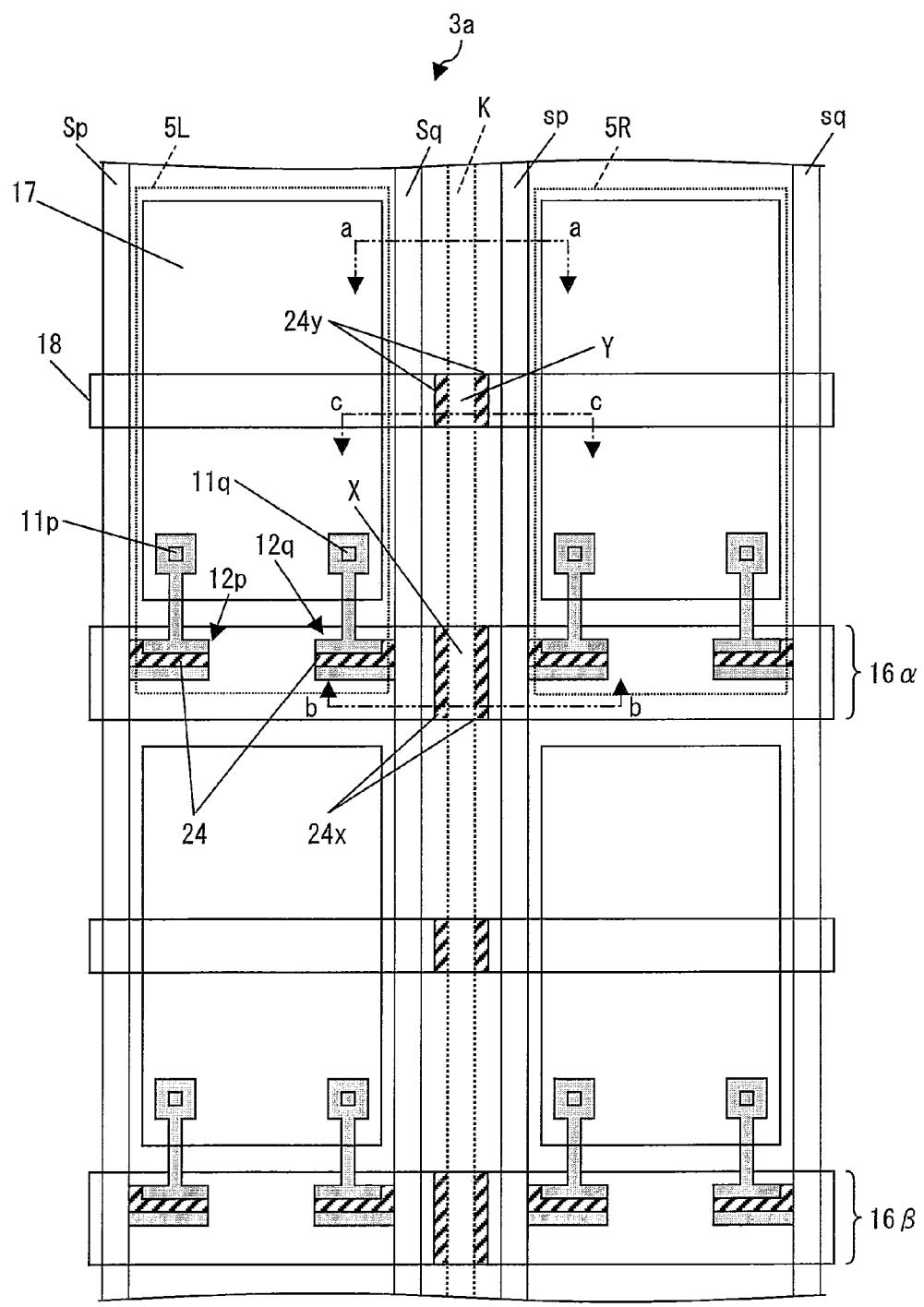
FIG. 21 is a plan view illustrating another configuration of the active matrix substrate according to the first embodiment.

Another active matrix substrate of the present embodiment can be configured as shown in FIG. 21. According to an active matrix substrate 3a shown in FIG. 21, first and second data signal lines are provided on both sides of each pixel region column. A single pixel electrode and two transistors are provided in each of pixel regions, and the single pixel electrode is connected to the first and second data signal lines via the respective transistors.

For example, a first data signal line Sp is provided on one side of a pixel region 5L, and a second data signal line Sq is provided on the other side of the pixel region 5L. A single pixel electrode 17 and two transistors 12p and 12q are provided in the pixel region 5L. The pixel electrode 17 is connected to the first and second data signal lines Sp and Sq via the transistors 12p and 12q, respectively. Further, a first data signal line sp is provided on one side of a pixel region 5R which is adjacent to the pixel region 5L in the line direction, and a second data signal line sq is provided on the other side of the pixel region 5R. Further, an interlayer insulating film which covers the transistors has a hollow part K so that the hollow part K and a gap between two close data signal lines Sq and sp overlap each other. Note that (i) arrangements in regions (cross-sections taken by the lines a-a, b-b, and c-c) where the hollow part K and the gap between the two close data signal lines overlap each other and (ii) production processes for obtaining the arrangements are the same as those shown in FIG. 1.

According to a liquid crystal display device including the active matrix substrate shown in FIG. 21, it is possible to use one of the first and second data signal lines as an auxiliary line (redundant line), by supplying an identical signal potential to the first and second data signal lines.

Figure 22:
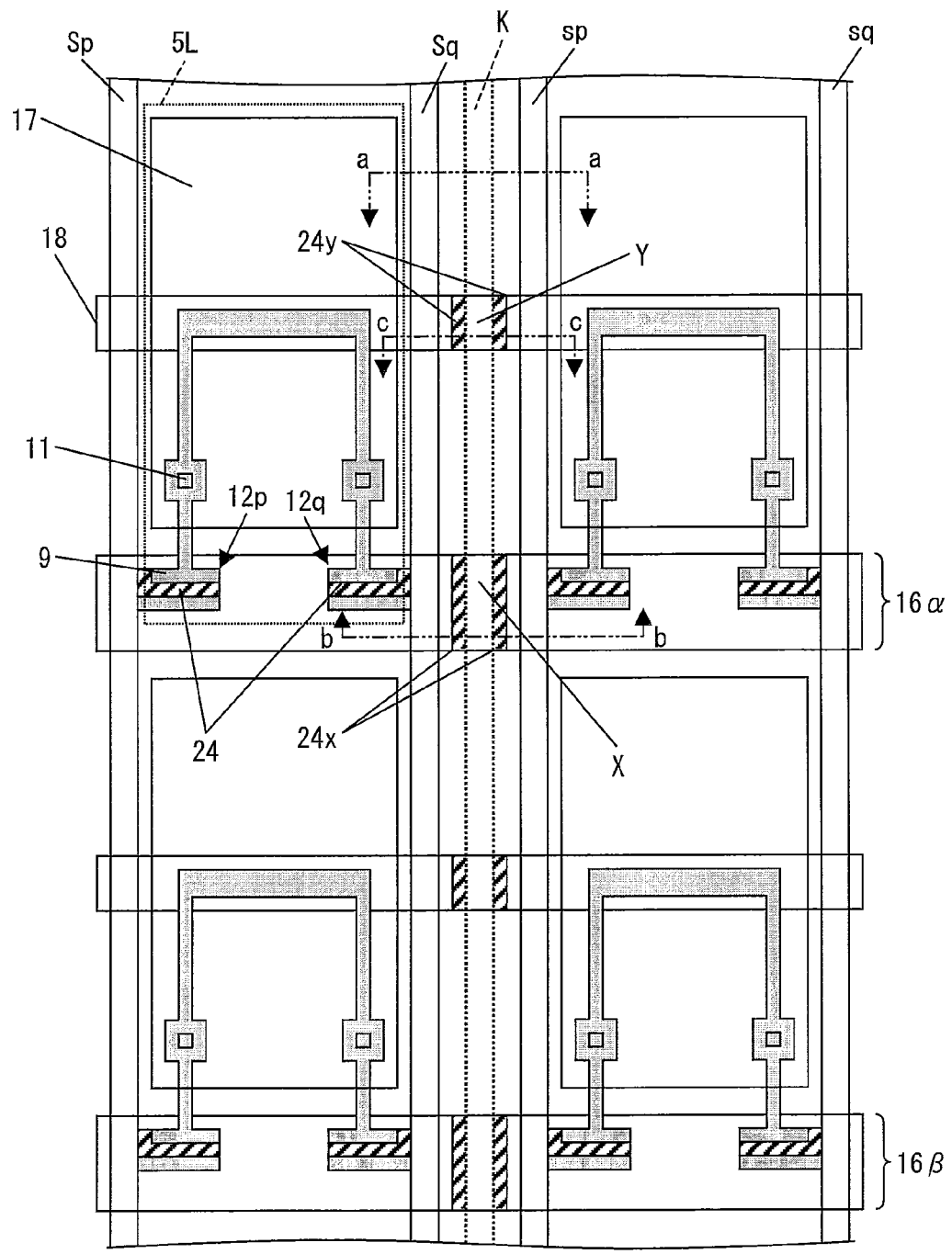
FIG. 22 is a plan view illustrating another configuration of the active matrix substrate according to the first embodiment.

Note that an interlayer insulating film of the active matrix substrate 3a can be configured to have two layers, i.e., an inorganic interlayer insulating film 25 and an organic interlayer insulating film 26 (see FIG. 16). In this case, the active matrix substrate 3a can be configured as shown in FIG. 22. As shown in FIG. 22, each drain electrode of the transistors 12p and 12q is drawn out up to the storage capacitor line 18, and therefore a capacitance (storage capacitance) between the pixel electrode 17 and the storage capacitor line 18 can be secured sufficiently.

Figure 24:
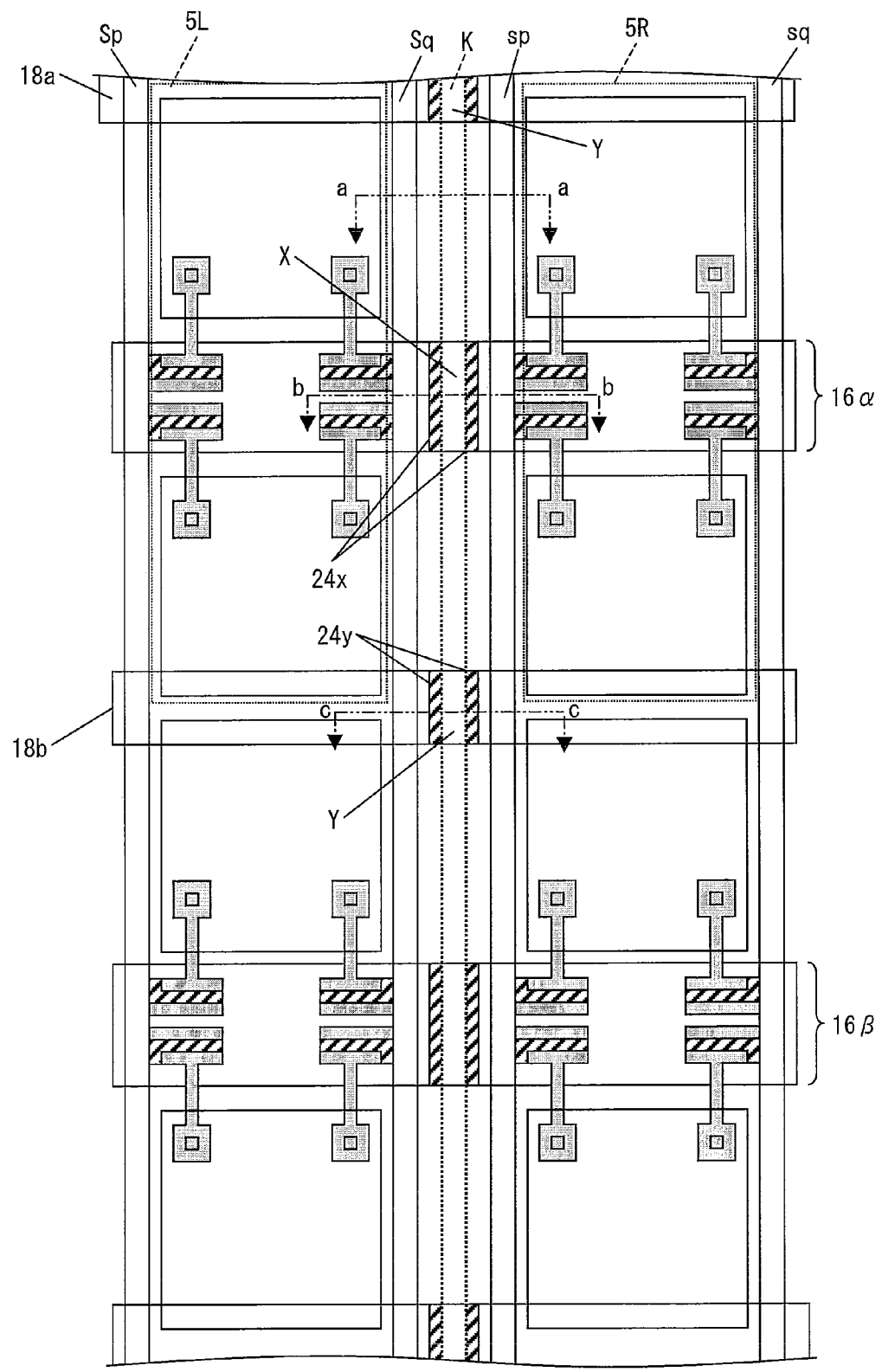
FIG. 24 is a plan view illustrating another configuration of the active matrix substrate according to the first embodiment.

Moreover, the active matrix substrate 3a can be a pixel dividing active matrix substrate as shown in FIG. 24. Specifically, a first data signal line and a second data signal line are provided on both sides of each pixel region column. Each of pixel regions in an identical pixel region column includes two pixel electrodes which are connected to the first and second data signal lines via corresponding transistors, respectively. Further, the two pixel electrodes provided in each pixel region define respective different capacitors (storage capacitors) with respective storage capacitor lines.

For example, a first data signal line Sp is provided on one side of a pixel region 5L, and a second data signal line Sq is provided on the other side of the pixel region 5L. A first data signal line sp is provided on one side of a pixel region 5R which is adjacent to the pixel region 5L in the line direction, and a second data signal line sq is provided on the other side of the pixel region 5R. Further, an interlayer insulating film which covers transistors has a hollow part K so that the hollow part K and a gap between two close data signal lines Sq and sp overlap each other. Note that arrangements in regions (cross-sections taken by the lines a-a, b-b, and c-c) where the hollow part K and the gap between the two close data signal lines overlap each other and production processes for obtaining the arrangements are the same as those shown in FIG. 1.

Figure 25:
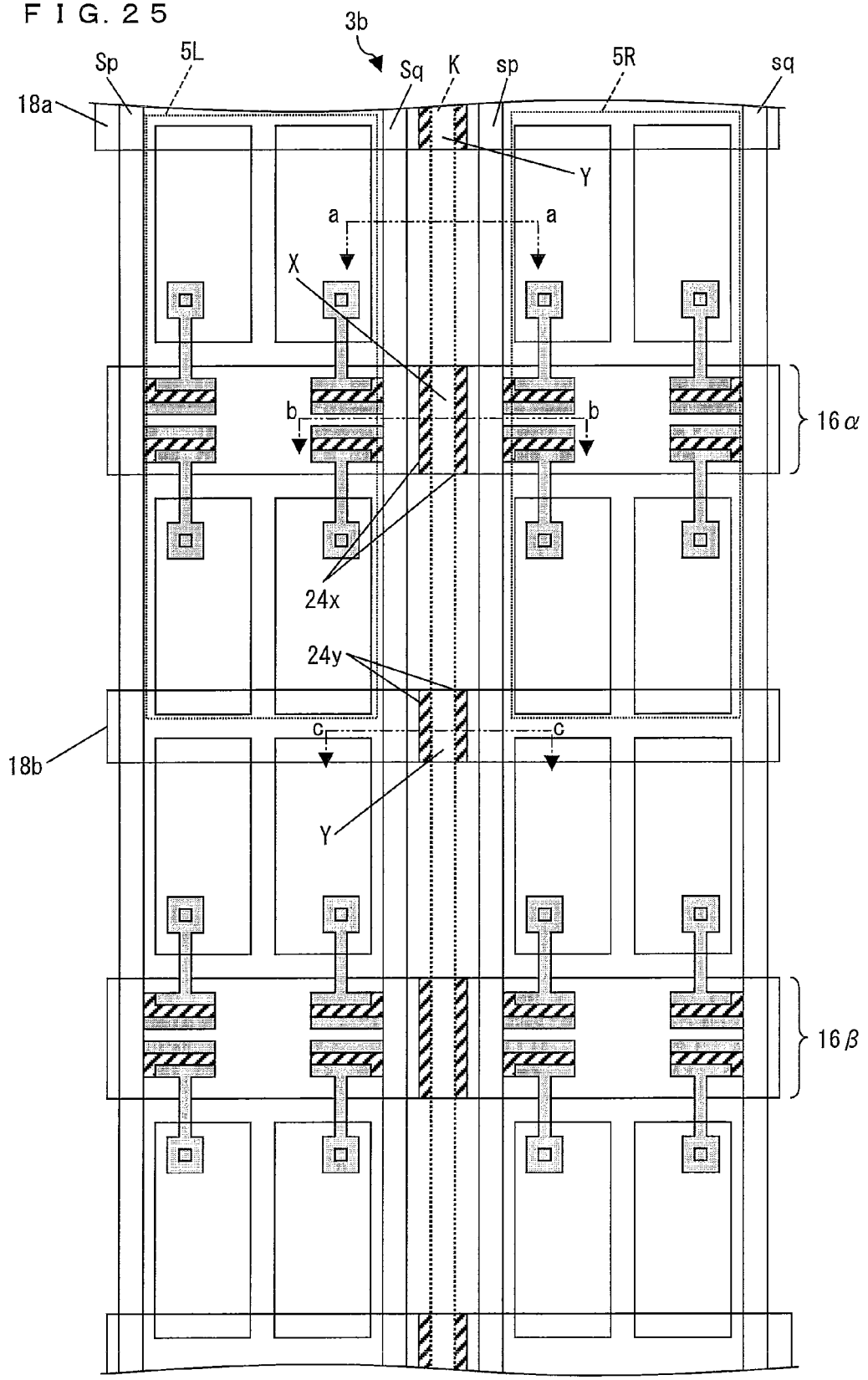
FIG. 25 is a plan view illustrating another configuration of the active matrix substrate according to the first embodiment.

An active matrix substrate of the present invention can be configured as shown in FIG. 25. According to an active matrix substrate 3b shown in FIG. 25, first and second data signal lines are provided on both sides of each pixel region column, each pixel region has four pixel electrodes and four transistors, and two of the four pixel electrodes are connected to the first data signal line via corresponding transistors and the others of the four pixel electrodes are connected to the second data signal line via corresponding transistors.

For example, a first data signal line Sp is provided on one side of a pixel region 5L, and a second data signal line Sq is provided on the other side of a pixel region 5L. A first data signal line sp is provided on one side of a pixel region 5R which is adjacent to the pixel region 5L in the line direction, and a second data signal line sq is provided on the other side of the pixel region 5R. Further, an interlayer insulating film which covers transistors has a hollow part K so that the hollow part K and a gap between two close data signal lines Sq and sp overlap each other. Note that arrangements in regions (cross-sections taken by the lines a-a, b-b, and c-c) where the hollow part K and the gap between the two close data signal lines overlap each other and production processes for obtaining the arrangements are the same as those shown in FIG. 1.

According to a liquid crystal display device including the active matrix substrate shown in FIG. 25, the first and second data signal lines receive respective different signal potential. Moreover, the four pixel electrodes can have respective different root-mean-square electric potentials when electric potentials of (i) a storage capacitor line which defines respective capacitors with two of the four pixel electrodes (i.e., two pixel electrodes adjacent to each other in the line direction) and (ii) a storage capacitor line which defines respective capacitors with the other two of the pixel electrodes (i.e., two pixel electrodes adjacent to each other in the line direction) are independently controlled. Specifically, for example, when one of the two storage capacitor lines is controlled so that its potential level positively shifts whereas the other of the two storage capacitor lines is controlled so that its potential level negatively shifts. This allows the liquid crystal display device to express a halftone by causing one pixel to have four sub-pixels which have respective different luminance. Accordingly, dependence of gamma characteristic with respect to viewing angle (e.g., excess brightness on a screen, etc.) can be further improved.

FIG. 26 shows a liquid crystal panel including the active matrix substrate 3. FIG. 27 is a cross-sectional view of the liquid crystal panel taken along the line g-g in FIG. 26. According to a liquid crystal panel 7 of the present embodiment, a liquid crystal layer 40 is provided between the active matrix substrate 3 and a color filter substrate CF (see FIG. 27). Note that the liquid crystal panel 7 is of an MVA (Multi-domain Vertical Alignment) type. Each of the pixel electrodes 17 of the active matrix substrate 3 has alignment control slits SL formed of a V-shape or a similar shape obtained when they are viewed in the line direction. The color filter substrate CF has alignment control ribs Li in a V-shape or a similar shape obtained when they are viewed in the line direction. Note that the color filter substrate CF includes: a substrate 32; a color filter layer 13; and a common electrode (counter electrode) 28 from which the rib Li is projected. The color filter layer 13 is provided on the substrate 32, and the common electrode 28 is provided on the color filter layer 13. An alignment film 19 is further provided so as to cover the common electrode 28 and the rib Li. The color filter substrate is thus provided with the alignment control rib. However, instead of providing the rib, it is possible for the common electrode of the color filter substrate to have an alignment control slit.

Second Embodiment

Figure 19:
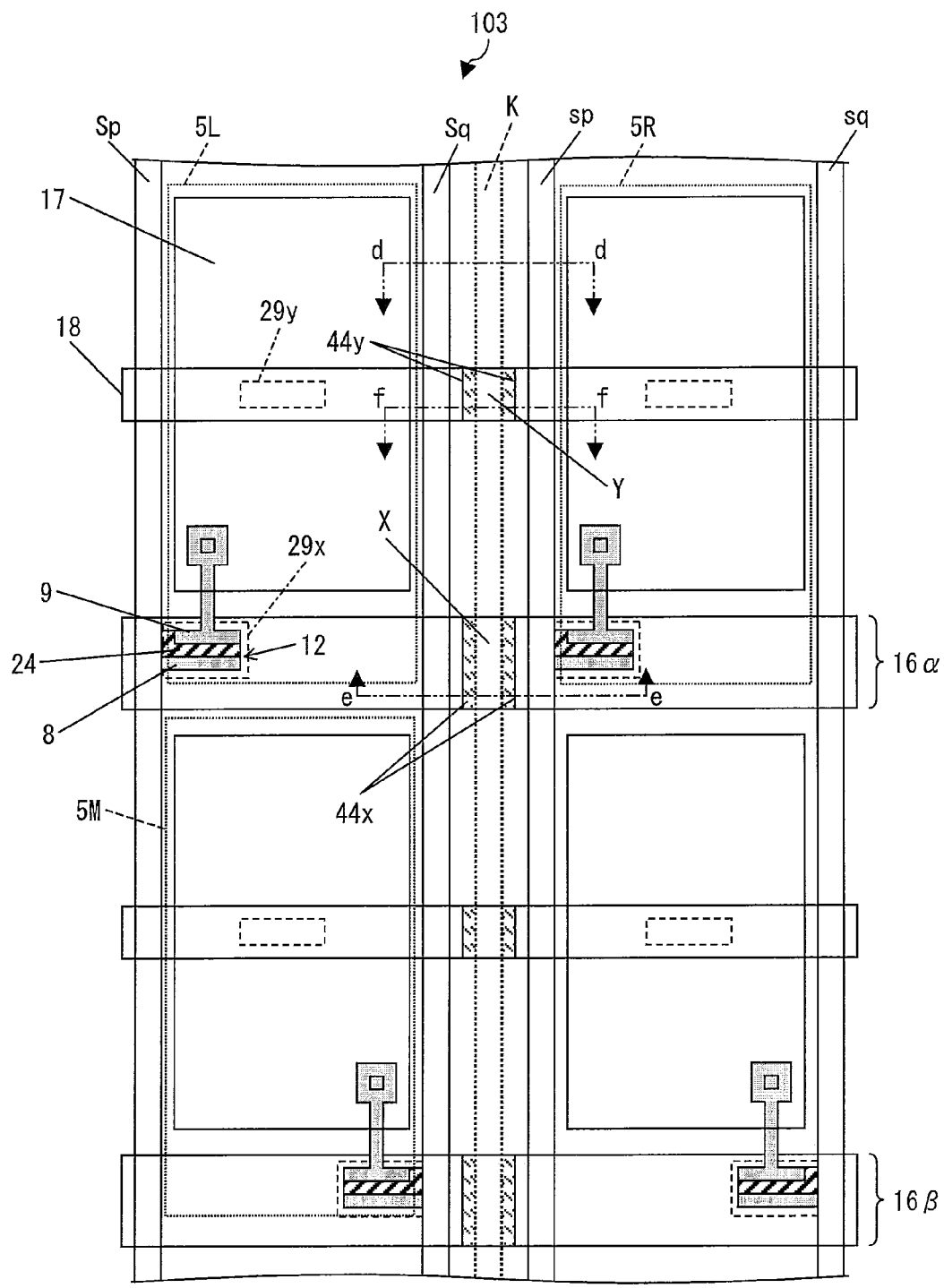
FIG. 19 is a plan view illustrating another configuration of the active matrix substrate according to the second embodiment.

FIG. 19 is a plan view illustrating a configuration example of an active matrix substrate in accordance with the present embodiment. As shown in FIG. 19, according to an active matrix substrate 103 of the present embodiment, first and second data signal lines are provided on both sides of each of pixel region columns. That is, two of the data signal lines are provided so that (i) the two of the data signal lines and (ii) a gap between respective two of pixel regions which are adjacent to each other in the line direction overlap each other. Further, the two of the data signal lines are adjacent to each other so that no pixel region is provided therebetween. A pixel electrode included in a corresponding one of the pixel regions in each of the pixel region columns is connected, via a transistor, to (i) a scan signal line and (ii) the first or second data signal line. Specifically, in pixel regions on second and subsequent lines of each of the pixel region columns, pixel electrodes of respective adjacent pixel regions are connected to respective different data signal lines (first or second data signal line).

For example, a first data signal line Sp is provided on one side of a pixel region 5L, and a second data signal lines Sq is provided on the other side of the pixel region 5L. A first data signal line sp is provided on one side of a pixel region 5R which is adjacent to the pixel region 5L in the line direction, and a second data signal line sq is provided on the other side of the pixel region 5R. That is, the data signal lines Sq and sp are provided so that (i) the data signal lines Sq and sp and (ii) a gap between the pixel regions 5L and 5R overlap each other, and the data signal lines Sq and sp are adjacently provided so that no pixel region is provided therebetween. The pixel regions 5R and 5L have an identical configuration. For example, in the pixel region 5L, a source electrode 8 and a drain electrode 9 of a transistor 12 are provided on a scan signal line 16α via a semiconductor layer 24. This allows the scan signal line 16α to serve as a gate electrode of the transistor 12. Note that the source electrode 8 is connected to the first data signal line Sp and the drain electrode 9 is connected to a pixel electrode 17 via a contact hole 11.

Further, each storage capacitor line which extend in the line direction is provided on the active matrix substrate 103 so as to pass across a corresponding one of the pixel regions. For example, a storage capacitor line 18 and each of the pixel regions 5R and 5L define a storage capacitor. Note that the first and second data signal lines Sp and Sq are provided so as to extend on both sides of a pixel region 5M which is adjacent to the pixel region 5L in the column direction. A pixel electrode provided in the pixel region 5M is connected to a scan signal line 16β and the data signal line Sq, via a transistor.

According to a liquid crystal display device including the active matrix substrate 103, two scan signal lines are selected simultaneously so that writing operations are simultaneously carried out with respect to respective two pixels provided in an identical pixel column. For example, the scan signal lines 16α and 16β are selected simultaneously, and then (i) a writing operation from the data signal line Sp into the pixel electrode 17 in the pixel region 5L and (ii) writing operation from the data signal line Sq into the pixel electrode of the pixel region 5M are simultaneously carried out.

According to the active matrix substrate 103, an interlayer insulating film covering the transistor has a groove-like hollow part which is provided so that (i) the hollow part and (ii) a gap, between two adjacent (close) data signal lines between which no pixel region is provided, overlap each other. The hollow part and each of scan signal lines intersect each other. A gate insulating film is provided in the scan signal line. The gate insulating film located above first adjacent regions, which are adjacent, in the line direction, to a first region which corresponds to a region intersecting the hollow part, is made up of a thicker organic gate insulating film and a thinner inorganic gate insulating film which is provided on the thicker organic insulating film. Moreover, the gate insulating film located above the first region is made up of (i) only an organic gate insulating film or (ii) an organic gate insulating film and an inorganic gate insulating film. Moreover, the hollow part and each of storage capacitor lines overlap each other. A gate insulating film is provided in the storage capacitor line. The gate insulating film located above second adjacent regions, which are adjacent, in the line direction, to a second region which corresponds to a region intersecting the hollow part, is made up of an inorganic gate insulating film and an organic gate insulating film. Moreover, the gate insulating film located above the second region is made up of (i) only an organic gate insulating film or (ii) an inorganic gate insulating film and an organic gate insulating film.

For example, the interlayer insulating film has a groove-like hollow part K so that the hollow part K and a gap between the two close data signal lines Sq and sp overlap each other. The hollow part K and a scan signal line 16α intersect each other. A gate insulating film is provided in the scan signal line 16α. The gate insulating film located above first adjacent regions 44x, which are adjacent, in the line direction, to a first region X which corresponds to a region intersecting the hollow part K, is made up of an organic gate insulating film and an inorganic gate insulating film. Moreover, the gate insulating film located above the first region X is made up of (i) only an organic gate insulating film or (ii) an organic gate insulating film and an inorganic gate insulating film. Moreover, the hollow part K and a storage capacitor line 18 intersect each other. A gate insulating film is provided in the storage capacitor line 18. The gate insulating film located above second adjacent regions 44y, which are adjacent, in the line direction, to a second region Y which corresponds to a region intersecting the hollow part K, is made up of an organic gate insulating film and an inorganic gate insulating film. Moreover, the gate insulating film located above the second region Y is made up of (i) only an organic gate insulating film or (ii) an organic gate insulating film and an inorganic gate insulating film.

Note that a gate insulating film, corresponding to (i) a region 29x under a channel of the transistor 12 and (ii) a region 29y under a capacitor (defined by the storage capacitor line 18 and the pixel electrode 17), is made up of only an inorganic gate insulating film. A gate insulating film in the other region (e.g., intersections of the data signal lines Sp and Sq and the scan signal lines 16α and 16β) is made up of an organic gate insulating film and an inorganic gate insulating film.

Figure 15:
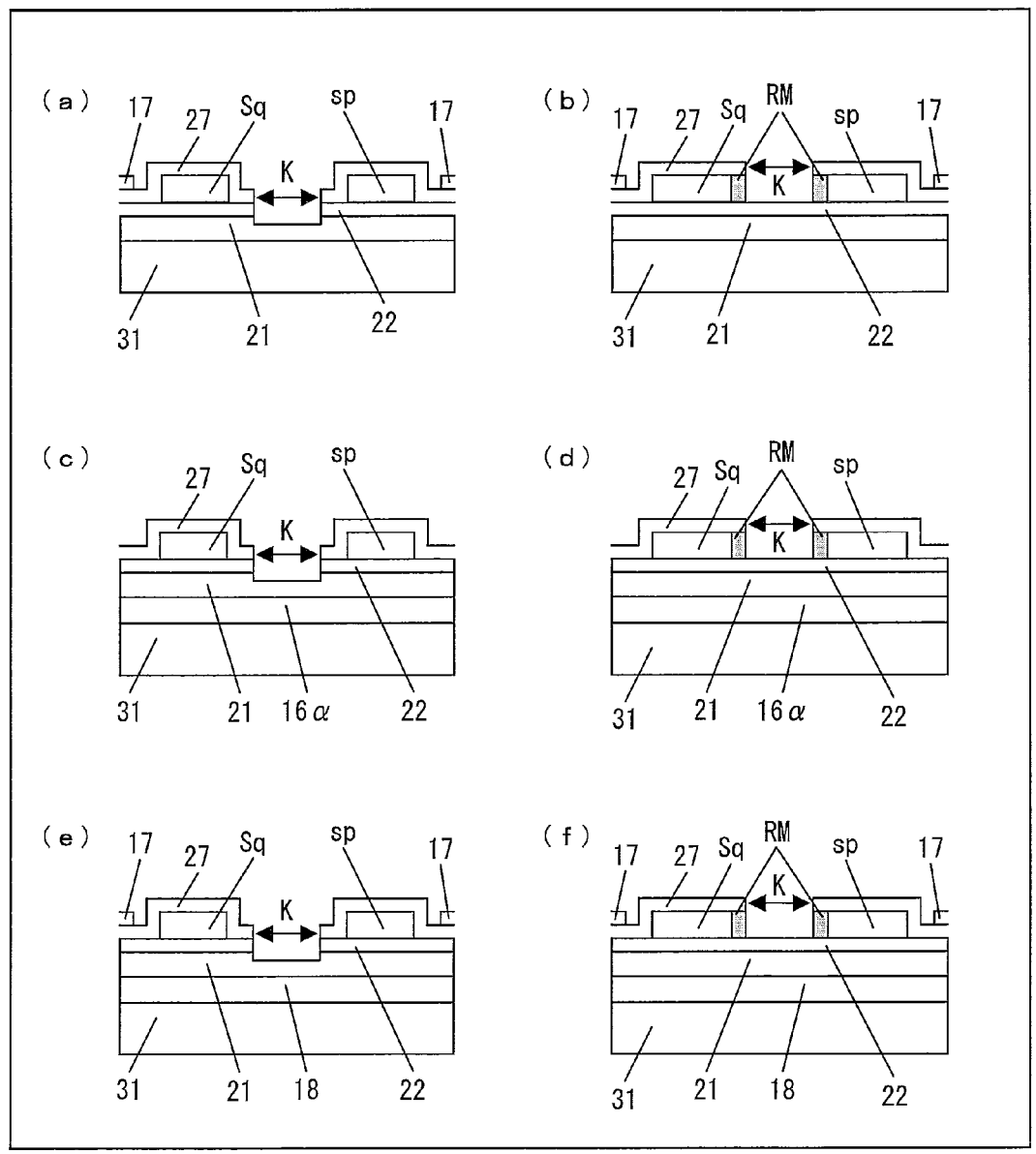
FIG. 15 is a cross-sectional view of the active matrix substrate according to the first embodiment: (a) and (b) are cross-sectional views taken along the line d-d in FIG. 19; (c) and (d) are cross-sectional views taken along the line e-e in FIG. 19, and (e) and (f) are cross-sectional views taken along the line f-f in FIG. 19.

(a) and (b) of FIG. 15 illustrate examples of respective cross-sectional views taken along the line d-d in FIG. 19. Note that (a) of FIG. 15 is a cross-sectional view of a region where no residual film exists (no residual metal exists) between the data signal lines Sq and sp during production processes and (b) of FIG. 15 is a cross-sectional view of a region where a residual film exists (a residual metal exists) between the data signal lines Sq and sp during production processes. According to the cross-sections of the active matrix substrate 103 shown in (a) and (b) of FIG. 15, a thick organic gate insulating film 21 and a thin inorganic gate insulating film 22 are provided in a substrate (transparent insulating substrate) 31 and the two data signal lines Sq and sp are provided on the inorganic gate insulating film 22. An interlayer insulating film 27 is provided so as to cover the data signal lines Sq and sp, and the interlayer insulating film 27 has a groove-like hollow part K so that the hollow part K and a gap between the data signal lines Sq and sp overlap each other. In (a) of FIG. 15, the gate insulating film under the hollow part K is made up of only the organic gate insulating film 21. In (b) of FIG. 15, the gate insulating film under the hollow part K is made up of the organic gate insulating film 21 and the inorganic gate insulating film 22, and a residual metal RM is cut off by the hollow part K. Note that pixel electrodes 17 are provided on the interlayer insulating film 27.

(c) and (d) of FIG. 15 illustrate examples of respective cross-sectional views taken along the line e-e in FIG. 19. Note that (c) of FIG. 15 is a cross-sectional view of a region where no residual film exists (no residual metal exists) between the data signal lines Sq and sp during production processes, and (d) of FIG. 15 is a cross-sectional view of a region where a residual film exists (a residual metal exists) between the data signal lines Sq and sp during production processes. According to the cross-sections of the active matrix substrate 103 shown in (c) and (d) of FIG. 15, a thick organic gate insulating film 21 and a thin inorganic gate insulating film 22 are provided so as to cover a scan signal line 16α provided in a substrate 31 and the two data signal lines Sq and sp are provided on the inorganic gate insulating film 22. An interlayer insulating film 27 is provided so as to cover the data signal lines Sq and sp, and the interlayer insulating film 27 has a groove-like hollow part K so that the hollow part K and a gap between the data signal lines Sq and sp overlap each other. In (c) of FIG. 15, the gate insulating film under the hollow part K (in a first region) is made up of only the organic gate insulating film 21 and the gate insulating film in regions adjacent to the first region (in first adjacent regions) is made up of the organic gate insulating film 21 and the inorganic gate insulating film 22. In (d) of FIG. 15, the gate insulating film under the hollow part K (in a first region) is made up of the organic gate insulating film 21 and the inorganic gate insulating film 22, and the gate insulating film in regions adjacent to the first region (in first adjacent regions) is also made up of the organic gate insulating film 21 and the inorganic gate insulating film 22. Further, a residual metal RM is cut off by the hollow part K.

(e) and (f) of FIG. 15 illustrate examples of respective cross-sectional views taken along the line f-f in FIG. 19. Note that (e) of FIG. 15 is a cross-sectional view of a region where no residual film exists (no residual metal exists) between the data signal lines Sq and sp during production processes, and (f) of FIG. 15 is a cross-sectional view of a region where a residual film exists (a residual metal exists) between the data signal lines Sq and sp during production processes. According to the cross-sections of the active matrix substrate 103 shown in (e) and (f) of FIG. 15, a thick organic gate insulating film 21 and a thin inorganic gate insulating film 22 are provided so as to cover a storage capacitor line 18 provided in a substrate 31 and the two data signal lines Sq and sp are provided on the inorganic gate insulating film 22. An interlayer insulating film 27 is provided so as to cover the data signal lines Sq and sp, and the interlayer insulating film 27 has a groove-like hollow part K so that the hollow part K and a gap between the data signal lines Sq and sp overlap each other. In (e) of FIG. 15, the gate insulating film under the hollow part K (in a second region) is made up of only the organic gate insulating film 21 and the gate insulating film in regions adjacent to the second region (in second adjacent regions) is made up of the organic gate insulating film 21 and the inorganic gate insulating film 22. In (f) of FIG. 15, the gate insulating film under the hollow part K (in a second region) is made up of the organic gate insulating film 21 and the inorganic gate insulating film 22, and the gate insulating film in regions adjacent to the second region (in second adjacent regions) is also made up of the organic gate insulating film 21 and the inorganic gate insulating film 22. Further, a residual metal RM is cut off by the hollow part K. Note that pixel electrodes 17 are provided on the interlayer insulating film 27.

The organic gate insulating film can be made of an insulating material such as a spin-on glass (SOG) material. The SOG material is a material from which a glass film (silica film) can be formed by an application method such as spin coating.

It is preferable to use, as the SOG material, a spin-on glass material containing an organic element (so-called organic SOG material), for example, among SOG materials. It is particularly preferable to use, as the organic SOG material, a SOG material made basically of Si—O—C binding or a SOG material made basically of Si—C binding. The organic SOG material has small relative permittivity and can easily form a thick film. The use of an organic SOG material thus causes an organic gate insulating film to have small relative permittivity, and therefore allows the organic gate insulating film to be easily formed in thick and flat. Note that the organic gate insulating film can be made of an organic SOG material containing a silica filler. In this case, it is preferable that the silica filler is dispersed in a base material made of the organic SOG material. This allows the organic gate insulating film to be provided, without cracking, even in a case where a larger substrate is employed. Note that the silica filler has a particle size of, for example, 10 nm to 30 nm and its mixed rate is 20% by volume to 80% by volume. For example, LNT-025 (manufactured by JGC Catalysts and Chemicals, Ltd.) can be used as the organic SOG material containing a silica filler.

Figure 8:
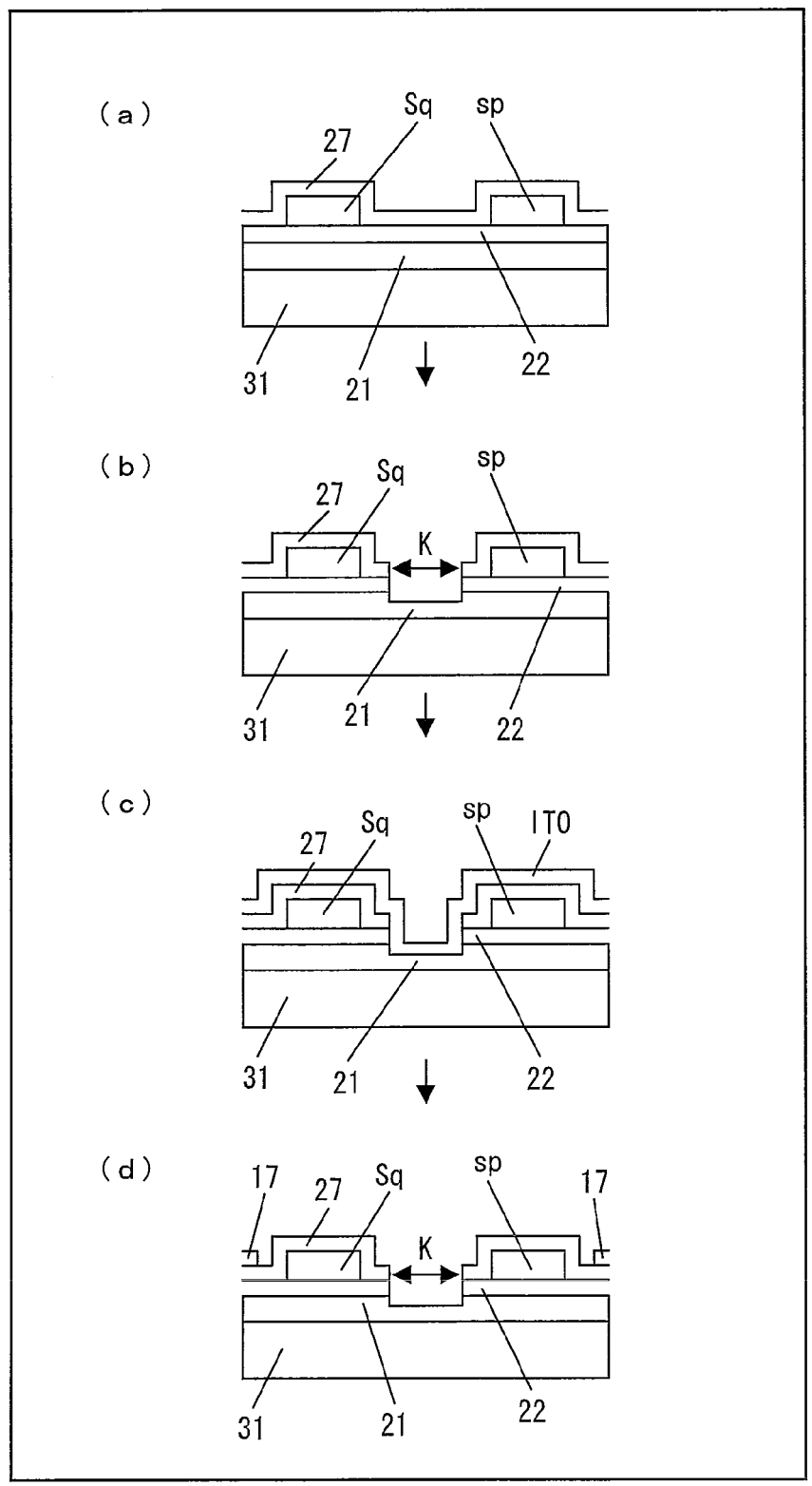
FIG. 8 is a process drawing illustrating part of a production method of an active matrix substrate according to a second embodiment.
Figure 10:
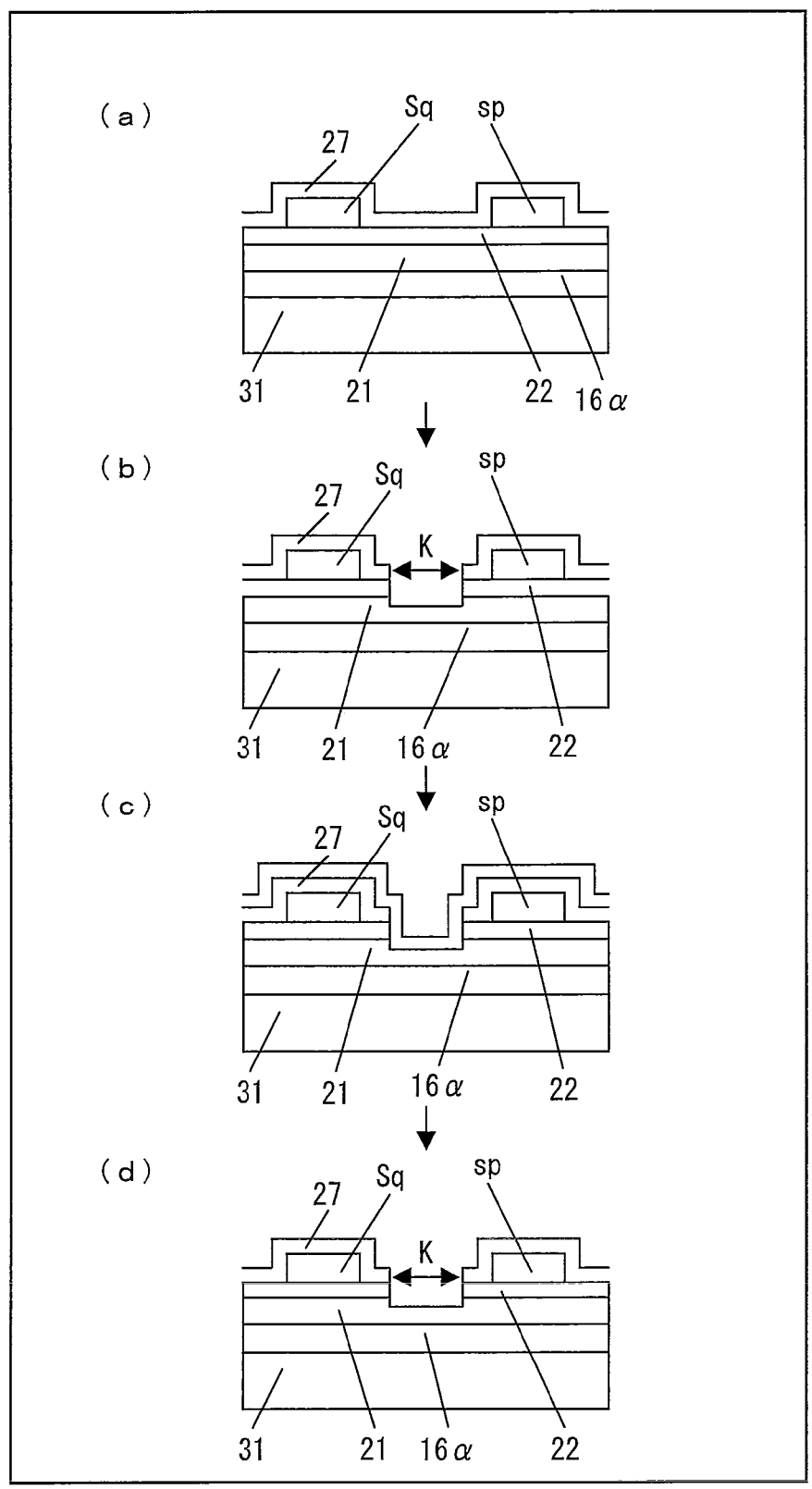
FIG. 10 is a process drawing illustrating part of the production method of the active matrix substrate according to the second embodiment.
Figure 11:
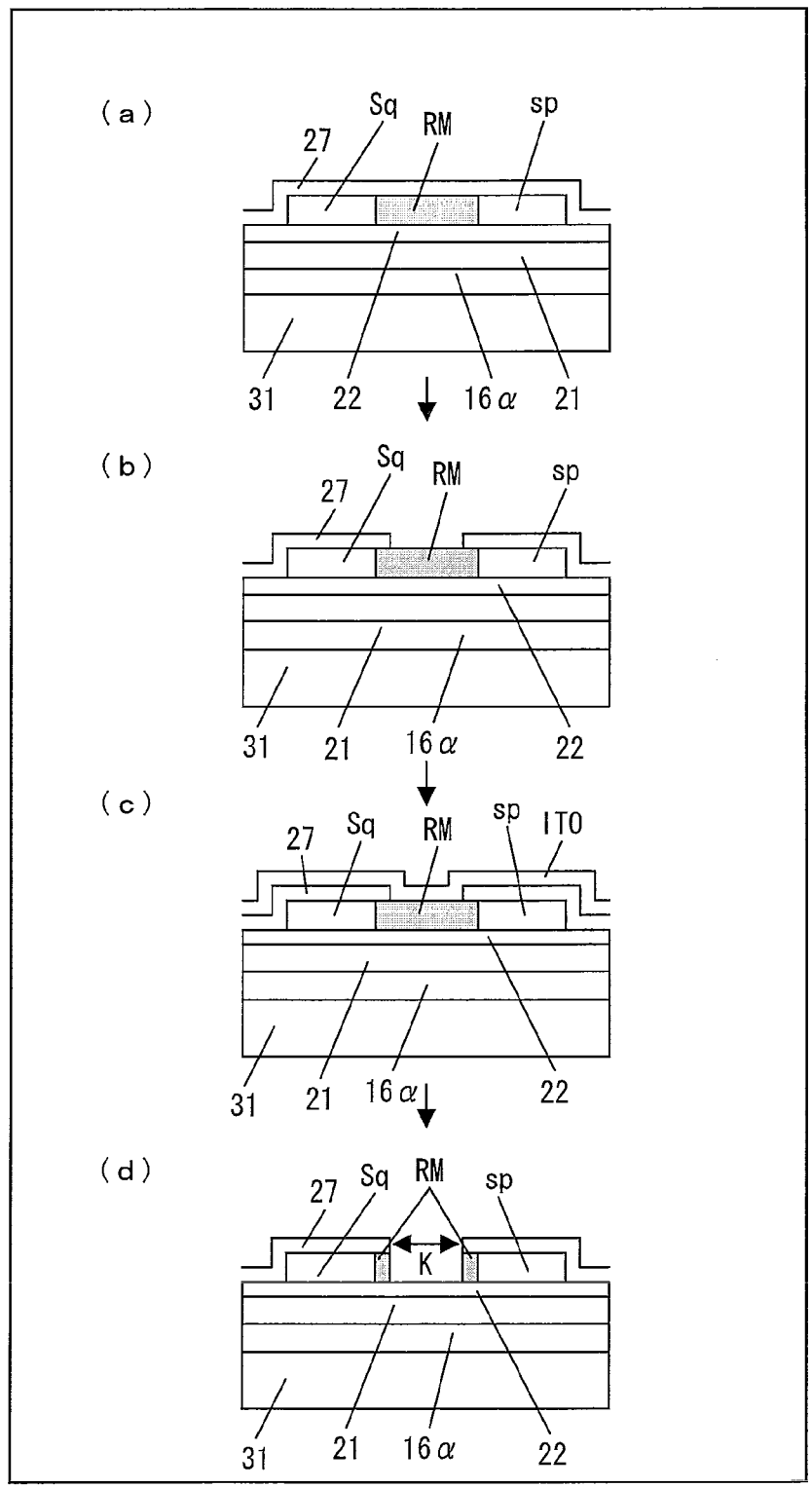
FIG. 11 is a process drawing illustrating part of the production method of the active matrix substrate according to the second embodiment.

The following describes a production method of the active matrix substrate 103 with reference to FIGS. 8 through 11. (a) through (d) of FIG. 8 illustrate a process of manufacture in a region (a region where no residual metal RM exists between the data signal lines Sq and sp) taken along the line d-d in FIG. 19. (a) through (d) of FIG. 9 illustrate a process of manufacture in a region (a region where a residual metal RM exists between the data signal lines Sq and sp) taken along the line d-d in FIG. 19. (a) through (e) of FIG. 10 illustrate a process of manufacture in a region (a region where no residual metal RM exists between the data signal lines Sq and sp) taken along the line e-e in FIG. 19. (a) through (e) of FIG. 11 illustrate a process of manufacture in a region (a region where a residual metal RM exists between the data signal lines Sq and sp) taken along the line e-e in FIG. 19.

In producing the active matrix substrate 103, first, a laminated film of Ti/Al/Ti is deposited on a transparent insulating substrate 31 such as a glass by spattering. Then, the laminated film is subjected to photolithography, dry etching, and resist removing in this order. This allows a scan signal line 16α, etc. and a storage capacitor line 18 to be formed simultaneously.

Then, a thick organic gate insulating film (in this case, made of an organic SOG material) having a thickness of approximately 1.5 μm to 2.0 μm is formed by spin coating or dye coating so as to cover the scan signal line 16α, etc. and the storage capacitor line 18. Then, the organic gate insulating film is patterned by photolithography and dry etching, so that parts under a channel of a transistor and a capacitor (capacitor between a storage capacitor line and a pixel electrode) are removed. The thick organic gate insulating film serves to reduce parasitic capacity between (i) a scan signal line or a storage capacitor line and (ii) a data signal line, or a source electrode or a drain electrode of a transistor, and to prevent a short circuit between them. Note that, after the organic gate insulating film is provided, (i) the organic gate insulating film in the region under the channel of the transistor is removed in order for characteristics of a transistor not to deteriorate and (ii) the organic gate insulating film in the region under the capacitor (the capacitor defined by the storage capacitor line 18 and the pixel electrode 17) is removed in order to increase capacitance of the capacitor.

Further, a gate insulating film 22, an active semiconductor layer, and a low-resistance n-type semiconductor layer are deposited, in this order, by CVD. The gate insulating film 22 is made up of an SiNx (silicon nitride) film which (i) is deposited by use of mixed gas containing $SiH_4$ gas, $NH_3$ gas, and $N_2$ gas and (ii) has a thickness of approximately 4000 Å. The active semiconductor layer is made of an amorphous silicon which (i) is deposited by use of mixed gas containing $SiH_4$ gas and $H_2$ gas and (ii) has a thickness of approximately 1500 Å. The low-resistance n-type semiconductor layer (i) is deposited by use of mixed gas containing $SiH_4$ gas, $PH_3$ gas, and $H_2$ gas, (ii) is doped with phosphorus, and (iii) has a thickness of 500 Å.

Then, the semiconductor layers (the active semiconductor layer and the low-resistance n-type semiconductor layer) are subjected to photolithography, dry etching, and resist removing, in this order, so as to prepare an island shaped semiconductor layer 24 (see FIG. 19).

Then, a laminated film of Mo/Al/Mo is deposited by spattering. Further, the laminated film is subjected to photolithography and wet etching so that data signal lines Sq and sp, and a source electrode 8 and a drain electrode 9 (including their extraction electrodes) are formed simultaneously. Note that a mixed solution, containing phosphoric acid, nitric acid, and acetic acid, is used as an etchant for the wet etching, for example. Subsequently, the low-resistance n-type semiconductor layer is subjected to etching (source-drain separation etching) so as to remove resist. This allows a TFT 12 to be produced.

Then, an interlayer insulating film 27 is deposited by CVD so as to cover the whole surface of the substrate. A passivation film (inorganic interlayer insulating film) made of SiNx with a thickness of approximately 3000 Å is employed as the interlayer insulating film 27. The passivation film is deposited by use of mixed gas containing $SiH_4$ gas, $NH_3$ gas, and $N_2$ gas. This provides the states shown in each (a) of FIGS. 8 through 11. Note that the residual metal RM shown in each (a) of FIG. 9 and FIG. 11 is a residual film caused by a defect in patterning during forming of the data signal lines Sq and sp.

Then, the interlayer insulating film 27 and the gate insulating film 22 are successively subjected to photolithography and dry etching with the use of mixed gas containing $CF_4$ gas and $O_2$ gas. This causes the interlayer insulating film 27 to have: a groove-like hollow part K, the hollow part K and a gap between the two close data signal lines Sq and sp overlapping each other; a contact pattern via which a pixel electrode is electrically connected with a drain electrode; a contact pattern via which a scan signal line is electrically connected with an external extraction terminal; and a contact pattern via which a data signal line is electrically connected with an external extraction terminal (see each (b) of FIGS. 8 through 11).

This makes it possible for the residual metal RM to be exposed between the data signal lines Sq and sp (see (b) of FIG. 9 and (b) of FIG. 11). During the formation of the hollow part K, an inorganic gate insulating film 22 is removed. However, at least part of the thick organic gate insulating film 21 located under the inorganic gate insulating film 22 remains without being etched (see each (b) of FIGS. 8 and 10). Accordingly, the scan signal line 16α is not exposed. Note that the inorganic gate insulating film 22 on which a residual metal RM exists remains without being etched (see each (b) of FIGS. 9 and 11).

Then, a transparent conductive film (e.g., an amorphous ITO) is deposited by spattering so that the transparent conductive film covers the whole surface of the substrate including the hollow part K and the various contact patterns (see each (c) of FIGS. 8 through 11). Then, the transparent conductive film is subjected to photolithography and wet etching so as to form a pixel electrode 17. A mixed solution containing phosphoric acid, nitric acid, and acetic acid is used as an etchant for the wet etching, for example. This makes it possible to etch the residual metal RM between the data signal lines Sq and sp at the same time as patterning the transparent conductive film (e.g., an amorphous ITO), and therefore the residual metal RM can be cut off or removed under the hollow part K (see (d) of FIG. 9 and (d) of FIG. 11).

Note that FIGS. 8 through 11 illustrate each region where only the residual metal RM exists between the two close data signal lines Sq and sp. However, a stacked residue made up of a residual semiconductor layer RS and a residual metal RM can occur in the region. In such a case, as shown in (a) through (e) of FIG. 12, the stacked residue (the residual semiconductor layer RS and the residual metal RM) can be cut off or removed by the hollow part K. That is, the residual semiconductor layer RS is subjected to rework etching after the state shown in each (d) of FIGS. 8 through 11, so that residual semiconductor layer RS is removed. Specifically, the residual semiconductor layer RS is subjected to dry etching with use of mixed gas containing $SF_6$ and HCl. Since the use of the mixed gas makes it possible to secure a selection ratio of the interlayer insulating film 27 (SiNx) and the residual semiconductor layer RS, the residual semiconductor layer RS, exposed in the hollow part K, is etched while the organic gate insulating film 21 or the inorganic gate insulating film 22 (see each (d) of FIGS. 8 through 11) exposed in the hollow part K is hardly etched. As such, it is possible to cut off or remove the residual semiconductor layer RS under the hollow part K (see (e) of FIG. 12).

In view of an etching selection ratio, it is preferable that mixed gas containing $SF_6$ and HCl is used in the rework etching (dry etching). Note, however in the present embodiment, that an organic gate insulating film 21 which can keep some thickness is sufficient (a thickness causing the scan signal line or the storage capacitor line not to be exposed is sufficient) even if the residual semiconductor layer RS is etched. As such, for example, mixed gas containing $CF_6$ and $O_2$ can be used instead of mixed gas containing $SF_6$ and HCl.

In another case, only a residual semiconductor layer RS may occur between the two close data signal lines Sq and sp. Even in such a case, the processes described above make it possible to cut off or remove the residual semiconductor layer RS under the hollow part K (see (a) through (d) of FIG. 13). That is, the residual semiconductor layer RS is cut off or removed during forming of the hollow part K.

As described above, even in a case where two close data signal lines (e.g., Sq and sp) short-circuit on a scan signal line (16α or 16β) or on a storage capacitor line 18 due to a residue (such as a residual metal, a residual semiconductor layer, or their stacked substance), the active matrix substrate 103 makes it possible to prevent the short circuit by cutting off or removing the residue, during the subsequent production processes, without causing the scan signal line (16α or 16β) or the storage capacitor line 18 to be exposed (i.e., while allowing a gate insulating film to be left on the scan signal line or the storage capacitor line).

Figure 12:
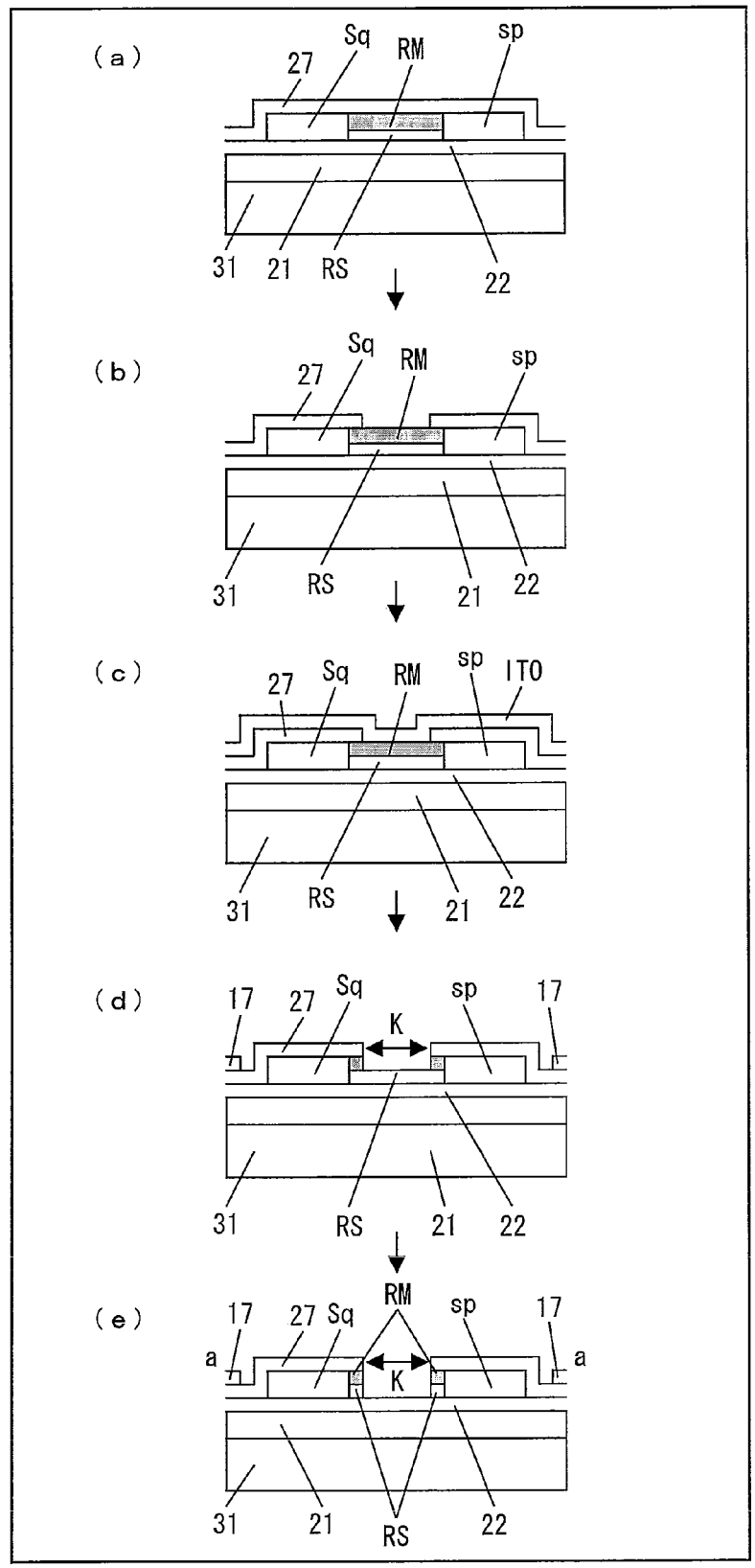
FIG. 12 is a process drawing illustrating part of the production method of the active matrix substrate according to the second embodiment.
Figure 13:
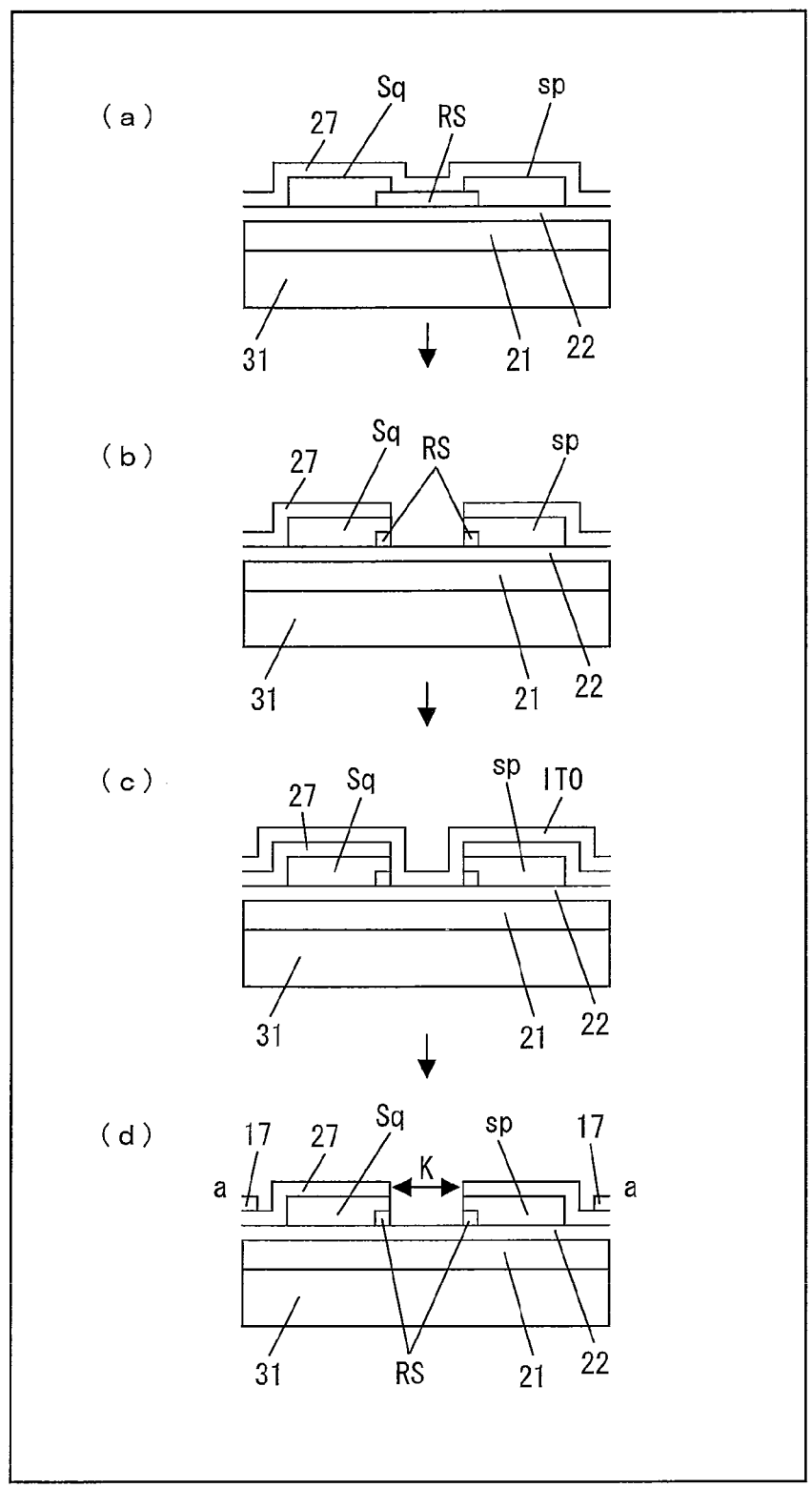
FIG. 13 is a process drawing illustrating part of the production method of the active matrix substrate according to the second embodiment.

According to the active matrix substrate 103 shown in FIG. 19, the passivation film (inorganic interlayer insulating film) is employer as the interlayer insulating film 27 (see (c) and (d) of FIG. 15). However, the present embodiment is not limited to this. For example, the interlayer insulating film 27 can be provided so as to include an inorganic interlayer insulating film 25 and an organic interlayer film 26 (see FIG. 17). This allows the interlayer insulating film 27 located above a transistor to be thick. It is therefore possible to prevent a problem that an off-characteristic of the transistor is degraded. Such a problem will occur because the transistor is exposed by removing the interlayer insulating film 27 located above the transistor while the residual semiconductor layer RS shown in (d) of FIG. 12 is being subjected to dry etching. Further, the thick interlayer insulating film 27 can provide an additional effect of reducing (i) a parasitic capacity between a pixel electrode (or a drain electrode) and a scan signal line and (ii) a parasitic capacity between the pixel electrode and a data signal line (or a source electrode).

Figure 17:
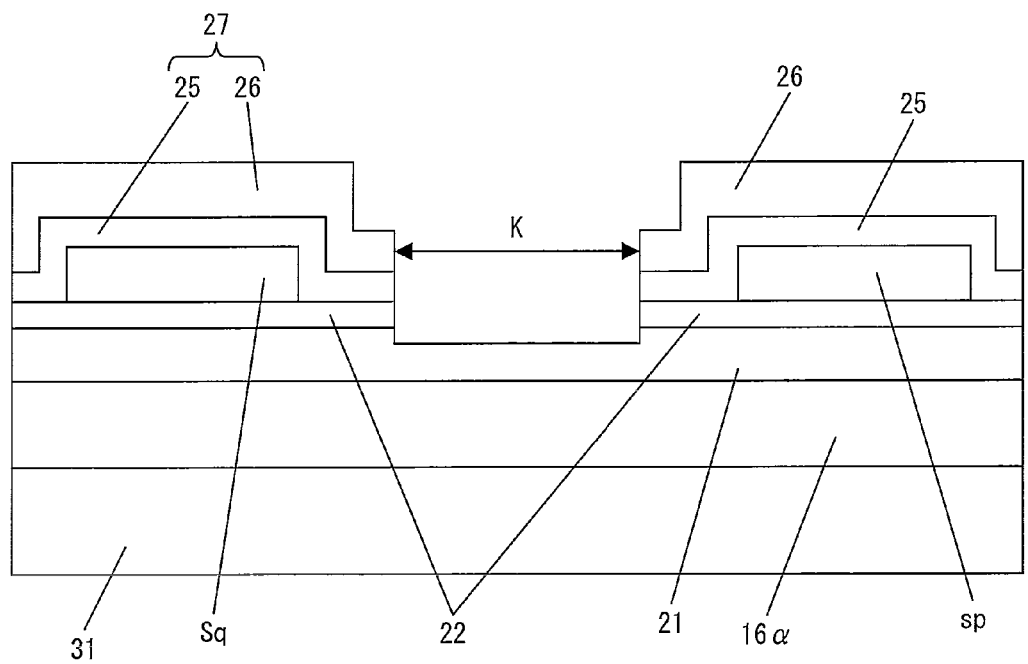
FIG. 17 is a cross-sectional view taken along the line e-e of the active matrix substrate according to the second embodiment.

The inorganic interlayer insulating film 25 and the organic interlayer insulating film 26 shown in FIG. 17 can be formed, for example, as follows. After forming a transistor (TFT), an inorganic interlayer insulating film (passivation film), made of SiNx, which has a thickness of approximately 3000 Å is formed by CVD, with the use of mixed gas containing $SiH_4$ gas, $NH_3$ gas, and $N_2$ gas, so as to cover the whole surface of the substrate. Then, an organic interlayer insulating film 26, which is made of a positive photosensitive acrylic resin having a thickness of approximately 3 μm, is formed by spin coating or dye coating. The organic interlayer insulating film 26 is subsequently subjected to photolithography so as to form a hollow part K and various contact patterns. Then, dry-etching is consecutively carried out with respect to the inorganic interlayer insulating film 25 and the inorganic gate insulating film 22 with the use of mixed gas containing $CF_4$ gas and $O_2$ gas while the organic interlayer insulating film 26 thus patterned is being used as a mask. In this process, part of the organic gate insulating film 21 under the inorganic gate insulating film 22 is etched. However, not all the organic gate insulating film 21 is removed due to its thickness. Accordingly, the scan signal line and the storage capacitor line are not exposed.

Note that, according to the active matrix substrate of the present embodiment, the organic interlayer insulating film 26 has a thickness of approximately 1.5 μm to 3.0 μm. The organic interlayer insulating film 26 can be made of a material such as a SOG (spin-on glass) material, an epoxy resin, a polyimide resin, a polyurethane resin, or a polysiloxane resin, other than the acrylic resin material. Note that an inorganic insulating film can be used instead of the organic interlayer insulating film 26, provided that such an inorganic insulating film satisfies conditions such as forming conditions and dielectric constant condition.

Figure 23:
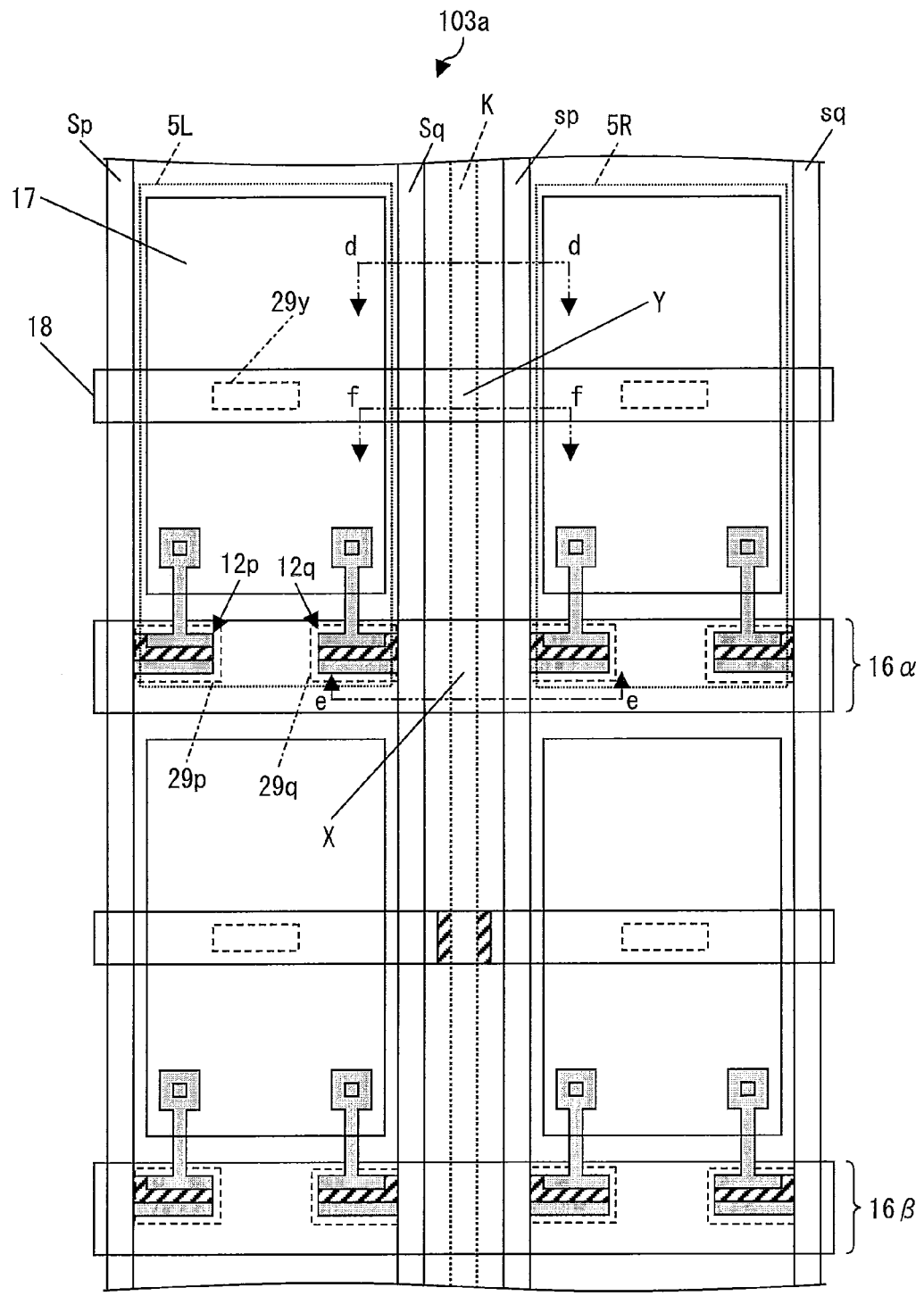
FIG. 23 is a plan view illustrating another configuration of the active matrix substrate according to the second embodiment.

Another active matrix substrate of the present embodiment can be configured as shown in FIG. 23. According to an active matrix substrate 103a shown in FIG. 23, first and second data signal lines are provided on both sides of each pixel region column. A single pixel electrode and two transistors are provided in each of pixel regions, and the single pixel electrode is connected to the first and second data signal lines via the respective transistors.

For example, a first data signal line Sp is provided on one side of a pixel region 5L, and a second data signal line Sq is provided on the other side of the pixel region 5L. The pixel region 5L has a single pixel electrode 17 and two transistors 12p and 12q. The pixel electrode 17 is connected to the first and second data signal lines Sp and Sq via the transistors 12p and 12q, respectively. Further, a first data signal line sp is provided on one side of a pixel region 5R which is adjacent to the pixel region 5L in the line direction, and a second data signal line sq is provided on the other side of the pixel region 5R. Further, an interlayer insulating film which covers the transistors has a hollow part K so that the hollow part K and a gap between two close data signal lines Sq and sp overlap each other. Note that (i) arrangements in regions (cross-sections taken by the lines d-d, e-e, and f-f) where the hollow part K and the gap between the two close data signal lines overlap each other and (ii) production processes for obtaining the arrangements are the same as those shown in FIG. 19.

Note that a gate insulating film, corresponding to (i) regions (29p and 29q) under channels of the transistors 12p and 12q and (ii) a region 29y under a capacitor (defined by the storage capacitor line 18 and the pixel electrode 17), is made up of only an inorganic gate insulating film. A gate insulating film in the other region (e.g., intersections of the data signal lines Sp and Sq and the scan signal lines 16α and 16β) is made up of an organic gate insulating film and an inorganic gate insulating film.

According to a liquid crystal display device including the active matrix substrate shown in FIG. 23, it is possible to use one of the first and second data signal lines as an auxiliary line (redundant line), by supplying an identical signal potential to the first and second data signal lines (e.g., Sp and Sq).

As to Each of the Embodiments

The embodiments do not limit the wiring materials to respective specific ones, provided that the wiring materials are metals which allow target line resistances to be secured. The scan signal line and the storage capacitor line can be made of a metal such as tantalum (Ta), titanium (Ti), chromium (Cr), aluminum (Al), or their alloy. Moreover, the scan signal line and the data signal line can be made of a film having a stacked structure such as TaN/Ta/TaN. Further, the data signal line can be made of, for example, a transparent conductive film such as ITO, other than a general metal film.

In view of reduction in production processes, an etchant, used in the patterning (i.e., dry etching, see (c) and (d) of FIGS. 2 through 5 and (c) and (d) of FIGS. 8 through 11) of the transparent conductive film, is preferable to be an etchant which can concurrently etch the transparent conductive film and the residual metal (a metal made of a material identical to that of the data signal line). For example, in a case where the transparent conductive film is made of IZO and the data signal line is made of Al, a mixed solution containing phosphoric acid, nitric acid, and acetic acid can be used as the etchant. However, the embodiments are not limited to this. For example, after patterning the transparent conductive film (i.e., after forming the pixel electrodes), an etching mask (photoresist) used during the patterning can be left unremoved so as to be reused during the etching (wet-etching or dry-etching) of the residual metal. Instead, the residual metal can be etched, after the transparent conductive film is subjected to the patterning and is subsequently subjected to photolithography.

According to the embodiments, the amorphous silicon thin-film transistor is provided as the transistor. Instead, for example, a microcrystal silicon thin-film transistor, a polysilicon thin-film transistor, a CGS thin-film transistor, or the like can be provided as the transistor.

According to the embodiments, the amorphous ITO is used as the pixel electrode. However, the embodiments are not limited to this. Instead, a transparent conductive film made of a material such as ITO, IZO, zinc oxide, or tin oxide can be used as the pixel electrode. Note that, in a case of a reflective liquid crystal display device, it is sufficient that a pixel electrode is made of an electrode material, such as Al or Ag, which reflects incident light.

Moreover, according to the embodiments, an SiNx film prepared by the CVD method is used as the inorganic interlayer insulating film 25. However, the embodiments are not limited to this. Instead, a resin material, a photosensitive transparent resin, an $SiO_2$ film, or the like, can be used as the inorganic interlayer insulating film 25. Note that a resin such as an acrylic resin, an epoxy resin, a polyimide resin, a polyurethane resin, a novolac resin, or a siloxane resin can be used as a (photosensitive) transparent resin which can be used as the interlayer insulating film.

According to the present embodiment, the liquid crystal display unit and the liquid crystal display device are configured as follows. Specifically, two polarizing plates A and B are attached onto both surfaces of a liquid crystal panel 7 (see FIGS. 26 and 27) so as to have respective polarization axes which cross at right angles. Note that a member such as an optical compensation sheet can be stacked on each of the polarizing plate A and B, if necessary. As shown in (a) of FIG. 31, drivers (a gate driver 102 and a source driver 101) are connected to the liquid crystal panel 7. As an example, the following describes a case where the drivers are connected to the liquid crystal panel 7 by use of a TCP (Tape Career Package) method. First, an ACF (Anisotropic Conductive Film) is provisionally connected through pressure to a terminal section of the liquid crystal panel 7. Then, a TCP on which a driver is provided is punched out from a carrier tape, is subjected to positioning with respect to panel terminal electrodes, and is then subjected to primary connection through pressure while it is being heated. Then, a circuit substrate 109 (PWB: Printed Wiring Board), which causes the driver TCPs to be connected to each other, is connected to an input terminal of the TCP with the use of the ACF. This causes a liquid crystal display unit 100 to be prepared. Then, as shown in (b) of FIG. 31, (i) the drivers (101 and 102) of the liquid crystal display unit are connected to a display control circuit 113 via the circuit substrate 109, and (ii) a lighting device (backlight unit) 104 is integrated with the liquid crystal display unit 100. This causes a liquid crystal display device 110 to be prepared.

Figure 32:
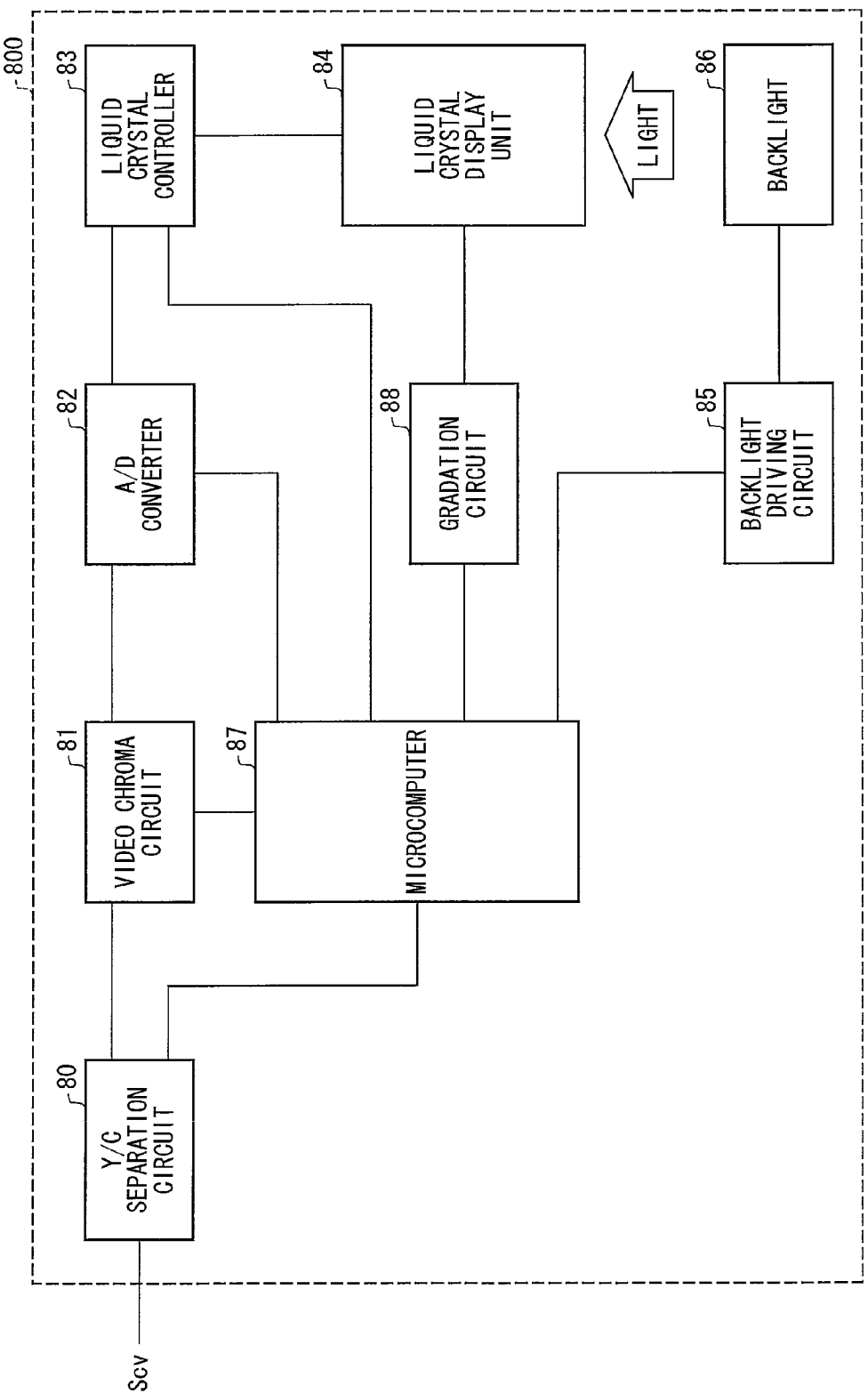
FIG. 32 is a block diagram for explaining functions of the liquid crystal display device.

The following describes one configuration example where the liquid crystal display device is applied to a television receiver. FIG. 32 is a block diagram illustrating a configuration of a television receiving liquid crystal display device 800. The liquid crystal display device 800 includes a liquid crystal display unit 84, Y/C separation circuit 80, a video chroma circuit 81, an A/D converter 82, a liquid crystal controller 83, a backlight driving circuit 85, a backlight 86, a microcomputer 87, and a gradation circuit 88. Note that the liquid crystal display unit 84 includes a liquid crystal panel, and a source driver and a gate driver which drive the liquid crystal panel.

According to the liquid crystal display device 800, a composite color video signal Scv serving as a television signal is first externally supplied to the Y/C separation circuit 80, and is then separated into a luminance signal and a color signal. The luminance signal and the color signal are converted into analog RGB signals corresponding to three primary colors of light at the video chroma circuit 81, and are then converted into digital RGB signals by the A/D converter 82. The digital RGB signals are supplied to the liquid crystal controller 83.

Further, the Y/C separation circuit 80 extracts horizontal and vertical sync signals out of the externally supplied composite color video signal Scv, and the horizontal and vertical sync signals are supplied to the liquid crystal controller 83 via the microcomputer 87.

The liquid crystal display unit 84 receives, at a predetermined timing, (i) the digital RGB signals from the liquid crystal controller 83 and (ii) a timing signal which is prepared in accordance with the horizontal and vertical sync signals. The gradation circuit 88 generates gradation electric potentials corresponding to the respective three primary colors RGB for a color display, and the gradation electric potentials are also supplied to the liquid crystal display unit 84. A source driver, a gate driver, etc. inside the liquid crystal display unit 84 generate driving signals (data signals, i.e., signal potentials, scan signals, etc.) in accordance with the RGB signals, the timing signal, and the gradation electric potentials. A color image is displayed, in response to the driving signals, on the liquid crystal panel inside the liquid crystal display unit 84 displays. Note that it is necessary to illuminate the liquid crystal panel from its backside in order for an image to be displayed by the liquid crystal display unit 84. According to the liquid crystal display device 800, the microcomputer 87 controls the backlight driving circuit 85 so as to cause the backlight 86 to be driven and illuminate the liquid crystal panel from the backside of the liquid crystal panel.

The microcomputer 87 controls the whole system including the processes described above. Note that not only the video signal which varies depending on the television broadcasting but also a video signal captured by a camera or a video signal supplied via the Internet, etc. can be used as the video signal (composite color video signal) supplied externally. The liquid crystal display device 800 is capable of displaying images in accordance with various video signals.

Figure 33:
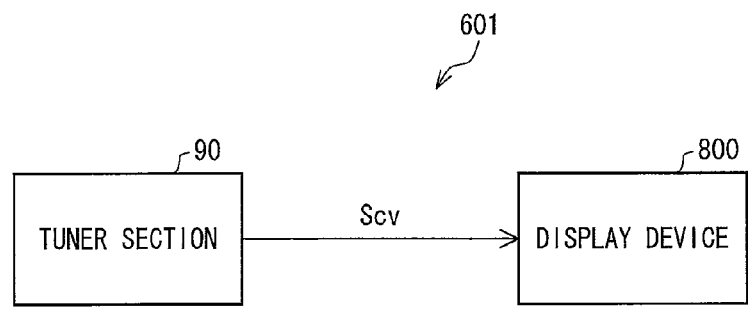
FIG. 33 is a block diagram for explaining a function of a television receiver of the present invention.

In a case where the liquid crystal display device 800 displays an image in response to television broadcasting, a tuner section 90 is connected to the liquid crystal display device 800 so that a television receiver 601 of the present embodiment can be realized (see FIG. 33). The tuner section 90 (i) extracts a signal of a channel to be received out of a received wave (high-frequency signal) which is received via an antenna (not illustrated), (ii) converts the signal thus extracted into an intermediate frequency signal, and (iii) detects the intermediate frequency signal. This causes a composite color video signal Scv serving as a television signal to be extracted. As described above, the composite color video signal Scv is supplied to the liquid crystal display device 800, and an image is displayed by the liquid crystal display device 800 in response to the composite color video signal Scv.

Figure 34:
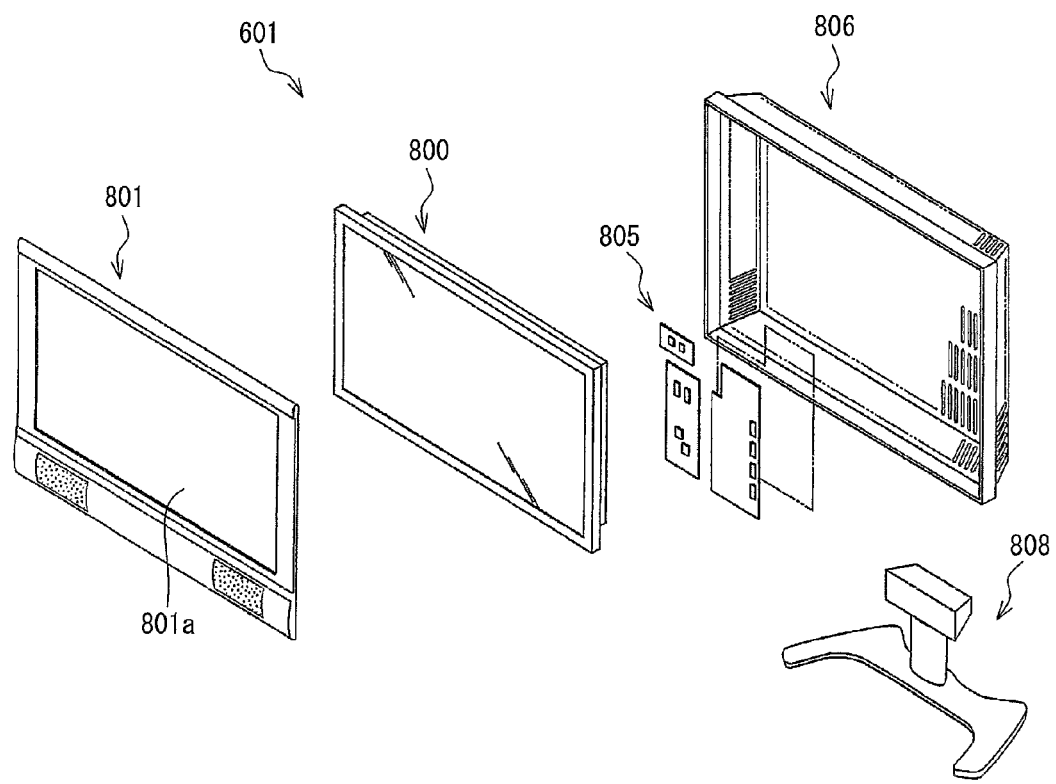
FIG. 34 is an exploded perspective view illustrating a configuration of the television receiver.

FIG. 34 is an exploded perspective view illustrating a configuration example of a television receiver according to the present invention. As shown in FIG. 34, a television receiver 601 of the present embodiment includes a first housing 801 and a second housing 806, in addition to the liquid crystal display device 800. The liquid crystal display device 800 is arranged so as to be sandwiched between the first housing 801 and the second housing 806. The housing 801 has an opening part 801a through which an image displayed on the liquid crystal display device 800 can be seen. The second housing 806, which covers a backside of the liquid crystal display device 800, includes (i) a control circuit 805 for controlling the liquid crystal display device 800 and (ii) a supporting member 808 underneath.

As described above, the active matrix substrate according to the present invention can be an active matrix substrate which includes: scan signal lines extend in a direction; pixel regions which are provided in a line direction in which the scan signal lines extend and in a column direction; data signal lines which extend in the column direction; a first insulating film which covers the scan signal lines; and a second insulating film which covers the data signal lines, two of the data signal lines being provided so that (i) the two of the data signal lines and a gap between respective two of the pixel regions which are adjacent to each other in the line direction, the second insulating film having a hollow part so that the hollow part and a gap between the two of the data signal lines overlap each other, and part of the hollow part and the scan signal lines overlap each other via the first insulating film. For example, the first insulating film can be a gate insulating film, and the second insulating film can be an interlayer insulating film. However, the present invention is not limited to these examples in particular.

Moreover, according to the active matrix substrate, the two of the data signal lines can be provided so that (i) at least part of the two of the data signal lines is disposed in the gap between the two of the pixel regions and (ii) the other part of the two of the data signal lines overlaps the pixel regions.

As described above, the active matrix substrate according to the present invention can be an active matrix substrate which includes: scan signal lines extend in a direction; pixel regions which are provided in a line direction in which the scan signal lines extend and in a column direction; data signal lines which extend in the column direction; storage capacitor lines which extend in the line direction; a first insulating film which covers the storage capacitor lines and the scan signal lines; and a second insulating film which covers the data signal lines, two of the data signal lines being provided so that (i) the two of the data signal lines and a gap between respective two of the pixel regions which are adjacent to each other in the line direction, the second insulating film having a hollow part so that the hollow part and a gap between the two of the data signal lines overlap each other, and part of the hollow part and the storage capacitor lines overlap each other via the first insulating film. For example, the first insulating film can be a gate insulating film, and the second insulating film can be an interlayer insulating film. However, the present invention is not limited to these examples in particular.

Moreover, according to the active matrix substrate, the two of the data signal lines can be provided so that (i) at least part of the two of the data signal lines is disposed in the gap between the two of the pixel regions and (ii) the other part of the two of the data signal lines overlaps the pixel regions.

As described above, the production method of the active matrix substrate according to the present invention can be a production method of an active matrix substrate in which pixel regions are provided in a line direction in which scan signal lines extend and in a column direction, said production method including the steps of: (a) providing (i) the scan signal lines, (ii) a first insulating film (e.g., a gate insulating film) which covers the scan signal lines, and (iii) two of data signal lines in the first insulating film so that the two of the data signal lines and a gap between respective two of the pixel regions which are adjacent to each other in the line direction overlap each other or so that the two of the data signal lines and a region which extends along the gap overlap each other; (b) providing a second insulating film (e.g., an interlayer insulating film) which covers the data signal lines, and causing the second insulating film to have a hollow part so that the hollow part and a gap between the two of the data signal lines overlap each other and so that the hollow part and the scan signal lines overlap each other; and (c) providing a transparent conductive film on the second insulating film and inside the hollow part, and then forming pixel electrodes by patterning the transparent conductive film, in the step (a), a protection layer which protects the first insulating film being provided, before the data signal lines are provided, in a region of the first insulating film which region overlaps a first region of each of the scan signal lines, the first region corresponding to a region under the hollow part. It is sufficient that the protection layer can prevent the first insulating film from being removed at the same time that the hollow part is formed (in the step (b)). It is preferable, however, that the protection layer can be, for example, a semiconductor layer which can be removed at the same time that the follow is formed. However, the present invention is not limited to this. Note that such a semiconductor layer can be formed at the same time that switching elements of TFT, etc. are formed.

As described above, the production method of the active matrix substrate according to the present invention can be a production method of an active matrix substrate in which pixel regions are provided in a line direction in which scan signal lines extend and in a column direction, said production method including the steps of: (a) providing (i) the scan signal lines, (ii) storage capacitor lines, (iii) a first insulating film (e.g., a gate insulating film) which covers the scan signal lines and the storage capacitor lines, and (iv) two of data signal lines in the first insulating film so that the two of the data signal lines and a gap between respective two of the pixel regions which are adjacent to each other in the line direction or so that the two of the data signal lines and a region which extends along the gap overlap each other; (b) providing a second insulating film (e.g., an interlayer insulating film) which covers the data signal lines, and causing the second insulating film to have a hollow part so that the hollow part and a gap between the two of the data signal lines overlap each other and so that the hollow part and the storage capacitor lines overlap each other; and (c) providing a transparent conductive film on the second insulating film and inside the hollow part, and then forming pixel electrodes by patterning the transparent conductive film, in the step (a), a protection layer which protects the first insulating film being provided, before the data signal lines are provided, in a region of the first insulating film which region overlaps a second region of each of the storage capacitor lines, the second region corresponding to a region under the hollow part. It is sufficient that the protection layer (i) can prevent the first insulating film from being removed at the same time that the hollow part is formed (in the step (b)) and (ii) can be removed at the same time that the hollow part is formed. It is preferable, however, that the protection layer can be, for example, a semiconductor layer which can be removed at the same time that the follow is formed. However, the present invention is not limited to this. Note that such a semiconductor layer can be formed at the same time that switching elements of TFT, etc. are formed.

The present invention is not limited to the description of the present embodiments above, but can be modified by a skilled person in the art within the scope of the claims. An embodiment derived from a proper combination of technical means disclosed in respective different embodiments is also encompassed in the technical scope of the present invention.

INDUSTRIAL APPLICABILITY

The liquid crystal panel and the liquid crystal display device according to the present invention are suitable for use in, for example, a liquid crystal television.

The invention claimed is:
1. An active matrix substrate comprising:
pixel regions which are provided in a line direction in which scan signal lines extend and in a column direction;
data signal lines which extend in the column direction;

a gate insulating film which covers the scan signal lines; and an interlayer insulating film which covers the data signal lines, two of the data signal lines being provided so that (i) the two of the data signal lines and a gap between respective two of the pixel regions which are adjacent to each other in the line direction overlap each other or (ii) the two of the data signal lines and a region which extends along the gap overlap each other, the interlayer insulating film having a hollow part so that the hollow part and a gap between the two of the data signal lines overlap each other, and part of the hollow part and the scan signal lines overlap each other via the gate insulating film, wherein:

in each of the scan signal lines, the gate insulating film has a thickness which is thinner in a region above a first region than in a region above a first adjacent region, the first adjacent region being adjacent, in the line direction, to the first region which corresponds to a region under the hollow part, the gate insulating film in the region above the first adjacent region is made up of a plurality of insulating films, the gate insulating film in the region above the first adjacent region is made up of an inorganic insulating film and an organic insulating film, and the gate insulating film in the region above the first region is made up of (i) only an organic insulating film or (ii) an inorganic insulating film and an organic insulating film.

2. The active matrix substrate as set forth in claim 1, wherein the gate insulating film has a thickness which is thinner in a region above an active element forming region than in the region above the first adjacent region.

3. The active matrix substrate as set forth in claim 1, wherein the gate insulating film in the region above the first adjacent region includes an insulating film which can be formed by application.

4. An active matrix substrate comprising:

pixel regions which are provided in a line direction in which scan signal lines extend and a column direction;

data signal lines which extend in the column direction;

storage capacitor lines which extend in the line direction;

a gate insulating film which covers the storage capacitor lines and the scan signal lines; and an interlayer insulating film which covers the data signal lines, two of the data signal lines being provided so that (i) the two of the data signal lines and a gap between respective two of the pixel regions which are adjacent to each other in the line direction overlap each other or (ii) the two of the data signal lines and a region which extends along the gap overlap each other, the interlayer insulating film having a hollow part so that the hollow part and a gap between the two of the data signal lines overlap each other, and part of the hollow part and the storage capacitor lines overlap each other via the gate insulating film, wherein:

in each of the storage capacitor lines, the gate insulating film has a thickness which is thinner in a region above a second region than in a region above a second adjacent region, the second adjacent region being adjacent, in the line direction, to the second region which corresponds to a region under the hollow part, the gate insulating film in the region above the second adjacent region is made up of a plurality of insulating films, the gate insulating film in the region above the second adjacent region is made up of an inorganic insulating film and an organic insulating film, and the gate insulating film in the region above the second region is made up of (i) only an organic insulating film or (ii) an inorganic insulating film and an organic insulating film.

5. The active matrix substrate as set forth in claim 4, wherein the gate insulating film has a thickness which is thinner in a region above an active element forming region than in the region above the second adjacent region.

6. The active matrix substrate as set forth in claim 4, wherein the gate insulating film in the region above the second adjacent region includes an insulating film which can be formed by application.

* * * * *